(12) United States Patent
Gan et al.

(10) Patent No.: US 11,968,600 B2
(45) Date of Patent: Apr. 23, 2024

(54) GROUP ADDRESSED TRAFFIC TRANSMISSION METHOD APPLICABLE TO PLURALITY OF LINKS AND APPARATUS

(71) Applicant: HUAWEI TECHNOLOGIES CO., LTD., Guangdong (CN)

(72) Inventors: Ming Gan, Shenzhen (CN); Guogang Huang, Shenzhen (CN); Yiqing Li, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/073,827

(22) Filed: Dec. 2, 2022

(65) Prior Publication Data

US 2023/0110142 A1    Apr. 13, 2023

Related U.S. Application Data

(63) Continuation of application No. PCT/CN2021/107959, filed on Jul. 22, 2021.

(30) Foreign Application Priority Data

Jul. 27, 2020    (CN) .......................... 202010734790.1
Nov. 24, 2020   (CN) .......................... 202011334640.8
Apr. 21, 2021   (CN) .......................... 202110431312.8

(51) Int. Cl.
*H04W 4/00*     (2018.01)
*H04W 4/06*     (2009.01)
(Continued)

(52) U.S. Cl.
CPC .............. *H04W 4/06* (2013.01); *H04W 76/11* (2018.02); *H04W 76/15* (2018.02)

(58) Field of Classification Search
CPC ........ H04W 4/06; H04W 76/11; H04W 76/15
See application file for complete search history.

(56) References Cited

U.S. PATENT DOCUMENTS 9,743,275 B2    8/2017  Asterjadhi et al.
2008/0144591 A1  6/2008  Jokela
(Continued)

FOREIGN PATENT DOCUMENTS

CN    103209479 A    7/2013
CN    103313201 A    9/2013
(Continued)

OTHER PUBLICATIONS

Yoshihisa Kondo et al., Multi-AP Multi-Link Aggregation for High Data Rate Real-Time Applications, 2020 IEEE 17th Annual Consumer Communications and Networking Conference (CCNC), 2 pages.

(Continued)

*Primary Examiner* — Omoniyi Obayanju
(74) *Attorney, Agent, or Firm* — HUAWEI TECHNOLOGIES CO., LTD.

(57) ABSTRACT

This application is applicable to a group addressed traffic transmission method applicable to a plurality of links and an apparatus. In the method, group addressed traffic indication information is used to indicate whether each AP or an AP other than a first AP in an AP MLD has group addressed traffic; or group addressed traffic indication information is used to indicate whether each AP or an AP other than a first AP in an AP MLD and each AP or an AP other than a non-transmitted AP in an AP MLD in which the non-transmitted AP in a multiple BSSID set in which the first AP is located have group addressed traffic. This application is applied to a wireless local area network system that supports (Continued)

AP MLD: Access point multi-link device
STA MLD: Station multi-link device
MAC: Media access control
PHY: Physical layer an IEEE 802.11ax next-generation Wi-Fi EHT protocol, for example, an 802.11 series protocol such as 802.11be.

30 Claims, 19 Drawing Sheets

(51) Int. Cl.
*H04W 76/11* (2018.01)
*H04W 76/15* (2018.01)

(56) References Cited

U.S. PATENT DOCUMENTS

| | | | |
|---|---|---|---|
| 2013/0230035 | A1 | 9/2013 | Grandhi et al. |
| 2015/0092763 | A1 | 4/2015 | Kim et al. |
| 2018/0092039 | A1 | 3/2018 | Cariou et al. |
| 2018/0302923 | A1 | 10/2018 | Patil et al. |
| 2019/0021025 | A1 | 1/2019 | Ahn et al. |
| 2019/0200171 | A1 | 6/2019 | Huang et al. |
| 2019/0215884 | A1 | 7/2019 | Patil et al. |
| 2019/0268825 | A1 | 8/2019 | Patil et al. |
| 2019/0335454 | A1 | 10/2019 | Huang et al. |
| 2019/0364555 | A1 | 11/2019 | Huang et al. |
| 2020/0045555 | A1 | 2/2020 | Huang et al. |
| 2020/0059791 | A1 | 2/2020 | Yang et al. |
| 2020/0112910 | A1 | 4/2020 | Cherian et al. |
| 2020/0137683 | A1 | 4/2020 | Cariou et al. |
| 2020/0145841 | A1 | 5/2020 | Bhartia et al. |
| 2020/0154443 | A1 | 5/2020 | Patil et al. |
| 2020/0221545 | A1 | 7/2020 | Stacey et al. |
| 2020/0396568 | A1* | 12/2020 | Huang .................. H04W 76/40 |
| 2021/0144787 | A1 | 5/2021 | Kwon et al. |
| 2021/0212141 | A1 | 7/2021 | Chu et al. |
| 2021/0298102 | A1* | 9/2021 | Kwon .................. H04W 48/08 |
| 2022/0287122 | A1 | 9/2022 | Wang et al. |
| 2023/0007535 | A1 | 1/2023 | Kim et al. |
| 2023/0071851 | A1 | 3/2023 | Gan et al. |
| 2023/0110142 | A1 | 4/2023 | Gan et al. |

FOREIGN PATENT DOCUMENTS

| | | |
|---|---|---|
| CN | 108541047 A | 9/2018 |
| CN | 110521250 A | 11/2019 |
| CN | 110521251 A | 11/2019 |
| EP | 2966907 A1 | 1/2016 |
| JP | 2016505232 A | 2/2016 |
| RU | 2590888 C2 | 7/2016 |
| WO | 2013135110 A1 | 9/2013 |
| WO | 2018157786 A1 | 9/2018 |
| WO | 2019139789 A1 | 7/2019 |

OTHER PUBLICATIONS

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.
IEEE Std 802.11-2016, IEEE Standard for Information technology—Telecommunications and information exchange between systems Local and metropolitan area networks-Specific requirements, Part 11: Wireless LAN Medium Access Control (MAC) and Physical Layer (PHY) Specifications, Approved Dec. 7, 2016, total 3534 pages.
IEEE 802.11-20/0902-07-00be, Ming Gan et al., Group addressed frames delivery for MLO Follow UP, Jul. 2020, 14 pages.
Doc.: IEEE 802.11-20/0770r1, Young Hoon Kwon et al., MLO: AID Allocation, Apr. 28, 2020, 8 pages, XP068169895.
IEEE 802.11-19/1955r2, Abhishek Patil et al., MLO: Efficient Paging, May 2020, 17 pages.
Doc.: IEEE 802.11-19/106r0, Menzo Wentink, STA and AP, Jan. 2019, 4 pages.
Doc.: IEEE 802.11-20/0902-00-00be, Ming Gan et al., Group addressed frames delivery for MLO Follow UP, Jul. 2020, 9 pages, XP068174827.
IEEE 802.11-20/0066r3, Young Hoon Kwon et al., Multi-Link TIM, Jan. 2020, 16 pages.
Doc.: IEEE 802.11-21/0915r0, Alfred Asterjadhi, Proposed Resolutions to CIDs specified in 11-21/218r0, Jul. 2021, 52 pages.
IEEE 802.11-20/0084r1, Minyoung Park et al., Multi-link TIM-follow up, Apr. 2020, 9 pages.
S2-2000266, Qualcomm Incorporated, Solution: Integrated Multicast and Unicast Transport with Full Separation of MBS Service, SA WG2 Meeting #136-AH, Incheon, South Korea, Jan. 13-17, 2020, 9 pages.
Edward Au (Huawei), Compendium of straw polls and potential changes to the Specification Framework Document, IEEE 802.11-20/0566r53, IEEE, Internet URL: https://mentor.ieee.org/802.11/dcn/20/11-20-0566-53-00be-compendium-of-straw-polls-and-potential-changes-to-the-specification-framework-document.docx>, Aug. 6, 2020, pp. 1 and 37 to 50.
Minyoung Park (Intel Corp.), multi-link TIM design, IEEE 802.11-20/0084r0, IEEE, Internet URL: https://mentor.ieee.org/802.11/dcn/20/11-20-0084-00-00be-multi-link-tim-design.pptx>, Jan. 13, 2020, 12 pages.
Abhishek Patil (Qualcomm), Multi-BSSID Operation with MLO, IEEE 802.11-20/0358r3, IEEE, Internet URL: https://mentor.ieee.org/802.11/dcn/20/11-20-0358-03-00be-multi-bssid-operation-with-mlo.pptx>, May 18, 2020, 13 pages.

\* cited by examiner

| Element ID | Length | Maximum BSSID indication | Optional sub-element |
|---|---|---|---|
| One byte | One byte | Six bytes | Variable |

Element ID: Element identifier
BSSID: Basic service set identifier

| MLD ID<br>Multi-link device<br>identifier | Link ID<br>Link identifier | Change sequence<br>Change sequence<br>number | Group addressed<br>traffic indication |

MLD parameters subfield MLD parameter field

FIG. 8a

| B0 | B1 | B2 | B3 | B4 | B5 | B6 | B7 |
|---|---|---|---|---|---|---|---|
| ESS Extended service set | IBSS Independent basic service set | Reserved Reserved | Reserved Reserved | Privacy Privacy | Short preamble Short preamble | Multicast traffic flag | CSN updated flag Change sequence number updated flag |

| B8 | B9 | B10 | B11 | B12 | B13 | B14 | B15 |
|---|---|---|---|---|---|---|---|
| Spectrum management Spectrum management | QoS Quality of service | Short slot time Short slot time | APSD Automatic power save delivery | Radio measurement Radio measurement | EPD EtherType protocol discrimination | Reserved Reserved | Reserved Reserved |

Capability information field format (non-DMG STA)/Capability information field

FIG. 8b

| B0 | B1 | B2 | B3 | B4 | B5 | B6 | B7 |
|---|---|---|---|---|---|---|---|
| ESS Extended service set | IBSS Independent basic service set | Reserved Reserved | Reserved Reserved | Privacy Privacy | Short preamble Short preamble | RNR flag RNR flag | Reserved Reserved |

| B8 | B9 | B10 | B11 | B12 | B13 | B14 | B15 |
|---|---|---|---|---|---|---|---|
| Spectrum management Spectrum management | QoS Quality of service | Short slot time Short slot time | APSD Automatic power save delivery | Radio measurement Radio measurement | EPD EtherType protocol discrimination | Reserved Reserved | Reserved Reserved |

Capability information field format (non-DMG STA)/Capability information field

FIG. 8c

| Neighbor AP TBTT offset | BSSID (Optional) | Short-SSID (Optional) | BSS parameter (Optional) | 20 MHz power spectrum density (Optional) |
|---|---|---|---|---|
| Neighbor AP TBTT offset | BSSID (Optional) | Short-SSID (Optional) | BSS parameter (Optional) | 20 MHz PSD (Optional) |

Bit 0 — Bit 7

| OCT recommended | Same SSID | Multiple BSSID | Transmitted BSSID | Member of an extended service set with a 2.4/5 GHz co-located AP | Unsolicited probe response active | Co-located AP | Reserved |
|---|---|---|---|---|---|---|---|
| OCT recommended | Same SSID | Multiple BSSID | Transmitted BSSID | Member of ESS with 2.4/5 GHz co-located AP | Unsolicited probe response active | Co-located AP | Reserved |

FIG. 8e

GROUP ADDRESSED TRAFFIC TRANSMISSION METHOD APPLICABLE TO PLURALITY OF LINKS AND APPARATUS

CROSS-REFERENCE TO RELATED APPLICATIONS

This application is a continuation of International Application No. PCT/CN2021/107959, filed on Jul. 22, 2021, which claims priority to Chinese Patent Application No. 202011334640.8, filed on Nov. 24, 2020 and Chinese Patent Application No. 202010734790.1, filed on Jul. 27, 2020 and Chinese Patent Application No. 202110431312.8, filed on Apr. 21, 2021. All of the aforementioned patent applications are hereby incorporated by reference in their entireties.

TECHNICAL FIELD

This application relates to the field of communications technologies, and in particular, to a group addressed traffic transmission method applicable to a plurality of links and an apparatus.

BACKGROUND

To greatly improve a traffic transmission rate of a wireless local area network (WLAN) system, in an institute of electrical and electronics engineers (IEEE) 802.11ax standard, an orthogonal frequency division multiple access (OFDMA) technology is further used based on an existing orthogonal frequency division multiplexing (OFDM) technology. The OFDMA technology supports a plurality of nodes in sending and receiving data simultaneously. This achieves multi-station diversity gains. In addition, the federal communications commission (FCC) opens a new free frequency band of 5925 MHz to 7125 MHz. This frequency band is briefly referred to as 6 GHz below. Therefore, an operating range of an 802.11ax device is extended from 2.4 GHz and 5 GHz to 2.4 GHz, 5 GHz, 6 GHz, and the like.

Because an IEEE 802.11ax next-generation Wi-Fi protocol-extremely high throughput (EHT) device is forward compatible, the IEEE 802.11ax next-generation Wi-Fi protocol-extremely high throughput device supports an operating spectrum of the 802.11ax device, in other words, supports frequency bands of 2.4 GHz, 5 GHz, and 6 GHz. The IEEE 802.11ax next-generation Wi-Fi protocol-EHT device performs channel division based on the latest opened free frequency band of 6 GHz. A supported bandwidth exceeds a maximum bandwidth of 160 MHz supported at 5 GHz, for example, 320 MHz.

In addition to an ultra-large bandwidth, a peak throughput of the IEEE 802.11ax next-generation Wi-Fi-EHT device may be further increased by increasing a quantity of streams, for example, increasing the quantity of streams to 16, through cooperation of a plurality of frequency bands (2.4 GHz, 5 GHz, and 6 GHz), or the like. On a same frequency band, the peak throughput may be further increased through cooperation of a plurality of channels or in another manner. This reduces a traffic transmission delay. In this specification, the plurality of frequency bands or a plurality of channels are referred to as a plurality of links.

The IEEE 802.11ax next-generation Wi-Fi-EHT device aggregates a plurality of discontinuous links based on a multi-link cooperation technology, to form an ultra-large bandwidth. In addition to being used to obtain a larger bandwidth through aggregation, the multi-link cooperation technology is alternatively used to simultaneously send data packets of same traffic to a same station. It can be learned that the multi-link cooperation technology is used to greatly improve the transmission rate. However, for downlink group addressed traffic transmission, each station in a station multi-link device is periodically in an operating state, to observe whether each access point in an access point multi-link device sends downlink group addressed traffic. Consequently, more power is consumed.

SUMMARY

This application provides a group addressed traffic transmission method applicable to a plurality of links and an apparatus, to help reduce power consumption of a station multi-link device.

According to a first aspect, this application provides a group addressed traffic transmission method applicable to a plurality of links. In the method, a first access point AP in a first access point multi-link device AP MLD generates group addressed traffic indication information; and the first AP sends the group addressed traffic indication information on a first link. The first link is a link on which the first AP operates.

In an implementation, the group addressed traffic indication information is used to indicate whether one or more APs in the first AP MLD have group addressed traffic.

The group addressed traffic indication information is used to indicate whether one AP in the first AP MLD has group addressed traffic, and the AP is the first AP or another AP in the first AP MLD. Compared with a manner in which a station managed by the first AP can only learn of whether the first AP has group addressed traffic, in the method, flexibility of notifying group addressed traffic is improved. The group addressed traffic indication information is used to indicate whether each of a plurality of APs in the first AP MLD has group addressed traffic. Compared with a manner in which a station managed by the first AP can only learn of whether the first AP has group addressed traffic, in the method, a case in which each STA in a STA MLD periodically listens to whether a corresponding AP has group addressed traffic is avoided, and power consumption of the STA MLD is reduced.

In another implementation, the group addressed traffic indication information is used to indicate whether a plurality of APs in the first AP MLD and a second AP MLD have group addressed traffic; and the second AP MLD is an AP MLD in which a non-transmitted AP in a multiple BSSID set in which the first AP is located. Compared with a manner in which a station managed by the first AP can only learn of whether the first AP has group addressed traffic, in this implementation, a case in which each STA in a STA MLD periodically listens to whether a corresponding AP has group addressed traffic is avoided, and power consumption of the STA MLD is reduced. The plurality of APs in the first AP MLD and the second AP MLD may be some APs in the first AP MLD and the second AP MLD. Alternatively, the plurality of APs in the first AP MLD and the second AP MLD may be all APs in the first AP MLD and the second AP MLD. The some APs in the first AP MLD and the second AP MLD may include an AP in the first AP MLD other than the first AP and an AP in the second AP MLD other than a non-transmitted AP that belongs to a same multiple BSSID set as the first AP.

In other words, in this implementation, a transmitted AP may alternatively take the place to send group addressed traffic indication information of each AP in the AP MLD in which the non-transmitted AP is located, to help the STA MLD learn of whether each AP in an AP MLD co-located with the first AP MLD on the first link has group addressed traffic, so as to further reduce power consumption of the STA MLD.

In an implementation, each bit in the group addressed traffic indication information corresponds to each AP in the method. Each bit is used to indicate whether the corresponding AP has group addressed traffic, or a value of each bit is used to indicate whether the corresponding AP has group addressed traffic.

In another implementation, each bit in the group addressed traffic indication information corresponds to each AP in an AP MLD. Each bit is used to indicate whether an AP corresponding to the bit has group addressed traffic, or a value of each bit is used to indicate whether an AP corresponding to the bit has group addressed traffic.

In an implementation, a correspondence between each AP and each bit in the group addressed traffic indication information sent on the first link may be configured by using an association response frame or a management frame on the link.

In another implementation, a correspondence between each AP and each bit in the group addressed traffic indication information sent on the first link is pre-defined.

In still another implementation, the group addressed traffic indication information is a part of bits in a partial virtual bitmap field in a traffic indication map TIM element.

In an implementation, the group addressed traffic indication information sent on the first link is some inconsecutive bits in the partial virtual bitmap field.

In an implementation, the first AP in the first AP MLD generates association identifier configuration information, where the association identifier configuration information is used to indicate an association identifier AID corresponding to each AP or an AP other than the first AP in the first AP MLD on the first link; and the first AP sends the association identifier configuration information on the first link. AIDs of all APs corresponds to all bits in the group addressed traffic indication information. Each bit in the group addressed traffic indication information is used to indicate whether an AP in a corresponding AID has group addressed traffic.

The association identifier configuration information may be sent to the STA MLD by using the association response frame or the management frame on the first link.

In another implementation, the association identifier configuration information is used to indicate an association identifier AID corresponding to each AP or an AP other than the first AP in the first AP MLD on the first link, and an association identifier corresponding to an AP other than the non-transmitted AP or each AP in the second AP MLD on the first link. The second AP MLD is an AP MLD in which a non-transmitted AP in a multiple BSSID set in which the first AP is located.

In another implementation, the group addressed traffic indication information sent on the first link is the part of consecutive bits in the partial virtual bitmap field.

In an implementation, a first bit or a start bit in bits corresponding to all APs in the first AP MLD in the partial virtual bitmap field is a bit x. Alternatively, AIDs corresponding to all APs in the first AP MLD on the first link are continuously allocated by using an AID x as a start. Herein, x is equal to $2^N$. If the first AP operates in a multiple basic service set identifier multiple BSSID mode, N is a value of a maximum basic service set identifier BSSID indicator field in a multiple BSSID element of a multiple BSSID set in which the first AP is located; or N is equal to 0 if the first AP does not operate in a multiple BSSID mode. In this implementation, a corresponding AID on the first link is allocated to each AP in the first AP MLD, and the AID does not conflict with an AID of the non-transmitted AP in the multiple BSSID set in which the first AP is located.

In another implementation, AIDs corresponding to all APs in the first AP MLD are continuously allocated by the first AP by using an AID x as a start. Herein, x is equal to $\max\{2^{(N1)}, 2^{(N2)}, \ldots, 2^{(Ny)}, \ldots, 2^{(Nn)}\}$, n is a quantity of APs operating in a multiple basic service set identifier multiple BSSID mode in the AP MLD, Ny is a value of a maximum basic service set identifier BSSID indicator field in a multiple BSSID element of a multiple BSSID set in which an AP y operating in a basic service set identifier BSSID mode is located, and the AP y is a $y^{th}$ AP operating in the basic service set identifier BSSID mode in the AP MLD. In this implementation, a corresponding unique AID on a plurality of links is allocated to each AP in the first AP MLD, and the AID does not conflict with an AID of a non-transmitted AP in a multiple BSSID set in which each AP in the first AP MLD in which the first AP is located.

In addition, because an AID of the non-transmitted AP in the multiple BSSID set in which the first AP in the first AP MLD is located is allocated by default starting from an AID 1, after allocation is performed for each AP in the first AP MLD by using the AID x as a start, allocation may continue to be performed for an AP in the second AP MLD other than a non-transmitted AP in a same multiple BSSID set as the first AP.

Optionally, in this embodiment of this application, the group addressed traffic indication information may be compressed based on an offset. In an implementation, if allocation is sequentially performed, based on values of link identifiers of links on which the APs operate, for APs corresponding to all the bits in the group addressed traffic indication information, and none of a plurality of APs with consecutive link identifiers have group addressed traffic, the group addressed traffic indication information may include only a bit corresponding to an AP other than the plurality of APs. In other words, the group addressed traffic indication information sent by the first AP may include the bit corresponding to the AP other than the plurality of APs.

In another implementation, when none of a plurality of APs with consecutive association identifiers have group addressed traffic, the partial virtual bitmap field may not carry bits corresponding to the association identifiers. In other words, a quantity of bits in the group addressed traffic indication information in the partial virtual bitmap field is reduced based on an offset in the TIM element.

Optionally, the group addressed traffic indication information sent by the first AP is carried in a delivery traffic indication map DTIM beacon frame. Further, the first AP sends group addressed traffic after sending the DTIM beacon frame.

Optionally, for a beacon frame, the group addressed traffic indication information may only be carried in the DTIM beacon frame. Optionally, the group addressed traffic indication information may alternatively be carried in another frame such as a TIM beacon frame, a management frame, a data frame, or a control frame.

Optionally, if the group addressed traffic indication information is carried in the TIM beacon frame, the management frame, the data frame, or the control frame, and the first AP is an AP having group addressed traffic, the first AP may further send the delivery traffic indication map DTIM beacon frame and the group addressed traffic after the DTIM beacon frame.

AIDs corresponding to a part of bits in the partial virtual bitmap field are allocated to stations, and the bits each are used to indicate whether a corresponding station has a unicast service. Therefore, in this application, there are the following cases:

If AIDs corresponding to all the APs in the first AP MLD on each link are unique and uniformly allocated, an association identifier allocated to each AP in the first AP MLD is different from an association identifier allocated to a station associated with each AP. In other words, the association identifier allocated to each AP in the first AP MLD is no longer allocated by each AP to a station managed by the AP. However, AIDs allocated by different APs to stations managed by the different APs are independent of each other. In other words, the AIDs allocated by the different APs to the stations managed by the different APs may be repeated.

If AIDs corresponding to all the APs in the first AP MLD on each link are allocated independently, an association identifier allocated to each AP in the first AP MLD on a link is different from an association identifier allocated to a station associated with an AP operating on the link. In other words, the association identifier allocated to each AP in the first AP MLD on a link is no longer allocated by an AP operating on the link to a station managed by the AP.

According to a second aspect, this application further provides a group addressed traffic transmission method applicable to a plurality of links. The method is described from a perspective of a station multi-link device STA MLD. In the method, a first station STA in the station multi-link device STA MLD receives, on a first link on which the first station STA operates, group addressed traffic indication information from a first AP in a first AP MLD; and the first STA determines, based on the group addressed traffic indication information, whether each AP has group addressed traffic.

The group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic, and the second AP MLD is an AP MLD in which a non-transmitted AP in a multiple BSSID set in which the first AP is located.

It can be learned that, in the method, the STA MLD may learn of whether each AP in the first AP MLD on the first link has group addressed traffic, or may further learn of whether each AP in another AP MLD co-located with the first AP MLD has group addressed traffic, to greatly reduce power consumption of the STA MLD.

In an implementation, the first STA in the STA MLD is a station operating on a primary link, and that the first STA in the STA MLD receives group addressed traffic indication information from an AP MLD includes: The first STA in the STA MLD listens, on the primary link, to group addressed traffic indication information from one AP in the AP MLD.

Optionally, for a beacon frame, the group addressed traffic indication information may only be carried in a DTIM beacon frame.

Optionally, the group addressed traffic indication information may be carried in another frame such as a TIM beacon frame, a management frame, a data frame, or a control frame.

Optionally, the group addressed traffic indication information is carried in the another frame such as the TIM beacon frame, the management frame, the data frame, or the control frame. The first STA may receive the DTIM beacon frame, and receive group addressed traffic after the DTIM beacon frame. Correspondingly, if another STA in the STA MLD learns, based on the group addressed traffic indication information, that a corresponding AP also has group addressed traffic, the another STA may receive a DTIM beacon frame, and receive group addressed traffic after the DTIM beacon frame.

In an implementation, the group addressed traffic is carried in the DTIM beacon frame, and the first STA may receive the group addressed traffic after the DTIM beacon frame. Correspondingly, if the another STA in the STA MLD learns, based on the group addressed traffic indication information, that the corresponding AP also has group addressed traffic, the another STA may receive the DTIM beacon frame, and receive the group addressed traffic after the DTIM beacon frame.

In another implementation, if the first STA determines that an AP on a link on which the first STA operates has group addressed traffic, the first STA may receive, on the link from the AP, a delivery traffic indication map DTIM beacon frame and group addressed traffic after the DTIM beacon frame.

In an implementation, each bit in the group addressed traffic indication information corresponds to each AP, and each bit is used to indicate whether the corresponding AP has group addressed traffic. For related descriptions of this implementation, refer to related content of the first aspect. Details are not described herein again.

In another implementation, the group addressed traffic indication information is a part of bits in a partial virtual bitmap field in a traffic indication map TIM element. For related descriptions of this implementation, refer to related content of the first aspect. Details are not described herein again.

In still another implementation, the group addressed traffic indication information is a part of consecutive bits in a partial virtual bitmap field in a traffic indication map TIM element. For related descriptions of this implementation, refer to related content of the first aspect. Details are not described herein again.

AIDs corresponding to a part of bits in the partial virtual bitmap field are allocated to stations, and the bits each are used to indicate whether a corresponding station has a unicast service. Therefore, in this application, to allocate an identifier to each AP in the first AP MLD, identifiers corresponding to the stations are further considered. For details, refer to related descriptions in the first aspect.

In an implementation, the first STA receives association identifier configuration information, where the association identifier configuration information is used to indicate an association identifier AID corresponding to each AP or an AP other than the first AP in the first AP MLD on the first link; or the association identifier configuration information is used to indicate an association identifier AID corresponding to each AP or an AP other than the first AP in the first AP MLD on the first link, and an association identifier corresponding to each AP or an AP other than the non-transmitted AP in the second AP MLD on the first link; and the first STA determines, based on the association identifier configuration information, an AID corresponding to each AP on the first link. In this implementation, the STA MLD learns of an AID corresponding to each AP on a link on which the STA MLD is located.

In another implementation, AIDs corresponding to all APs in the first AP MLD are continuously allocated by the first AP by using an AID x as a start. For the AID x, refer to related content of the first aspect. Details are not described herein again.

Optionally, in this embodiment of this application, the group addressed traffic indication information may be compressed based on an offset. In an implementation, if allocation is sequentially performed, based on values of link identifiers of links on which APs in the AP MLD operate, for APs corresponding to all the bits in the group addressed traffic indication information, and none of a plurality of APs with consecutive link identifiers have group addressed traffic, the group addressed traffic indication information may include only a bit corresponding to an AP other than the plurality of APs. In other words, the group addressed traffic indication information sent by the first AP may include the bit corresponding to the AP other than the plurality of APs. For related descriptions of this implementation, refer to related content of the first aspect. Details are not described herein again.

According to a third aspect, this application provides an access point in an access point multi-link device. The access point in the access point multi-link device has some or all functions of the first AP in the first AP MLD in the method example described in the first aspect. For example, a function of the access point in the access point multi-link device may be a function in some or all embodiments of this application, or may be a function of independently implementing any embodiment of this application. The function may be implemented by hardware, or may be implemented by hardware executing corresponding software. The hardware or the software includes one or more units or modules corresponding to the functions.

In an implementation, a structure of the access point in the access point multi-link device may include a processing unit and a communications unit, and the processing unit is configured to support a first access point in a first access point multi-link device to perform a corresponding function in the foregoing methods. The communications unit is configured to support communication between the first access point in the first access point multi-link device and another device. The access point in the access point multi-link device may further include a storage unit. The storage unit is configured to: be coupled to the processing unit and a sending unit, and store a computer program and data that are necessary for the access point in the access point multi-link device.

In an implementation, the processing unit is configured to generate group addressed traffic indication information, where
   the group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic; and
   the second AP MLD is an AP MLD in which a non-transmitted AP in a multiple BSSID set in which the first AP is located; and
   the communications unit is configured to send the group addressed traffic indication information on a first link, where the first link is a link on which the access point operates.

It can be learned that, in the access point in the access point multi-link device, the group addressed traffic indication information generated by the processing unit can indicate whether the access point or another AP has group addressed traffic, and then, is sent by the communications unit to a station multi-link device. Therefore, any station in the station multi-link device may listen to the group addressed traffic indication information, to improve flexibility of notifying group addressed traffic. In addition, when the group addressed traffic indication information is used to indicate whether each AP or a plurality of APs in the first AP MLD and the second AP MLD have group addressed traffic, any station in the station multi-link device may learn of whether a plurality of APs have group addressed traffic, to avoid a case in which each station in the station multi-link device listens to whether group addressed traffic exists on a respective link, so as to reduce power consumption of the station multi-link device.

In an example, the processing unit may be a processor, the communications unit may be a transceiver or a communications interface, and the storage unit may be a memory.

In another implementation, the access point in the access point multi-link device includes a processor and a transceiver.

The processor is configured to generate group addressed traffic indication information.

The group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic.

The second AP MLD is an AP MLD in which a non-transmitted AP in a multiple BSSID set in which the first AP is located.

The transceiver is configured to send the group addressed traffic indication information on a first link. The first link is a link on which the access point operates.

It can be learned that, in the access point in the access point multi-link device, the group addressed traffic indication information generated by the processor can indicate whether the access point or another AP has group addressed traffic, and then, is sent by the transceiver to a station multi-link device. Therefore, any station in the station multi-link device may listen to the group addressed traffic indication information, to improve flexibility of notifying group addressed traffic. In addition, when the group addressed traffic indication information is used to indicate whether each AP or a plurality of APs in an AP MLD have group addressed traffic, any station in the station multi-link device may learn of whether a plurality of APs have group addressed traffic, to avoid a case in which each station in the station multi-link device listens to whether group addressed traffic exists on a respective link, so as to reduce power consumption of the station multi-link device.

Optionally, the access point in the access point multi-link device may further perform any one or more implementations of the first aspect. Details are not described herein again.

According to a fourth aspect, this application further provides a station in a station multi-link device. The station in the station multi-link device has some or all functions of a first STA in a STA MLD in the method example described in the second aspect. For example, a function of the station in the station multi-link device may be a function in some or all embodiments of this application, or may be a function of independently implementing any embodiment of this application. The function may be implemented by hardware, or may be implemented by hardware executing corresponding software. The hardware or the software includes one or more units or modules corresponding to the functions.

In an implementation, a structure of the station in the station multi-link device may include a processing unit and a communications unit, and the processing unit is configured to support the station in the first station multi-link device to perform a corresponding function in the foregoing methods. The communications unit is configured to support communication between the station in the station multi-link device and another device. The station in the station multi-link device may further include a storage unit. The storage unit is configured to: be coupled to the processing unit and a sending unit, and store a computer program and data that are necessary for the station in the station multi-link device.

In an implementation, the communications unit is configured to receive, on a first link on which the station operates, group addressed traffic indication information from a first AP in a first AP MLD, where the group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic, and the second AP MLD is an AP MLD in which a non-transmitted AP in a multiple BSSID set in which the first AP is located; and the processing unit is configured to determine, based on the group addressed traffic indication information, whether each AP has group addressed traffic.

It can be learned that, in the station in the station multi-link device, the processing unit may learn, based on the group addressed traffic indication information, of whether one or more APs have group addressed traffic. In other words, the station in the station multi-link device may not only learn of whether an AP associated with the station has group addressed traffic, but also learn of whether another AP in an AP MLD has group addressed traffic, to improve flexibility of notifying group addressed traffic. In addition, any STA in the station multi-link device may learn of whether a plurality of APs or each AP in the first AP MLD and the second AP MLD has group addressed traffic, to avoid a case in which each STA in the STA MLD listens to whether a corresponding AP has group addressed traffic, and reduce power consumption of the STA MLD.

In an example, the processing unit may be a processor, the communications unit may be a transceiver or a communications interface, and the storage unit may be a memory.

In another implementation, the station in the station multi-link device includes a transceiver.

The transceiver is configured to receive group addressed traffic indication information from an AP MLD. The group addressed traffic indication information is used to indicate whether one or more APs in the AP MLD have group addressed traffic.

Optionally, the station in the station multi-link device further includes a processor.

The processor is configured to receive, on a first link on which the station operates, group addressed traffic indication information from a first AP in a first AP MLD.

The group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic, and the second AP MLD is an AP MLD in which a non-transmitted AP in a multiple BSSID set in which the first AP is located.

The processor is configured to determine, based on the group addressed traffic indication information, whether each AP has group addressed traffic.

It can be learned that, in the station in the station multi-link device, the processor may learn, based on the group addressed traffic indication information, of whether one or more APs have group addressed traffic. In other words, the station in the station multi-link device may not only learn of whether an AP associated with the station has group addressed traffic, but also learn of whether another AP in an AP MLD has group addressed traffic, to improve flexibility of notifying group addressed traffic. In addition, any STA in the STA MLD may learn of whether a plurality of APs or each AP in the first AP MLD and the second AP MLD has group addressed traffic, to avoid a case in which each STA in the STA MLD listens to whether a corresponding AP has group addressed traffic, and reduce power consumption of the STA MLD.

Optionally, the station in the station multi-link device may further perform any one or more implementations of the second aspect. Details are not described herein again.

According to a fifth aspect, an embodiment of the present invention provides a computer-readable storage medium, configured to store a computer program. When the computer program runs in a communications apparatus, the communications apparatus performs the group addressed traffic transmission method applicable to a plurality of links according to the first aspect.

According to a sixth aspect, an embodiment of the present invention provides a computer-readable storage medium, configured to store a computer program. When the computer program runs in a communications apparatus, the communications apparatus performs the group addressed traffic transmission method applicable to a plurality of links according to the second aspect.

According to a seventh aspect, this application further provides a computer program product including a computer program. When the computer program product runs on a communications apparatus, the communications apparatus is enabled to perform the group addressed traffic transmission method applicable to a plurality of links according to the first aspect.

According to an eighth aspect, this application further provides a computer program product including a computer program. When the computer program product runs on a communications apparatus, the communications apparatus is enabled to perform the group addressed traffic transmission method applicable to a plurality of links according to the second aspect.

According to a ninth aspect, this application provides a chip system. The chip system includes at least one processor and an interface, and is configured to support any AP, for example, a first AP, in a first AP MLD, to implement a function in the first aspect, for example, determining or processing of at least one piece of data and information in the foregoing methods. In a possible design, the chip system further includes a memory, and the memory is configured to store a computer program and data that are necessary for an AP in an AP MLD. The chip system may include a chip, or may include a chip and another discrete component.

According to a tenth aspect, this application provides a chip system. The chip system includes at least one processor and an interface, and is configured to support any STA, for example, a first STA, in a STA MLD, to implement a function in the second aspect, for example, determining or processing of at least one piece of data and information in the foregoing methods. In a possible design, the chip system further includes a memory, and the memory is configured to store a computer program and data that are necessary for the STA in the STA MLD. The chip system may include a chip, or may include a chip and another discrete component.

BRIEF DESCRIPTION OF DRAWINGS

FIG. 8a is a schematic diagram of an MLD parameter field in a group addressed traffic transmission method applicable to a plurality of links according to an embodiment of this application;

FIG. 8b is a schematic diagram of a capability information field in a group addressed traffic transmission method applicable to a plurality of links according to an embodiment of this application;

FIG. 8c is a schematic diagram of another capability information field in a group addressed traffic transmission method applicable to a plurality of links according to an embodiment of this application;

FIG. 8e is a schematic diagram of a TBTT information field in a group addressed traffic transmission method applicable to a plurality of links according to an embodiment of this application;

DESCRIPTION OF EMBODIMENTS

Figure 1:
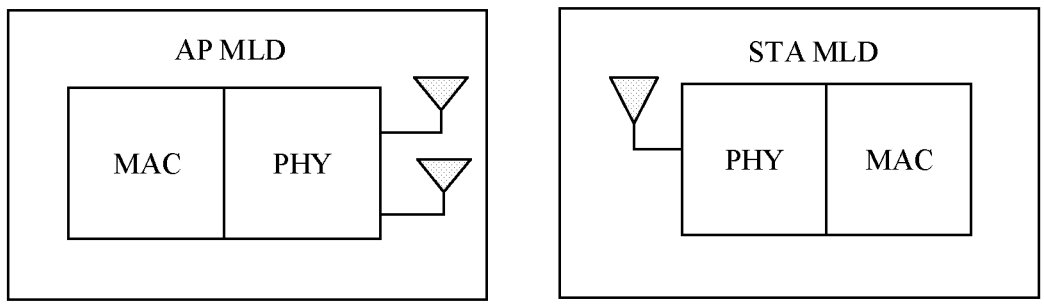
FIG. 1 is a schematic diagram of a structure of an AP MLD and a STA MLD according to an embodiment of this application.

The following clearly describes the technical solutions in embodiments of this application with reference to the accompanying drawings in embodiments of this application.

To better understand a group addressed traffic transmission method applicable to a plurality of links and a related apparatus that are disclosed in embodiments of this application, related concepts in embodiments of this application are first described.

1. Multi-Link Device

A wireless communications system to which embodiments of this application are applicable may be a wireless local area network (WLAN) or a cellular network. A group addressed traffic transmission method may be implemented by a communications device in the wireless communications system or a chip or a processor in the communications device. The communications device may be a wireless communications device that supports parallel transmission on a plurality of links, for example, is referred to as a multi-link device or a multi-band device. Compared with a device that supports only single-link transmission, the multi-link device has higher transmission efficiency and a higher throughput.

The multi-link device includes one or more affiliated stations STAs (affiliated STAs). The affiliated STA is a logical station and may operate on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device (AP MLD), and a multi-link device whose affiliated station is a non-AP STA may be referred to as a multi-link STA, a multi-link STA device, or a STA multi-link device (STA MLD). For ease of description, that "the multi-link device includes an affiliated STA" is also briefly described as that "the multi-link device includes a STA" in embodiments of this application.

It should be noted that the multi-link device includes a plurality of logical stations, and each logical station operates on one link, but the plurality of logical stations are allowed to operate on a same link.

The multi-link device may implement wireless communication according to 802.11 series protocols. For example, a station complying with an extremely high throughput (EHT), or a station complying with 802.11be or compatible with a station supporting 802.11be implements communication with another device. Certainly, the another device may be a multi-link device or may not be a multi-link device.

For example, the multi-link device in embodiments of this application may be a single-antenna device, or may be a multi-antenna device. For example, the multi-link device may be a device with more than two antennas. A quantity of antennas included in the multi-link device is not limited in embodiments of this application. In embodiments of this application, the multi-link device may be allowed to transmit services of a same access type on different links, and even be allowed to transmit a same data packet on different links; or may not be allowed to transmit services of a same access type on different links, but be allowed to transmit services of different access types on different links.

For example, the multi-link device is an apparatus having a wireless communications function, and the apparatus may be an entire device, or may be a chip, a processing system, or the like installed in the entire device. The device in which the chip or the processing system is installed may implement the method and a function in embodiments of this application under control of the chip or the processing system. For example, the STA MLD in embodiments of this application has a wireless transceiver function, may support an 802.11 series protocol, and may communicate with an AP MLD, another STA MLD, or a single-link device. For example, the STA MLD is any user communications device that allows a user to communicate with an AP and further communicate with a WLAN. For example, the STA MLD may be user equipment that may be connected to the Internet, for example, a tablet, a desktop, a laptop, a notebook computer, an ultra-mobile personal computer (UMPC), a handheld computer, a netbook, a personal digital assistant (PDA), or a mobile phone, an internet of things node in the internet of things, a vehicle-mounted communications apparatus in the internet of vehicles, or the like. The STA MLD may alternatively be a chip and a processing system in the foregoing terminals.

In embodiments of this application, the AP MLD is an apparatus that provides a service for the STA MLD, and may support an 802.11 series protocol. For example, the AP MLD may be a communications entity such as a communications server, a router, a switch, or a network bridge, or the AP MLD may include various forms of macro base stations, micro base stations, relay stations, and the like. Certainly, the AP MLD may alternatively be a chip and a processing system in the various forms of devices, to implement the method and a function in embodiments of this application. In addition, the multi-link device may support high-rate and low-latency transmission. With continuous evolution of an application scenario of the wireless local area network, the multi-link device may be further applied to more scenarios, for example, a sensor node (for example, smart water meter, a smart meter, or a smart air detection node) in smart city, a smart device (for example, a smart camera, a projector, a display, a television, a stereo, a refrigerator, or a washing machine) in smart home, a node in the internet of things, an entertainment terminal (for example, a wearable device such as an AR device or a VR device), a smart device (for example, a printer or a projector) in smart office, an internet of vehicles device in the internet of vehicles, and infrastructure (for example, a vending machine, a self-service navigation station in a supermarket, a self-service cash collection device, or a self-service ordering machine) in a daily life scenario. Specific forms of the STA MLD and the AP MLD are not specifically limited in embodiments of this application, and are merely described as an example herein. The 802.11 protocol may be a protocol that supports 802.11be or is compatible with 802.11be.

An operating band of the multi-link device may include but is not limited to sub 1 GHz, 2.4 GHz, 5 GHz, 6 GHz, and a high frequency of 60 GHz.

For example, the multi-link device in embodiments of this application may be a single-antenna device, or may be a multi-antenna device. For example, the multi-link device in embodiments of this application may be a device with more than two antennas. A quantity of antennas included in the multi-link device is not limited in embodiments of this application. FIG. 1 is a schematic diagram of a structure in which an AP MLD has a plurality of antennas and a STA MLD has a single antenna. A physical layer (PHY) part and a media access control (MAC) layer part in the AP MLD and the STA MLD are focused in the 802.11 standard.

2. Link Identifier

The link identifier represents one station operating on one link. In other words, if there are more than one station on one link, more than one link identifier represent the more than one station. A link mentioned below sometimes also represents a station operating on the link.

During data transmission between an AP MLD and a STA MLD, a link identifier may be used to identify one link or a station on one link. Before communication, the AP MLD and the STA MLD may first negotiate or communicate with each other about a correspondence between one link identifier and one link or a station on one link. Therefore, during data transmission, a link identifier is carried without transmitting a large amount of signaling information to indicate a link or a station on a link. This reduces signaling overheads and improves transmission efficiency.

In an example, a management frame, for example, a beacon frame, sent when the AP MLD establishes a basic service set (BSS) carries one element, and the element includes a plurality of link identification information fields. The link identification information field may indicate a correspondence between one link identifier and a station operating on a link corresponding to the link identifier. The link identification information field not only includes a link identifier, but also includes one or more pieces of the following information: a media access control (MAC) address, an operating class, and a channel number. One or more of the MAC address, the operating class, and the channel number may indicate one link. For an AP, a MAC address of the AP is also a BSSID (basic service set identifier) of the AP. In another example, in a multi-link device association process, the AP MLD and the STA multi-link device negotiate about a plurality of link identification information fields. An association of multi-link devices means that one AP in the AP MLD is associated with one STA in the STA MLD. The association may be performed to help respectively associate a plurality of STAs in the STA MLD with a plurality of APs in the AP MLD. One STA is associated with one AP.

In subsequent communication, the AP MLD or the STA multi-link device represents one station in the STA multi-link device by using a link identifier, and the link identifier may further represent one or more attributes of a MAC address, an operating class, and a channel number of the station. The MAC address may be replaced with an association identifier of the associated AP MLD. Optionally, if a plurality of stations operate on one link, in addition to an operating class and a channel number that are of the link, the link identifier (which is an ID in a form of one number) represents identifiers of the stations operating on the link, for example, MAC addresses of the stations or association identifiers (AID) of the stations.

3. Traffic Indication Map Element

Figure 2:
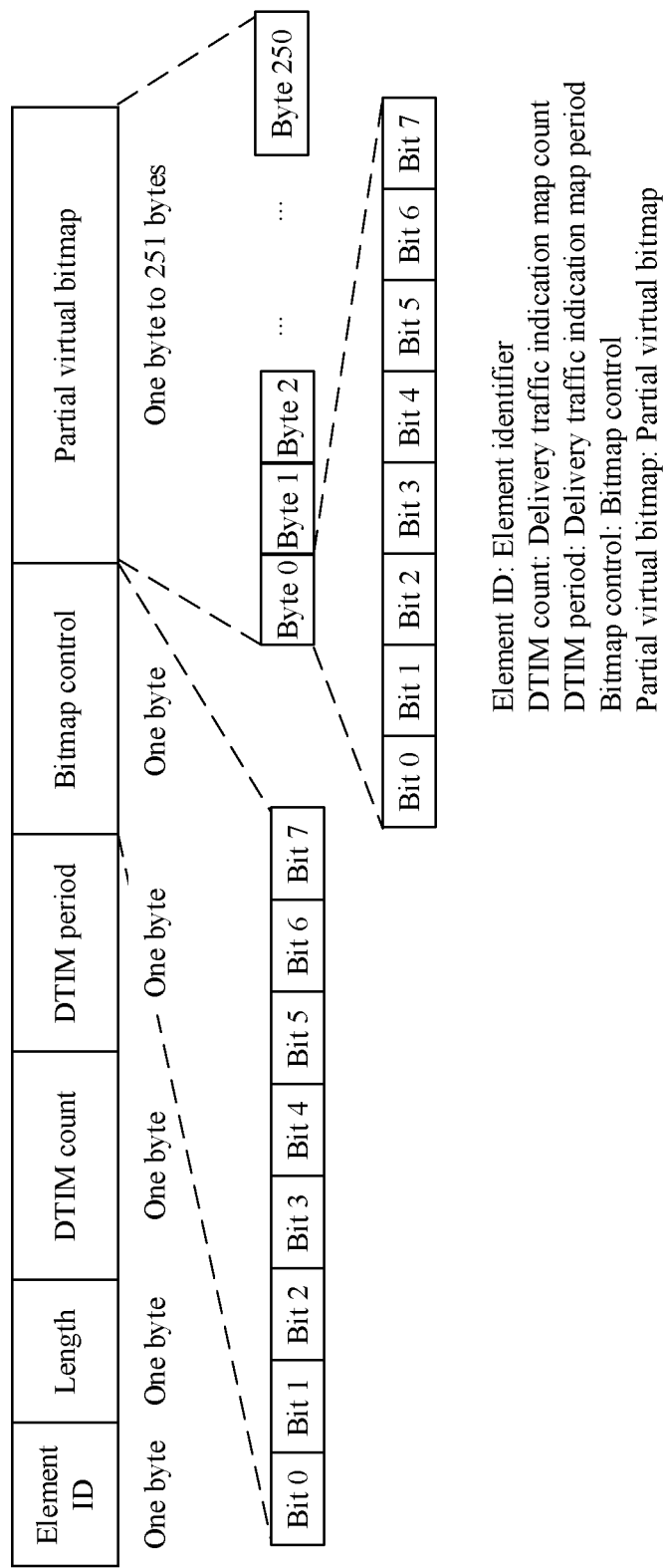
FIG. 2 is a schematic diagram of a frame format of a TIM element according to an embodiment of this application.

A traffic indication map (TIM) beacon frame and a delivery traffic indication map (DTIM) beacon frame each carry a traffic indication map (TIM) element A frame format of a TIM element field is shown in FIG. 2.

An element identifier (ID) field is used to identify that an element shown in FIG. 2 is a TIM element.

A length field is used to indicate a length of the TIM element, and collect statistics about a total length, in a unit of bytes, of fields after the field, to be specific, a total length of a DTIM count field, a DTIM period field, a bitmap control field, and a partial virtual bitmap field.

The DTIM count field is used to indicate a quantity of TIM beacon frames that appear before a next DTIM beacon frame arrives after a current beacon frame carrying the TIM element arrives. In other words, the DTIM count field is a count value, and the count value is variable. When a value of the DTIM count field is 0, it indicates that the current beacon frame is a DTIM beacon frame; or when a value of the DTIM count field is not 0 or is none-zero, it indicates that the current beacon frame is a TIM beacon frame.

The DTIM period field is used to indicate period duration of the DTIM beacon frame, namely, an arrival interval. The arrival interval is in a unit of a period of the TIM beacon frame. For example, if a DTIM period is set to 1, a DTIM count in each TIM element field is equal to 0. In other words, each beacon frame is a DTIM beacon frame.

Bitmap control field: As shown in FIG. 2, a bit 0 in the bitmap control field is used to indicate whether an access point AP sends group addressed traffic after sending a DTIM beacon frame; or a bit 0 in a bitmap control field in a DTIM beacon frame indicates whether an AP buffers group addressed traffic and indicates that the group addressed traffic is not sent based on a group addressed AID. Bits 1 to 7 in the bitmap control field are used to indicate an offset of the partial virtual bitmap, and the offset is in a unit of bytes (namely, 8 bits).

Partial virtual bitmap: Each bit in a partial virtual bitmap field corresponds to one association identifier (AID), and is used to indicate whether a station corresponding to the AID has a unicast service. Alternatively, each bit in a partial virtual bitmap field corresponds to one group addressed AID, and is used to indicate whether a group of stations corresponding to the group addressed AID have a downlink service. The partial virtual bitmap field is a part of bits in a traffic indication virtual bitmap field. The traffic indication virtual bitmap field is 251 bytes, and is used to indicate whether stations corresponding to an AID 0 to an AID 2007 have a downlink service.

The element ID field, the length field, the DTIM count field, the DTIM period field, and the bitmap control field each occupy one byte.

4. Multiple Basic Service Set Identifier (BSSID)

A multiple basic service set identifier set (Multiple BSSID set, which may be referred to as a multiple BSSID set) may be understood as a set of some cooperating APs. A same operating class, channel number, and antenna interface are used for all cooperating APs. In the multiple BSSID set, there is only one AP with a transmitted BSSID, and all other APs are APs with a non-transmitted BSSID. Information about the multiple BSSID set (namely, a multiple BSSID element) is carried in a beacon frame, a probe response frame, or a neighbor report sent by the AP with a transmitted BSSID. BSSID information of an AP with a non-transmitted BSSID is derived by a station based on a multiple BSSID element in the foregoing beacon frame, probe response frame, or neighbor report. A BSSID of the AP with a non-transmitted BSSID is calculated based on a BSSID of the AP with a transmitted BSSID and a BSSID index field in a multiple BSSID-index element in a non-transmitted BSSID profile in the multiple BSSID element. For a specific method, refer to the Draft 802.11REVmd D3.0 protocol.

The multiple BSSID set may also be understood as including a plurality of APs. Each AP manages one BSS, and different APs may have different SSIDs and permission, for example, security mechanisms or transmission opportunities.

In the multiple BSSID set, only an AP whose BSSID is a transmitted BSSID may send a beacon frame (beacon) and a probe response frame (Probe Response), and the AP with a non-transmitted BSSID does not send a beacon frame. Therefore, if a probe request frame (Probe Request) sent by a STA is sent to an AP whose BSSID is a non-transmitted BSSID in the multiple BSSID set, the AP whose BSSID is a transmitted BSSID in the multiple BSSID set responds instead, to send a probe response frame.

In the plurality of APs in the multiple BSSID set, a BSSID of one AP is configured as a transmitted BSSID, and the AP with a transmitted BSSID may be referred to as a transmitted AP; and a BSSID of another AP is configured as a non-transmitted BSSID, and the AP with a non-transmitted BSSID may be referred to as a non-transmitted AP.

Figures 3, 4A:
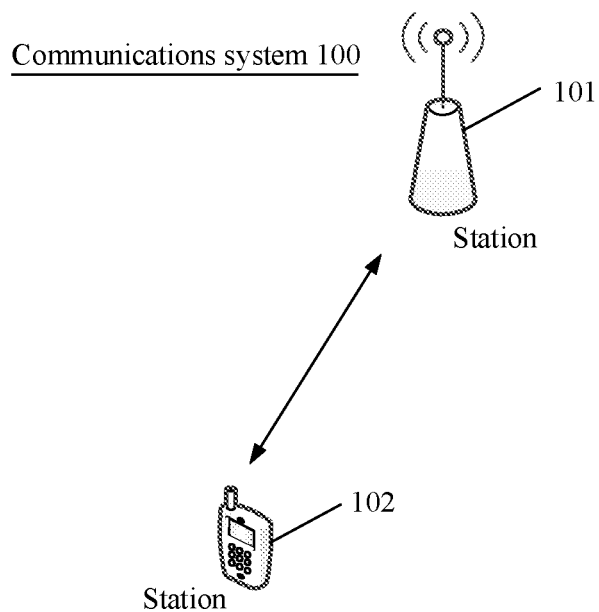
FIG. 3 is a schematic diagram of a frame format of a multiple BSSID element according to an embodiment of this application.
FIG. 4(a) is a schematic diagram of a structure of a communications system 100 according to an embodiment of this application.

A beacon frame sent by the transmitted AP may include a multiple BSSID element, a frame format of the multiple BSSID element is shown in FIG. 3, and the multiple BSSID element includes an element ID field, a length field, a maximum BSSID indicator field, and an optional sub-element field. The maximum BSSID indicator field is used to indicate a maximum quantity n of BSSIDs included in the multiple BSSID set, and the optional sub-element field includes BSSID information of an AP with a non-transmitted BSSID.

A maximum allowed quantity of APs in the multiple BSSID set is $2^N$, and N is a value indicated by a max BSSID indicator field in the multiple BSSID element shown in FIG. 3. Therefore, a bit 1 to a bit $2^{(N_n)}-1$ in a traffic indication virtual bitmap field may be respectively allocated to APs with a non-transmission BSSID in the multiple BSSID set, to respectively indicate whether APs that have a non-transmission BSSID and whose NonTxBSS IDs (identifiers) are 1 to $2^n-1$ have group addressed traffic. A value of the NonTxBSS ID is equal to a value of a BSSID index field in a multiple BSSID-index element in a non-transmitted BSSID profile in the multiple BSSID element. The non-transmitted BSSID profile is in the optional sub-element field.

Although embodiments of this application are mainly described by using an example in which an IEEE 802.11 network is deployed, a person skilled in the art easily understands that various aspects in this application may be extended to another network in which various standards or protocols are used, for example, Bluetooth, a high performance radio LAN (HIPERLAN) (which is a wireless standard similar to an IEEE 802.11 standard, and is mainly used in Europe), a wide area network (WAN), a wireless local area network (WLAN), a personal area network (PAN), or another network that is known currently or that is to be developed in the future. Therefore, the various aspects provided in this application are applicable to any suitable wireless network regardless of coverage and a wireless access protocol.

FIG. 4(a) describes, by using a wireless local area network as an example, a communications system 100 to which an embodiment of this application is applied. The communications system 100 includes a station 101 and a station 102. The station 101 may communicate with the station 102 through a plurality of links, to improve a throughput. The station 101 may be a multi-link device, and the station 102 may be a single-link device, a multi-link device, or the like. In a scenario, the station 101 is an AP MLD, and the station 102 is a STA MLD or a station (for example, a single-link station). In another scenario, the station 101 is a STA MLD, and the station 102 is an AP (for example, a single-link AP) or an AP MLD. In still another scenario, the station 101 is an AP MLD, and the station 102 is an AP MLD or an AP. In yet another scenario, the station 101 is a STA MLD, and the station 102 is a STA MLD or a STA (for example, a single-link station). Certainly, the wireless local area network may further include another device. A quantity of devices and types of the devices illustrated in FIG. 4(a) are merely an example.

Figure 4B:
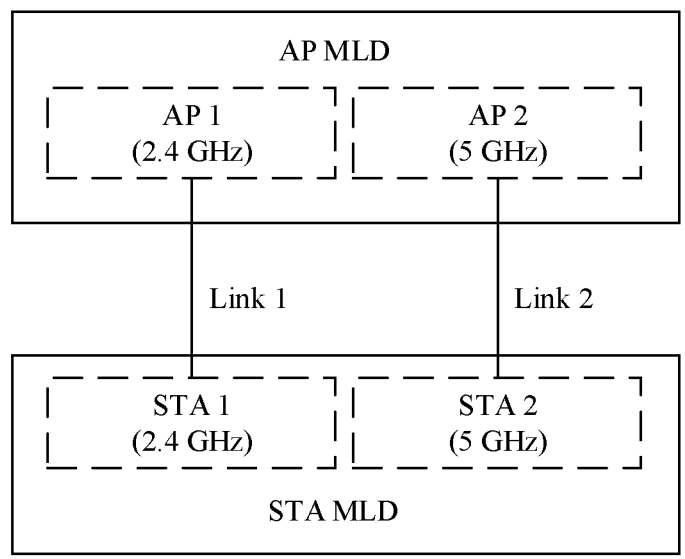
FIG. 4(b) is a schematic diagram of a structure of a communications system 200 according to an embodiment of this application.
Figure 4C:
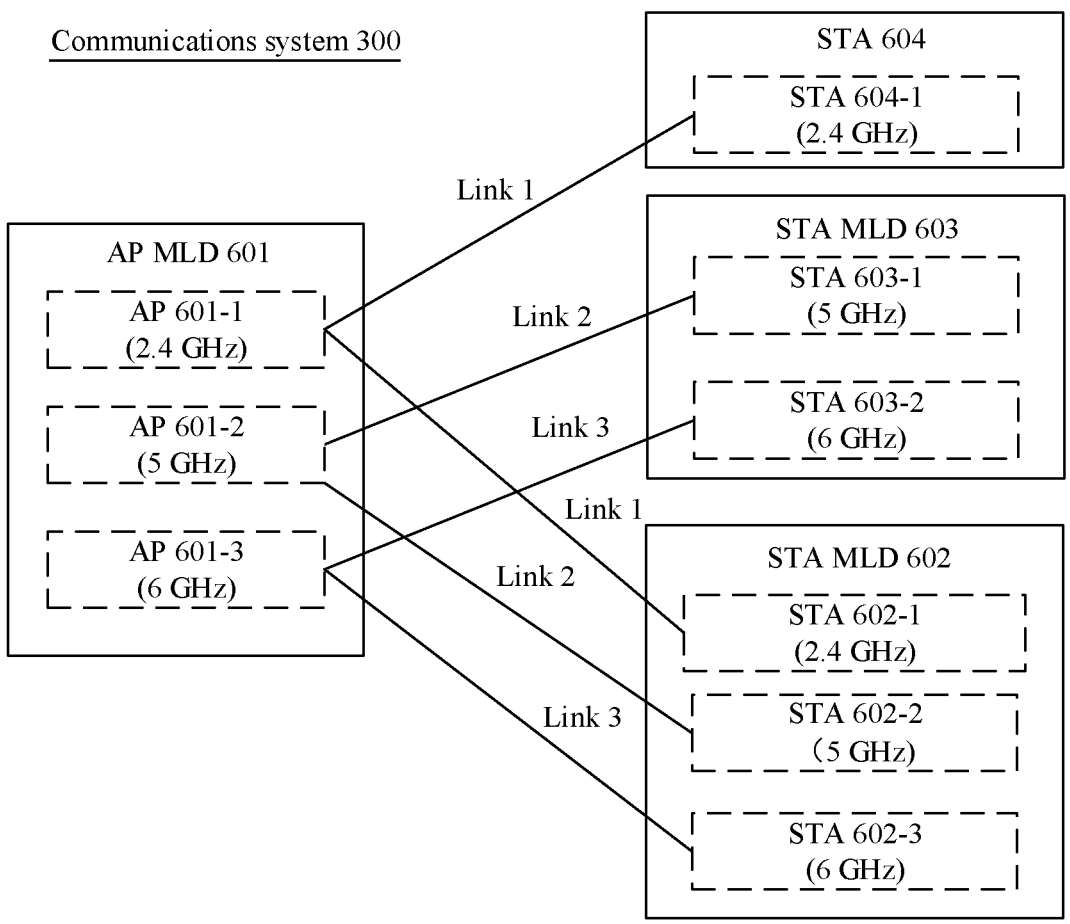
FIG. 4(c) is a schematic diagram of a structure of a communications system 300 according to an embodiment of this application.

FIG. 4(b) and FIG. 4(c) are respectively schematic diagrams of a structure of a communications system 200 and a structure of a communications system 300. The communications system 200 and the communications system 300 are described by using an example in which a multi-link device communicates with another device through a plurality of links in a wireless local area network.

FIG. 4(b) shows a scenario in which an AP MLD communicates with a STA MLD. The AP MLD includes an AP 1 and an AP 2 that are affiliated, the STA MLD includes a STA 1 and a STA 2 that are affiliated, and the AP MLD and the STA MLD communicate in parallel through a link 1 and a link 2.

FIG. 4(c) shows a scenario in which an AP MLD 601 communicates with a STA MLD 602, a STA MLD 603, and a STA 604. The AP MLD 601 includes an AP 601-1 to an AP 601-3 that are affiliated. The STA MLD 602 includes three affiliated STAs, namely, a STA 602-1, a STA 602-2, and a STA 602-3. The STA MLD 603 includes two affiliated STAs, namely, a STA 603-1 and a STA 603-2. A STA 604-1 and the STA 604 are single-link devices. The AP MLD 601 may separately communicate with the STA MLD 602 through a link 1, a link 2, and a link 3; communicate with the STA MLD 603 through the link 2 and the link 3; and communicate with the STA 604 through the link 1. In an example, the STA 604 operates on a frequency band of 2.4 GHz. In the STA MLD 603, the STA 603-1 operates on a frequency band of 5 GHz, and the STA 603-2 operates on a frequency band of 6 GHz. In the STA MLD 602, the STA 602-1 operates on the frequency band of 2.4 GHz, the STA 602-2 operates on the frequency band of 5 GHz, and the STA 602-3 operates on the frequency band of 6 GHz. The AP 601-1 operating on the frequency band of 2.4 GHz in the AP MLD 601 may transmit uplink or downlink data with the STA 604 and the STA 602-2 in the STA MLD 602 through the link 1. The AP 601-2 operating on the frequency band of 5 GHz in the AP MLD 601 may transmit, through the link 2, uplink or downlink data with a STA 603-1 operating on the frequency band of 5 GHz in the STA MLD 603, and may further transmit, through the link 2, uplink or downlink data with the STA 602-2 operating on the frequency band of 5 GHz in the STA MLD 602. The AP 601-3 operating on the frequency band of 6 GHz in the AP MLD 601 may transmit, through the link 3, uplink or downlink data with the STA 602-3 operating on the frequency band of 6 GHz in the STA MLD 602, and may further transmit, through the link 3, uplink or downlink data with the STA 603-2 in the STA MLD 603.

It should be noted that FIG. 4(b) only shows a case in which the AP MLD supports two frequency bands, and FIG. 4(c) only shows an example in which the AP MLD 601 supports three frequency bands (2.4 GHz, 5 GHz, and 6 GHz), each frequency band corresponds to one link, and the AP MLD 601 may operate on one or more links in the link 1, the link 2, or the link 3. On an AP side or a STA side, the link herein may alternatively be understood as a station operating on the link. In an actual application, the AP MLD and the STA MLD may further support more or fewer frequency bands. In other words, the AP MLD and the STA MLD may operate on more or fewer links. This is not limited in this embodiment of this application.

Figure 5:
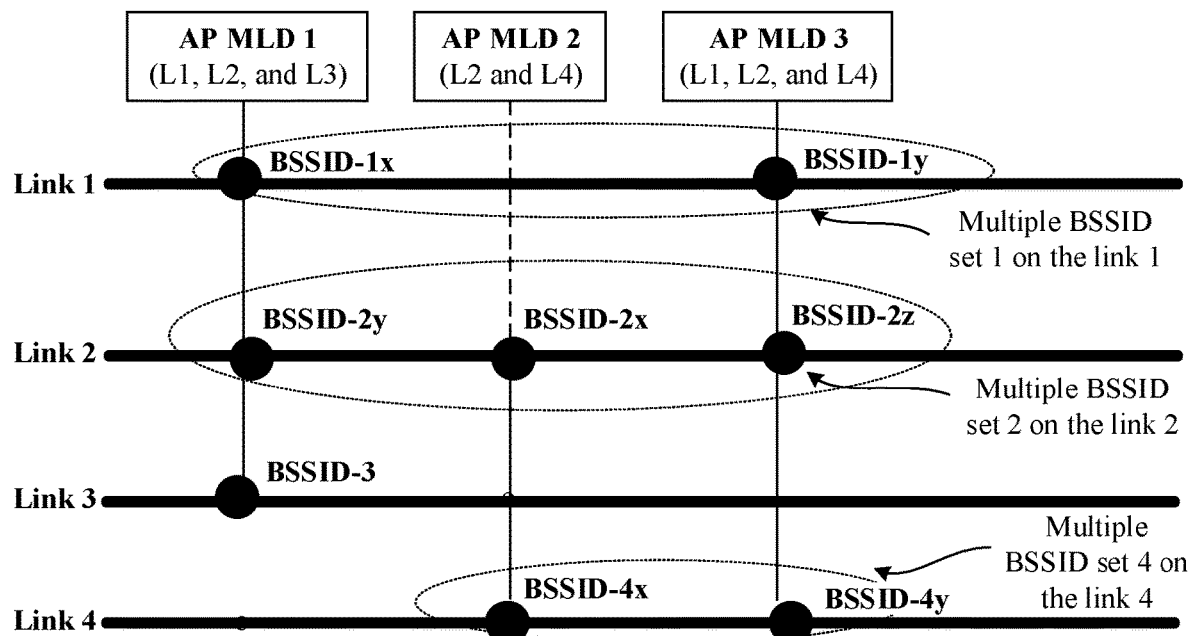
FIG. 5 is a schematic diagram of an architecture in which APs in a same multiple BSSID set in a plurality of multiple BSSID sets are not in a same AP MLD according to an embodiment of this application.

FIG. 5 is a schematic diagram of an architecture in which APs in a same multiple BSSID set in a plurality of multiple BSSID sets are not in a same AP MLD according to an embodiment of this application. In other words, each AP MLD shown in FIG. 5 is a set of co-located AP MLDs.

A BSSID-1x, a BSSID-1y, a BSSID-2x, a BSSID-2y, a BSSID-2x, a BSSID-2z, a BSSID-4x, a BSSID-4y, and a BSSID-3 each are a MAC address identifier, and each are used to identify a corresponding AP. An AP whose MAC address identifier ends with x is a transmitted BSSID AP, an AP whose MAC address identifier ends with y or z is a non-transmitted BSSID AP, and an AP whose MAC address identifier ends with only a number is a common AP. For example, a transmitted BSSID AP in a multiple BSSID set 1 is an AP 1x whose MAC address identifier is BSSID_1x, a non-transmitted BSSID AP in the multiple BSSID set 1 is an AP 1y whose MAC address identifier is BSSID_1y, a transmitted BSSID AP in a multiple BSSID set 2 is an AP 2x whose MAC address identifier is BSSID_2x, and non-transmitted BSSID APs in the multiple BSSID set 2 include an AP 2y whose address identifier is BSSID_2y and an AP 2z whose MAC address identifier is BSSID_2z.

A set of AP MLDs co-located with a reporting AP includes the following APs:
(1) All APs in a same AP MLD as the reporting AP, or all APs in an AP MLD in which the reporting AP is located;
(2) All APs in an AP MLD in which a non-transmitted AP in a same multiple BSSID set with the reporting AP is located, or all APs in an AP MLD in which a non-transmitted AP in a multiple BSSID set in which the reporting AP is located; and
(3) All APs in an AP MLD that meet the following two conditions, where the two conditions are respectively: (1) At least one AP in the AP MLD and one AP in an AP MLD in which the reporting AP is located are located in a same multiple BSSID set; and (2) No AP in the AP MLD operates on a same link as the reporting AP. In a special case, the AP MLD includes only one AP.

The reporting AP may be a common AP in an AP MLD or a transmitted AP in a multiple BSSID set, and can send group addressed traffic indication information described in this application.

For example, the AP 1x in FIG. 5 is used as the reporting AP. APs included in a set of AP MLDs co-located with the AP 1x include:
(1) All APs in a same AP MLD 1 as the AP 1x, namely, the AP 1x, the AP 2y, and an AP 3;
(2) All APs in an AP MLD 3 in which a non-transmitted AP (namely, the AP 1y) in a same multiple BSSID set 1 as the AP 1x is located, where the APs are respectively the AP 1y, the AP 2z, and an AP 4y; and
(3) APs in the AP MLD that meets the foregoing two conditions, namely, an AP MLD 2 in FIG. 5, where an AP 2x in the AP MLD 2 and the AP 2y in the AP MLD 1 are in a same multiple BSSID set 2, and no AP in the AP MLD 2 is on a same link as the AP 1x.

In the 802.11 protocol, a STA generally has two operating modes: a non-power-saving mode and a power-saving mode. When the STA operates in the non-power-saving mode, the STA is in an active state (active state, which may also be referred to as an awake state) regardless of whether there is to-be-transmitted data on the STA. When the STA operates in the power-saving mode, the STA may be in the active state when transmitting data with an AP. When there is no data transmission between the STA and the AP, the STA may be in a doze state to reduce power consumption. The STA may send a frame to the AP to notify whether the STA is in the power-saving mode. If a power-saving bit in a frame control field in a MAC header of the frame is set to 1, the AP is notified that the STA is in the power-saving mode. If the power-saving bit in the frame control field in the MAC header of the frame is set to 0, the AP is notified that the STA is in the non-power-saving mode.

Currently, a single-link device, for example, a station STA in a power-saving mode, periodically listens to a traffic indication map (TIM) beacon frame, and determines, based on a bit 0 in a bitmap control field in the TIM beacon frame, whether there is group addressed traffic after a delivery traffic indication map (DTIM) beacon frame. However, in a scenario of a multi-link device, if the bit 0 in the bitmap control field is also used to determine whether there is group addressed traffic after the DTIM beacon frame, in the communications system shown in FIG. 4(*a*) to FIG. 4(*c*), each STA in a STA MLD periodically listens to a TIM beacon frame on a link, and learns, based on a value of a bit 0 in a bitmap control field in the TIM beacon frame to which each STA listens, of whether an AP on the link sends group addressed traffic after sending a DTIM beacon frame. If there is group addressed traffic, the STA receives, after the corresponding DTIM beacon frame, the group addressed traffic sent by the AP. The group addressed traffic is sent immediately after the DTIM beacon frame, for example, after an SIFS (short inter-frame spacing) time period after the DTIM beacon frame ends.

Figure 6:
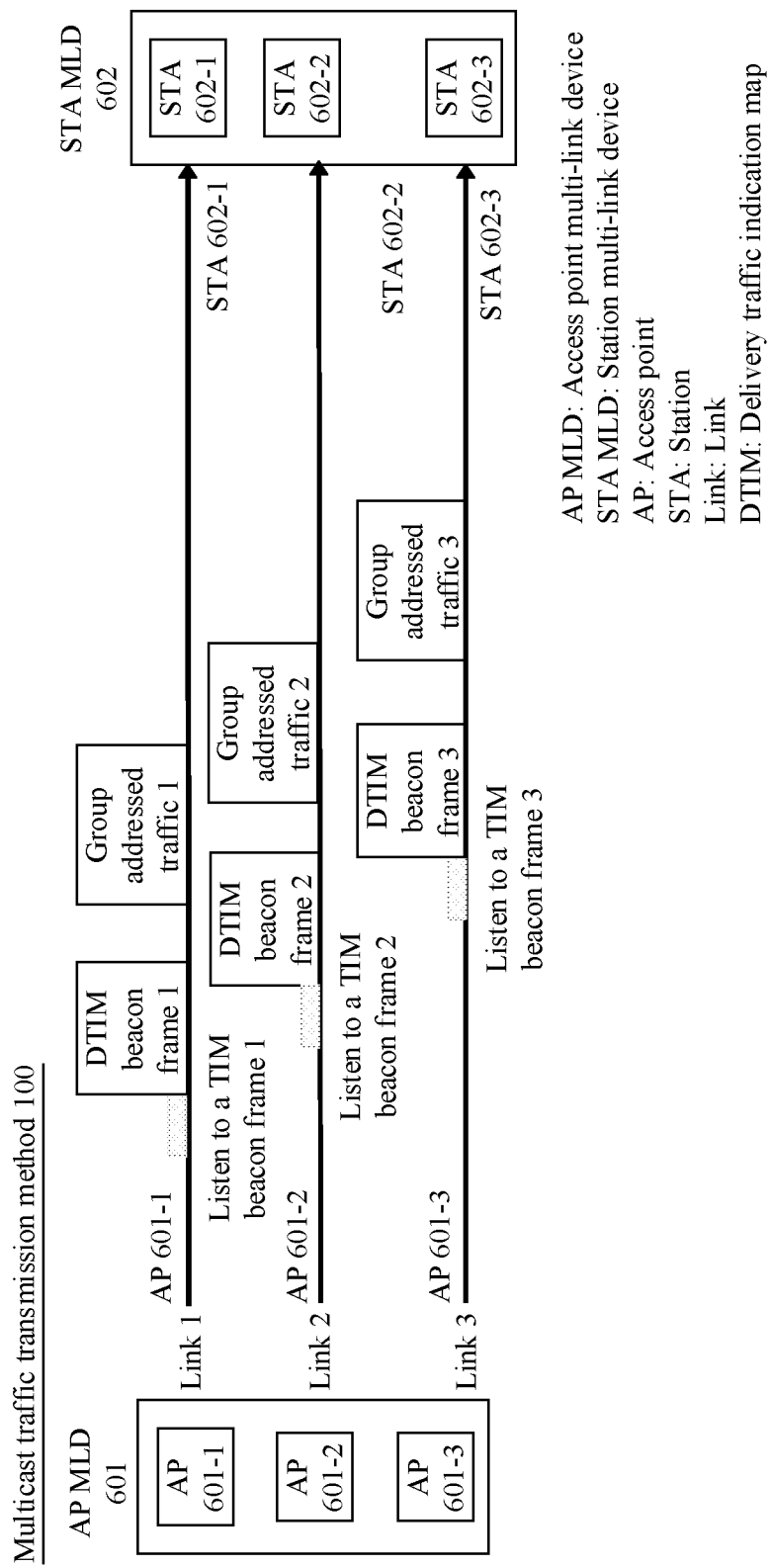
FIG. 6 is a schematic diagram of a group addressed traffic transmission method 100 according to an embodiment of this application.

In a group addressed traffic transmission method 100 shown in FIG. 6, communication between the AP MLD 601 and the STA MLD 602 in FIG. 4(*c*) is used as an example. The STA 602-1 in the STA MLD 602 listens to a TIM beacon frame 1 on a link 1, to learn, based on a bit 0 in a bitmap control field in the TIM beacon frame 1, of whether the AP 601-1 sends group addressed traffic 1 after a DTIM beacon frame 1. The STA 602-2 in the STA MLD 602 listens to a TIM beacon frame 2 on a link 2, to learn, based on a bit 0 in a bitmap control field in the TIM beacon frame 2, of whether the AP 601-2 sends group addressed traffic 2 after a DTIM beacon frame 2. The STA 602-3 in the STA MLD 602 listens to a TIM beacon frame 3 on a link 3, to learn, based on a bit 0 in a bitmap control field in the TIM beacon frame 3, of whether the AP 601-3 sends group addressed traffic 3 after a DTIM beacon frame 3. It can be learned that if a quantity of links of the STA MLD 602 continues to increase, power consumption of the STA MLD 602 greatly increases.

Therefore, how to reduce power consumption of the STA MLD becomes an urgent problem to be resolved.

According to the group addressed traffic transmission method applicable to a plurality of links provided in embodiments of this application, power consumption of the STA MLD can be reduced. The following provides detailed description with reference to accompanying drawings.

Embodiment 1 and Embodiment 2 are separately described in embodiments of this application. An AP (a common AP) that does not operate in a multiple BSSID set in an AP MLD may perform a group addressed traffic transmission method described in Embodiment 1. An AP operating in the multiple BSSID set in the AP MLD may perform a group addressed traffic transmission method described in Embodiment 2. A difference between the two methods is whether to indicate whether a plurality of APs in a second AP MLD have group addressed traffic. The second AP MLD is an AP MLD in which a non-transmitted AP in a multiple BSSID set in which a first AP is located.

Each bit in group addressed traffic indication information sent by one AP in the AP MLD is used to indicate whether a corresponding AP has group addressed traffic; or group addressed traffic indication information sent by one AP in the AP MLD is a part of bits in a partial virtual bitmap field in a TIM element, and each bit in the group addressed traffic indication information is used to indicate whether an AP identified by a corresponding AID has group addressed traffic.

The group addressed traffic may include a multicast management frame and a group addressed data frame, and a type of a frame is indicated by using a type field of a frame control field in a MAC header. In addition, the group addressed traffic may include a broadcast service and group addressed traffic. In other words, group addressed traffic sent by an AP is sent to a station associated with the AP or an associated station in a broadcast form or a multicast form.

In a same AP MLD, each AP independently sends a multicast management frame on a link on which the AP operates, and each AP sends, on a link on which the AP operates, a same group addressed data frame to each corresponding STA in a STA MLD associated with the AP. It can be understood that, the multicast management frame is at a link level, and the multicast management frame does not need to be received by a conventional station on another link or a STA MLD that is not associated on the link, to reduce power consumption of a corresponding station. However, each AP in the AP MLD sends a same group addressed data frame on each link, to avoid a case in which a station in a single radio STA MLD loses the group addressed data frame, or avoid a case in which a single radio STA MLD frequently switches a link to receive the group addressed data frame.

Embodiment 1

Figure 7:
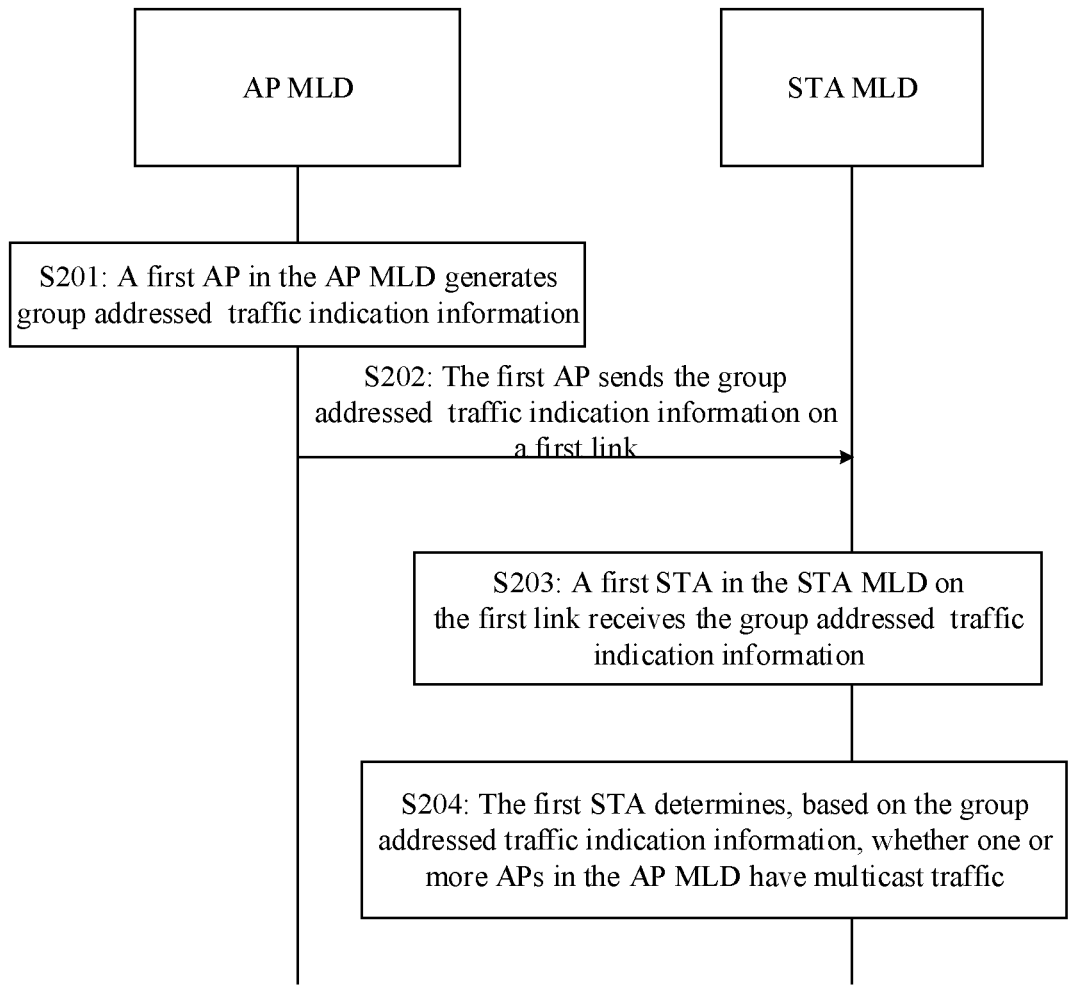
FIG. 7 is a schematic flowchart of a group addressed traffic transmission method 200 applicable to a plurality of links according to an embodiment of this application.

FIG. 7 shows a group addressed traffic transmission method 200 applicable to a plurality of links according to an embodiment of this application. The group addressed traffic transmission method 200 applicable to a plurality of links is described by using an example in which the group addressed traffic transmission method 200 applicable to a plurality of links is performed in a communications system including an AP MLD and a STA MLD. No AP in the AP MLD operates in a multiple BSSID set, the AP MLD includes one or more APs, and the first AP is any AP in a plurality of APs. The STA MLD includes one or more STAs, and the first STA is any STA in a plurality of STAs. As described above, a multi-link association may be established between the AP MLD and the STA MLD, and both the first AP and the first STA operate on a first link. The group addressed traffic transmission method 200 applicable to a plurality of links may include but is not limited to the following steps.

Step S201: The first AP in the AP MLD generates group addressed traffic indication information.

The group addressed traffic indication information may be referred to as a group addressed traffic indication field or a group addressed traffic indication. This is not limited in this embodiment of this application. Descriptions of the group addressed traffic indication information include the following two expressions: (1) The group addressed traffic indication information is used to indicate whether the one or more APs in the AP MLD have group addressed traffic; and (2) The group addressed traffic indication information is used to indicate whether the one or more APs in the AP MLD send group addressed traffic after a DTIM beacon frame. In still another example, the descriptions of the group addressed traffic indication information include the following expression: (3) The group addressed traffic indication information is used to indicate whether the one or more APs in the AP MLD buffer group addressed traffic. In this application, the group addressed traffic indication information is used to indicate that the group addressed traffic of the one or more APs in the AP MLD is not sent in a form of a group addressed AID. In this embodiment of this application, the expression (1) is used as an example for subsequent description. The group addressed traffic may include a multicast management frame and a group addressed data frame. In addition, the group addressed traffic may include a broadcast service and group addressed traffic. In other words, the group addressed traffic sent by the AP is sent to a station associated with the AP or an associated station in a broadcast form or in a multicast form.

In an optional implementation, the group addressed traffic indication information is used to indicate whether one AP in the AP MLD has group addressed traffic. The AP may be the first AP, or may be an AP in the AP MLD other than the first AP. For example, in FIG. 4(*c*), the first AP is the AP 601-1. Group addressed traffic indication information generated by the AP 601-1 may be used to indicate whether the AP 601-2 in the AP MLD 601 has group addressed traffic; or group addressed traffic indication information generated by the AP 601-1 may be used to indicate whether the AP 601-1 in the AP MLD 601 has group addressed traffic.

In another optional implementation, the group addressed traffic indication information is used to indicate whether a plurality of APs in the AP MLD have group addressed traffic. The plurality of APs may be some APs in the AP MLD, or may be all APs in the AP MLD. For example, in FIG. 4(*c*), the first AP is the AP 601-1, and the AP 601-1 generates group addressed traffic indication information. The group addressed traffic indication information may be used to indicate whether the AP 601-1 in the AP MLD 601 has group addressed traffic and whether the AP 601-2 has group addressed traffic; or the group addressed traffic indication information may be used to indicate whether the AP 601-1 in the AP MLD 601 has group addressed traffic, whether the AP 601-2 has group addressed traffic, and whether the AP 601-3 has group addressed traffic.

S202: The first AP sends the group addressed traffic indication information on the first link.

In this embodiment of this application, the group addressed traffic indication information may be carried in a management frame, for example, a beacon frame or a TIM frame; or the group addressed traffic indication information may be carried in another frame such as a data frame or a control frame.

S203: The first STA in the STA MLD receives the group addressed traffic indication information on the first link.

The first STA is a station managed by the first AP or a surrounding station. Stations around the first AP include the station managed by the first AP and a non-associated station. The following describes the group addressed traffic transmission method in this embodiment of this application by using a station managed by an AP as an example. Optionally, the first STA may be any station in the STA MLD, and may learn of whether each AP or some APs in the AP MLD have group addressed traffic. Therefore, any station in the STA MLD may receive the group addressed traffic indication information from an AP associated with the station.

S204: The first STA determines, based on the group addressed traffic indication information, whether the one or more APs in the AP MLD have group addressed traffic.

It can be learned that in this embodiment of this application, the group addressed traffic indication information sent by the first AP in the AP MLD can indicate whether one AP in the AP MLD has group addressed traffic, and the AP may be the first AP or an AP in the AP MLD other than the first AP, so that one STA in the STA MLD can learn of whether the first AP or another AP that is associated has group addressed traffic. Compared with a manner in which one STA in the STA MLD can only listen to whether an associated AP has group addressed traffic, in this embodiment of this application, one STA in the STA MLD may learn of whether the first AP or another AP in the AP MLD has group addressed traffic, to improve flexibility of notifying group addressed traffic by the AP MLD.

Alternatively, the group addressed traffic indication information sent by the first AP in the AP MLD can indicate whether each AP or some APs in the AP MLD have group addressed traffic, so that one station in the STA MLD can learn of whether the plurality of APs have group addressed traffic. Compared with a manner in which one STA in the STA MLD can only listen to whether an AP associated with the STA has group addressed traffic, in this embodiment of this application, power consumption of the STA MLD is reduced.

In an implementation, each bit in the group addressed traffic indication information corresponds to each AP in the AP MLD. A value of each bit is used to indicate whether an AP corresponding to the bit has group addressed traffic; or each bit is used to indicate whether an AP corresponding to the bit has group addressed traffic.

In another implementation, the group addressed traffic indication information is a part of bits in a partial virtual bitmap field in a TIM element. Each bit in the group addressed traffic indication information is used to indicate whether an AP with an AID corresponding to the bit has group addressed traffic. AIDs of all APs correspond to all bits in the group addressed traffic indication information. Because each bit in the partial virtual bitmap field in the TIM element corresponds to one AID, a corresponding AID is also allocated to each of the one or more APs in the AP MLD.

Correspondingly, S202 may be: The first AP sends the TIM element on the first link, and S203 may be: The first STA in the STA MLD receives the TIM element on the first link, and further, the first STA reads the group addressed traffic indication information in the partial virtual bitmap field from the TIM element, and determines whether the one or more APs in the AP MLD have group addressed traffic.

The TIM element may be carried in a beacon frame, or may be carried in another management frame, for example, a TIM frame. Optionally, for the beacon frame, the group addressed traffic indication information may only be carried in a DTIM beacon frame. Optionally, the group addressed traffic indication information may be carried in another frame such as a management frame, a data frame, or a control frame.

Figure 8:
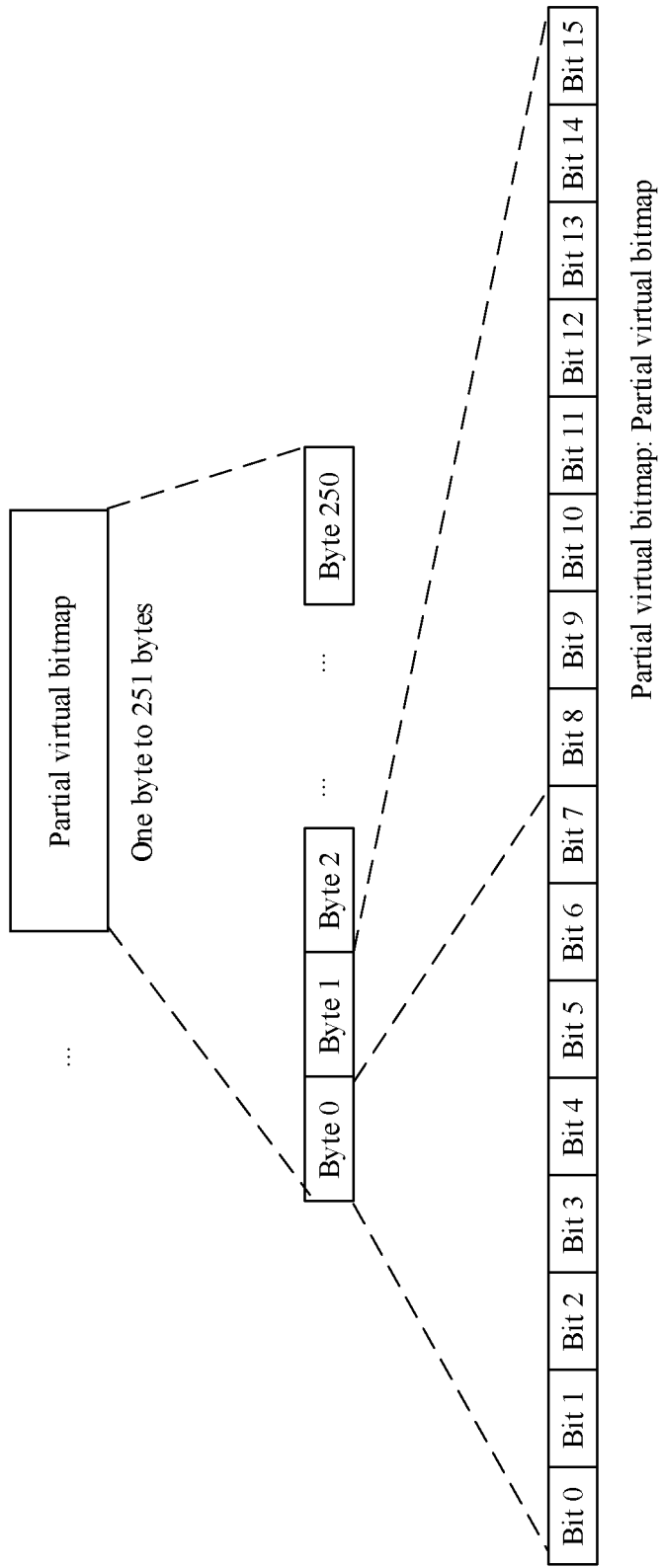
FIG. 8 is a schematic diagram of a partial virtual bitmap field according to an embodiment of this application.

For example, FIG. 8 shows bits of a partial virtual bitmap field in FIG. 2. For example, the partial virtual bitmap field includes 251 bytes, and each byte includes 8 bits. As shown in FIG. 8, a byte 0 includes a bit 0 to a bit 7; a byte 1 includes a bit 8 to a bit 15; . . . ; by analogy, a byte 250 includes a bit 2000 to a bit 2007.

In an example, the group addressed traffic indication information may be carried in any beacon frame, including a TIM beacon frame or a DTIM beacon frame. In this case, the DTIM beacon frame is a DTIM beacon frame after the TIM beacon frame.

For example, the AP MLD includes an AP 1, an AP 2, and an AP 3, the AP 1 sends group addressed traffic indication information, the group addressed traffic indication information is carried in a TIM beacon frame, the group addressed traffic indication information is used to indicate that the AP 1 and the AP 2 have group addressed traffic, and group addressed traffic of the AP 1 is sent after a DTIM beacon frame sent by the AP 1. The DTIM beacon frame is a DTIM beacon frame sent after the AP 1 sends a TIM beacon frame. The TIM beacon frame sent by the AP 1 carries the group addressed traffic indication information.

Optionally, the DTIM beacon frame is a next DTIM beacon frame after the TIM beacon frame. Group addressed traffic of the AP 2 is sent after a DTIM beacon frame sent by the AP 2, and the DTIM beacon frame is a DTIM beacon frame sent by the AP 2 after the AP 1 sends the TIM beacon frame carrying the group addressed traffic indication information.

Optionally, the DTIM beacon frame is a next DTIM beacon frame after the TIM beacon frame, or a DTIM beacon frame carrying the group addressed traffic indication information. For example, the AP MLD includes an AP 1, an AP 2, and an AP 3, the AP 1 sends group addressed traffic indication information, the group addressed traffic indication information is carried in a DTIM beacon frame, the group addressed traffic indication information is used to indicate that the AP 1 and the AP 2 have group addressed traffic, group addressed traffic of the AP 1 is sent after a DTIM beacon frame sent by the AP 1, group addressed traffic of the AP 2 is sent after a DTIM beacon frame sent by the AP 2, the DTIM beacon frame sent by the AP 2 is sent by the AP 2 after the AP 1 sends the DTIM beacon frame carrying the group addressed traffic indication information. Optionally, the DTIM beacon frame sent by the AP 2 is a next DTIM beacon frame (sent by the AP 2) after the DTIM beacon frame sent by the AP 1. In another example, the group addressed traffic indication information on the first link is carried only in a DTIM beacon frame in a beacon frame on the first link. In this case, for a group addressed traffic sending method, refer to the foregoing related implementation of "the DTIM beacon frame carries the group addressed traffic indication information".

Optionally, the group addressed traffic indication information may alternatively be carried in the another frame such as the management frame, the data frame, or the control frame.

It can be learned that, in this implementation, a part of bits in a partial virtual bitmap field in a beacon frame are used to indicate whether a plurality of APs have group addressed traffic, to improve flexibility of notifying group addressed traffic, and further reduce power consumption of the STA MLD.

To indicate whether the one or more APs in the AP MLD have group addressed traffic, before generating the group addressed traffic indication information, the first AP in the AP MLD further allocates a corresponding bit in the group addressed traffic indication information to each AP, or allocates a corresponding AID to each AP. Therefore, how to allocate a corresponding bit to each AP or how to allocate a corresponding AID to each AP in the foregoing two implementations are respectively described in the following two implementations.

Implementation 1: How to allocate the bit corresponding to each AP in group addressed traffic indication information is described.

In Implementation 1, in Implementation 1.1, bits corresponding to each AP in the AP MLD in the group addressed traffic indication information on different links are the same. In other words, bits corresponding to each AP on different links are unique. In Implementation 1.2, bits corresponding to each AP in the AP MLD in the group addressed traffic indication information on different links are independently allocated. In other words, corresponding bits in group addressed traffic indication information sent by a same AP in the AP MLD on different links may be the same or may be different. The following separately provides descriptions by using Implementation 1.1 and Implementation 1.2 as examples.

Implementation 1.1: The bits corresponding to each AP in the AP MLD in the group addressed traffic indication information on different links are the same, and are uniformly allocated.

Optionally, the bit corresponding to each AP in the AP MLD in the group addressed traffic indication information is implicitly allocated. For example, each bit in the group addressed traffic indication information corresponds to each AP in the AP MLD based on a value of a link identifier or a MAC address of each AP in the AP MLD. For another example, for the APs corresponding to all the bits in the group addressed traffic indication information, allocation is sequentially performed in a sequence of AP information carried in a multi-link association response frame returned by the AP MLD or a management frame sent by the AP MLD, or the like. This is not limited in this application.

Optionally, the bit corresponding to each AP in the AP MLD in the group addressed traffic indication information is explicitly allocated. For example, one AP in the AP MLD broadcasts, by sending an association response frame, another management frame, or the like, the bit corresponding to each AP in the group addressed traffic indication information.

In other words, a value order of a bit in the group addressed traffic indication information corresponds to a value order of the link identifier or the MAC address, the link identifier is a link identifier corresponding to each AP in the AP MLD, and the MAC address is a MAC address corresponding to each AP in the AP MLD.

For example, the AP MLD 601 includes three APs, the group addressed traffic indication information is three bits, and the three bits respectively correspond to the three APs in descending order of link identifiers of links on which the three APs operate. It is assumed that the link identifiers of the links on which the three APs operate are as follows: If a link identifier of the AP 601-1 is 3, a link identifier of the AP 601-2 is 2, and a link identifier of the AP 601-3 is 1, a first bit in the group addressed traffic indication information corresponds to the AP 601-1, a second bit in the group addressed traffic indication information corresponds to the AP 601-2, and a third bit in the group addressed traffic indication information corresponds to the AP 601-3. If the group addressed traffic indication information is 011, it indicates that the AP 601-1 has no group addressed traffic, and the AP 601-2 and the AP 601-3 have group addressed traffic.

Optionally, in this example, the three bits may alternatively respectively correspond to the three APs in ascending order of the link identifiers of the links on which the three APs operate.

Implementation 1.2: The bits corresponding to each AP in the AP MLD in the group addressed traffic indication information on different links are independently allocated.

Optionally, the bit corresponding to each AP in the AP MLD in the group addressed traffic indication information is implicitly allocated or explicitly allocated. Optionally, that the bit corresponding to each AP in the AP MLD in the group addressed traffic indication information is implicitly allocated may be: The bits corresponding to all the APs in the AP MLD in the group addressed traffic indication information may be sequentially determined based on the value of the link identifier or the MAC address of each AP. Optionally, that the bit corresponding to each AP in the AP MLD in the group addressed traffic indication information is explicitly allocated may be: The AP MLD may broadcast, by using an association response frame or a management frame, the bit corresponding to each AP in the AP MLD in the group addressed traffic indication information.

Bits corresponding to a same AP in the AP MLD in the group addressed traffic indication information on different links may be different, and are mutually independently allocated. Therefore, when all the APs in the AP MLD correspond to same group addressed traffic, different APs in the AP MLD may send different group addressed traffic indication information on different links.

For example, the AP MLD 601 includes three APs, the three APs are respectively the AP 601-1, the AP 601-2, and the AP 601-3. Link identifiers of links on which the three APs respectively operate are sequentially a link identifier 3 of the AP 601-1, a link identifier 2 of the AP 601-2, and a link identifier 1 of the AP 601-3 in descending order.

Before the AP 601-1 sends group addressed traffic indication information on a link 1 on which the AP 601-1 operates, the AP 601-1 allocates corresponding bits to the three APs in descending order of the link identifiers of the three APs. In other words, a first bit in the group addressed traffic indication information corresponds to the AP 601-1, a second bit corresponds to the AP 601-2, and a third bit corresponds to the AP 601-3. Therefore, if the AP 601-1 has no group addressed traffic, and the AP 601-2 and the AP 601-3 have group addressed traffic, the group addressed traffic indication information sent by the AP 601-1 on the link 1 is 011.

Before the AP 601-2 sends group addressed traffic indication information on a link 2 on which the AP 601-2 operates, the AP 601-2 allocates corresponding bits to the three APs in ascending order of the link identifiers of the three APs. In other words, a first bit in the group addressed traffic indication information corresponds to the AP 601-3, a second bit corresponds to the AP 601-2, and a third bit corresponds to the AP 601-1. Therefore, if the AP 601-1 has no group addressed traffic, and the AP 601-2 and the AP 601-3 have group addressed traffic, the group addressed traffic indication information sent by the AP 601-2 on the link 2 is 110.

Implementation 1.3

In another implementation, bits in the group addressed traffic indication information are in a one-to-one correspondence with all links (in other words, all the APs in the AP MLD). For example, each bit in the group addressed traffic indication information is used together with each link identifier. Optionally, each bit in the group addressed traffic indication information is located in a target beacon transmission time (TBTT) information field in a reduced neighbor report (RNR) element. Specifically, an MLD (multi-link device) parameter field shown in FIG. 8a is added to the TBTT information field, and the MLD parameter field includes a multi-link device identifier (MLD ID), a link identifier (link ID), a change sequence number (change sequence), and a group addressed traffic indication. The multi-link device identifier is used to indicate an identifier of an MLD in which a reported AP is located, the link identifier is used to identify a sequence number of the reported AP in the AP MLD, the change sequence number is used to indicate a key BSS parameter update count value of the reported AP, the group addressed traffic indication is used to indicate whether the reported AP has group addressed traffic, and a group addressed traffic traffic flag may occupy 1 bit.

Optionally, the group addressed traffic may include a multicast management frame service and a group addressed data frame service. In an implementation, two fields are respectively used to indicate the multicast management frame service and the group addressed data frame service. For example, the two fields each occupy 1 bit, are specifically a multicast management frame service indication and a group addressed data frame service indication, and are respectively used to indicate whether the reported AP has a corresponding multicast management frame service and a group addressed data frame service. In another implementation, only one of the multicast management frame service and the group addressed data frame service may be indicated, and only one field needs to be used for indication. For example, a multicast management frame service indication field is used to indicate whether the reported AP has a corresponding multicast management frame service, or a group addressed data frame service indication field is used to indicate whether the reported AP has a corresponding group addressed data frame service.

Optionally, an AP that sends group addressed traffic indication information may still indicate, in an existing method, to be specific, by using a bit 0 in a bitmap control field in a TIM element, whether the AP has downlink group addressed traffic. [001%] Usually, the RNR element is used by a non-associated station to discover an element of a surrounding AP, and an associated station may neglect to interpret the RNR element. Therefore, this embodiment of this application provides a method for indicating whether a group addressed traffic indication exists in an RNR element. In other words, the method is implemented based on a capability information field in a beacon frame or a probe response frame. The group addressed traffic flag is added to the capability information field in the probe response frame, to indicate whether the RNR element indicates that at least one reported AP has group addressed traffic. The group addressed traffic flag may be indicated by using 1 bit. For example, 1 bit of the group addressed traffic flag is set to 1, to indicate that at least one reported AP has group addressed traffic. In an equivalent alternative solution, 1 bit may be set to 0, to indicate that at least one reported AP has group addressed traffic. For details, refer to FIG. 8b. The group addressed traffic flag is added to the capability information field. When a value of the group addressed traffic flag indicates "group addressed traffic exists", an associated station or a non-associated station may be indicated to interpret the RNR element. The capability information field shown in FIG. 8b may further include a change sequence number updated flag (CSN updated flag), and the change sequence number updated flag is used to indicate whether a change sequence number field value of the reported AP changes. When the change sequence number updated flag indicates that a change sequence number field value of at least one reported AP changes, an associated station or a non-associated station may be indicated to interpret the RNR element.

Alternatively, in another implementation, as shown in FIG. 8c, an RNR flag is added to a capability element, to indicate whether a change sequence number field value of at least one reported AP changes or group addressed traffic exists, in other words, indicate a station to interpret an RNR element. The RNR flag may be indicated by using 1 bit. When a value of the RNR flag is set to 1, it indicates that at least one reported AP has group addressed traffic, or it indicates that a change sequence number field value of at least one reported AP changes, to indicate that an associated station or a non-associated station interprets the RNR element. Certainly, in an equivalent alternative solution, that the value of the RNR flag is set to 1 may alternatively be that the value of the RNR flag is 0, to indicate that at least one reported AP has group addressed traffic, or indicate that a change sequence number field value of at least one reported AP changes.

In the two implementations shown in FIG. 8b and FIG. 8c, the capability information field further includes fields such as an ESS (extended service set), an IBSS (independent basic service set), privacy, a short preamble, spectrum management, QoS (quality of service), short slot time, APSD (automatic power save delivery), radio measurement (radio management), and EPD (Ethertype Protocol Discrimination). For details, refer to the 802.11REVmd D3.0 protocol. At a station end, for example, an associated station or an associated station MLD may select, based on a 1-bit group addressed traffic flag or a 1-bit RNR flag added to a capability element in a beacon frame or a probe response frame, whether to parse the RNR element; or consider by default that the RNR element is always parsed.

For better understanding of this embodiment of this application, the RNR element mentioned in the foregoing embodiment is described as follows:

Reduced neighbor report element (Reduced Neighbor Report element): An AP uses a management frame, for example, a beacon frame or a probe response frame, to carry the reduced neighbor report element. During scanning, a STA receives a management frame sent by an AP, to obtain information about a surrounding AP based on the reduced neighbor report element in the management frame, and then selects a proper AP for association.

Figure 8D:
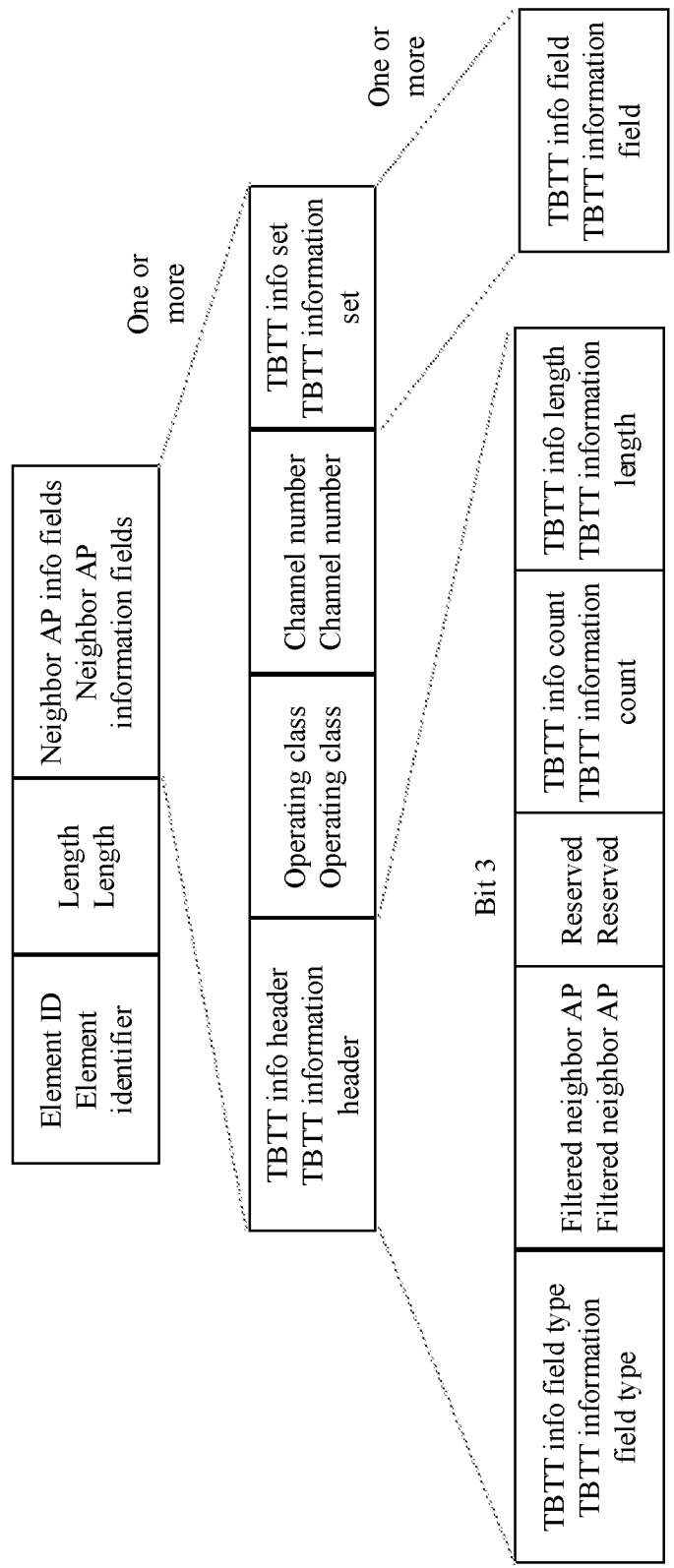
FIG. 8d is a schematic diagram of an RNR element in a group addressed traffic transmission method applicable to a plurality of links according to an embodiment of this application.

Specifically, the RNR element usually carries one or more neighbor AP information (Neighbor AP info) fields, and is used to describe information about one or more neighbor APs and BSSs to which the neighbor APs respectively belong. The information is referred to as reduced information of the neighbor APs below. FIG. 8d shows an indication format. A field included in the reduced neighbor report element is shown in the figure.

A TBT information header (target beacon transmission time (TBIT) info Header) field carries the following information:

a TBIT information field type (TBT info Field Type) field, where the TBIT information field type field indicates a type of TBT information (TBIT info), and the TBIT information field type field and a TBIT information length (TBIT info length) field are used together to indicate a format of a TBTT info field;

a filtered neighbor AP (Filtered neighbor AP) field, where the filtered neighbor AP field indicates whether SSIDs of all BSSs carried in the neighbor AP information (Neighbor AP info) field match an SSID in the probe request frame;

a reserved (Reserved) field (1 bit);

a TBTT information count (TBTT info count) field, where the TBTT information count field indicates a quantity of TBTT information fields (TBTT info field) included in a TBTT information set (TBTT info set); and a TWIT information length (TBTT info Length) field, where the TBTT information length field indicates a length of each TBTT info field, and formats of specific information carried in a case of different lengths are shown in Table 1:

TABLE 1

| TBTT information length (bytes) | Content carried in a TBTT information field |
|---|---|
| 1 | Neighbor AP TBTT offset field |
| 2 | Neighbor AP TBTT offset field and BSS parameter field |
| 5 | Neighbor AP TBTT offset field and a short SSID field |
| 6 | Neighbor AP TBTT offset field, a short SSID field, and a BSS parameter field |
| 7 | Neighbor AP TBTT offset field and a BSSID field |
| 8 | Neighbor AP TBTT offset field, a BSSID field, and a BSS parameter field |
| 11 | Neighbor AP TBTT offset field, a BSSID field, and a short SSID field |
| 12 | Neighbor AP TBTT offset field, a BSSID field, a short SSID field, and a BSS parameter field |
| 13 | Neighbor AP TBTT offset field, a BSSID field, a short SSID field, and a BSS parameter field, and a 20 MHz power spectrum density field |
| 0, 9, and 10 | Reserved |
| 14-255 | Reserved, where information about first 13 bytes is the same as a field carried when a TBTT information length is 13 |

As shown in FIG. 8e, a specific format that is of the TWIT information (TWIT info) field and that exists when the TBT information length is 12 bytes is provided below:

A neighbor AP target beacon transmission time offset (Neighbor AP TBTT offset) field indicates a beacon transmission time offset between a neighbor AP and a reporting AP.

A BSS identifier (BSSID) field indicates a BSS identifier corresponding to the neighbor AP.

A short service set identifier (Short SSID) field indicates an identifier of a service set to which the neighbor AP belongs.

20 MHz power spectrum density indicates a transmit power in a default case, namely, a power spectrum density (PSD) equivalent isotropically radiated power (EIRP) whose unit is dBm/MHz.

A BSS parameter field indicates a related parameter of the neighbor AP. As shown in FIG. 8e, the BSS parameter field includes the following information:

An on-channel tunneling recommended (OCT recommended) field indicates that the neighbor AP expects to exchange an MPDU of a management type based on an OCT mechanism.

A same service set identifier (Same SSID) field indicates whether the neighbor AP and the reporting AP have a same SSID.

A multiple basic service set identifier (Multiple BSSID) field indicates whether the neighbor AP is a part of a multiple BSSID set.

A transmitted basic service set identifier (Transmitted BSSID) field further indicates, if the neighbor AP is part of a multiple BSSID set, whether the neighbor AP is a transmitted BSSID or a non-transmitted BSSID.

A member of an extended service set with a 2.4/5 GHz co-located AP (Member Of ESS With 2.4/5 GHz Co-Located AP) field indicates whether the neighbor AP is co-located with one 2.4/5 GHz AP (in other words, indicates whether the neighbor AP is a 6 GHz-only AP) and is a member of one extended service set.

An unsolicited probe response active field indicates whether the neighbor AP enables an unsolicited probe response.

A co-located AP field indicates whether the neighbor AP and the reporting AP are co-located.

In still another implementation, each bit in the group addressed traffic indication information is located in a multi-link element. The bit in the group addressed traffic indication information is located in an MLD common information field in the multi-link element, or each bit in the group addressed traffic indication information is located in a single station information field. A station control field in the station information field includes a link identifier field. The multi-link element includes an element identifier, a length, an element identifier extension, multi-link control, MLD common information, and one or more station information fields. In addition, the MLD common information field includes a multi-link device address subfield, and the station information field includes a station control subfield.

Optionally, in Implementation 1, a quantity of bits in the group addressed traffic indication information may be a fixed value, and in the fixed quantity of bits, a bit other than bits corresponding to a quantity of APs may be set to 0 by default. For example, the quantity of bits are fixed to four bits. Three bits starting from a most significant bit correspond to three APs in the AP MLD, and one subsequent bit is set to zero. In other words, the fixed quantity of bits may be greater than a quantity of APs in the AP MLD.

Optionally, in Implementation 1, the first AP may be referred to as a reporting AP, and the reporting AP may reuse the bit 0 in the bitmap control field shown in FIG. 2 to indicate whether the reporting AP has group addressed traffic. Therefore, in Implementation 1, an additional bit may not be necessarily allocated to the reporting AP.

Optionally, in Implementation 1, the reporting AP may reuse a bit corresponding to an AID allocated to a non-transmitted AP in the AP MLD in the multi-BSSID set, to indicate whether the non-transmitted AP has group addressed traffic. Therefore, an additional bit may not be necessarily allocated to the non-transmitted AP in the AP MLD.

Implementation 2: The group addressed traffic indication information is a part of bits in the partial virtual bitmap field in the TIM element, and how to allocate an AID corresponding to each AP is described.

To be specific, each bit in the group addressed traffic indication information is used to indicate whether an AP with an AID corresponding to the bit has group addressed traffic. AIDs of all APs correspond to all bits in the group addressed traffic indication information. Because each bit in the partial virtual bitmap field in the TIM element corresponds to one AID, a corresponding AID is also allocated to each of the one or more APs in the AP MLD.

Optionally, there are at least two manners of allocating the AID corresponding to each AP in the AP MLD. Implementation 2.1: AIDs corresponding to each AP in the AP MLD on different links are uniformly allocated, and AIDs corresponding to each AP on different links are the same or unique. Implementation 2.2: AIDs corresponding to each AP in the AP MLD on different links are independently allocated. In other words, AIDs corresponding to a same AP in the AP MLD on different links may be the same or different. The following separately provides descriptions by using Implementation 2.1 and Implementation 2.2 as examples.

In Implementation 2.1, the AIDs corresponding to each AP in the AP MLD on different links are uniformly allocated, and the AIDs corresponding to a same AP in the AP MLD on different links may be different. For example, on a specific link, a bit 0 of a reporting AP in a bitmap control field may be reused, or an AID allocated to a non-transmitted AP in a multiple BSSID set in which the non-transmitted AP is located may be reused. Consequently, AIDs corresponding to another AP on different links may be different.

Implementation 2.1: The AIDs corresponding to all the APs in the AP MLD are uniformly allocated and are unique.

In Implementation 2.1, there may be implicit allocation and explicit allocation based on a specific allocation manner of the AID corresponding to each AP. In Implementation 2.1.1, the AIDs corresponding to all the APs in the AP MLD are explicitly and uniformly allocated. In Implementation 2.1.2, the AIDs corresponding to all the APs in the AP MLD are implicitly and uniformly allocated.

Implementation 2.1.1: The AIDs corresponding to each AP in the AP MLD on different links are explicitly and uniformly allocated.

This application provides an AID allocation method, and the AID allocation method includes but is not limited to the following steps:

The first AP in the AP MLD generates association identifier configuration information, where the association identifier configuration information is used to indicate an association identifier corresponding to each AP in the AP MLD or an AP other than the first AP; and the first AP sends the association identifier configuration information on the first link.

Because the AIDs corresponding to each AP in the AP MLD on all links are the same, each AP in the AP MLD may send the association identifier configuration information. The association identifier configuration information includes association identifier subconfiguration information corresponding to each AP, the association identifier subconfiguration information includes an AID of the AP, and the association identifier subconfiguration information and a link identifier of the AP are used together.

Optionally, when the AP MLD and the STA MLD are not associated, the association identifier configuration information may be carried in an association response frame sent by the AP MLD. Optionally, when the AP MLD and the STA MLD are associated, the association identifier configuration information may be carried in a management frame sent by the AP MLD.

The group addressed traffic indication information is a part of bits in the partial virtual bitmap. Because the AP MLD explicitly allocates an AID to each AP in the AP MLD, the part of bits may be consecutive or inconsecutive.

In an implementation, the group addressed traffic indication information is the part of consecutive bits in the partial virtual bitmap field. For example, the group addressed traffic indication information is a bit 1 to a bit 7 in the partial virtual bitmap field in FIG. 8. In other words, the bit 1 to the bit 7 in the partial virtual bitmap field may be used to indicate whether each AP in the AP MLD has group addressed traffic.

In another implementation, the group addressed traffic indication information is some inconsecutive bits in the partial virtual bitmap field. For example, the group addressed traffic indication information is a bit 1, a bit 2, and a bit 4 in the partial virtual bitmap field in FIG. 8. In other words, the bit 1, the bit 2, and the bit 4 in the partial virtual bitmap field may be used to indicate whether each AP in the AP MLD has group addressed traffic.

The first AP that generates and sends the association identifier configuration information and the first AP that generates and sends the group addressed traffic indication information in step S201 may be a same AP in the AP MLD, or may be different APs in the AP MLD.

The association identifier subconfiguration information corresponding to each AP in the association identifier configuration information may be carried in a sub-element or a subfield that stores information about a single AP in the MLD element.

Figure 9:
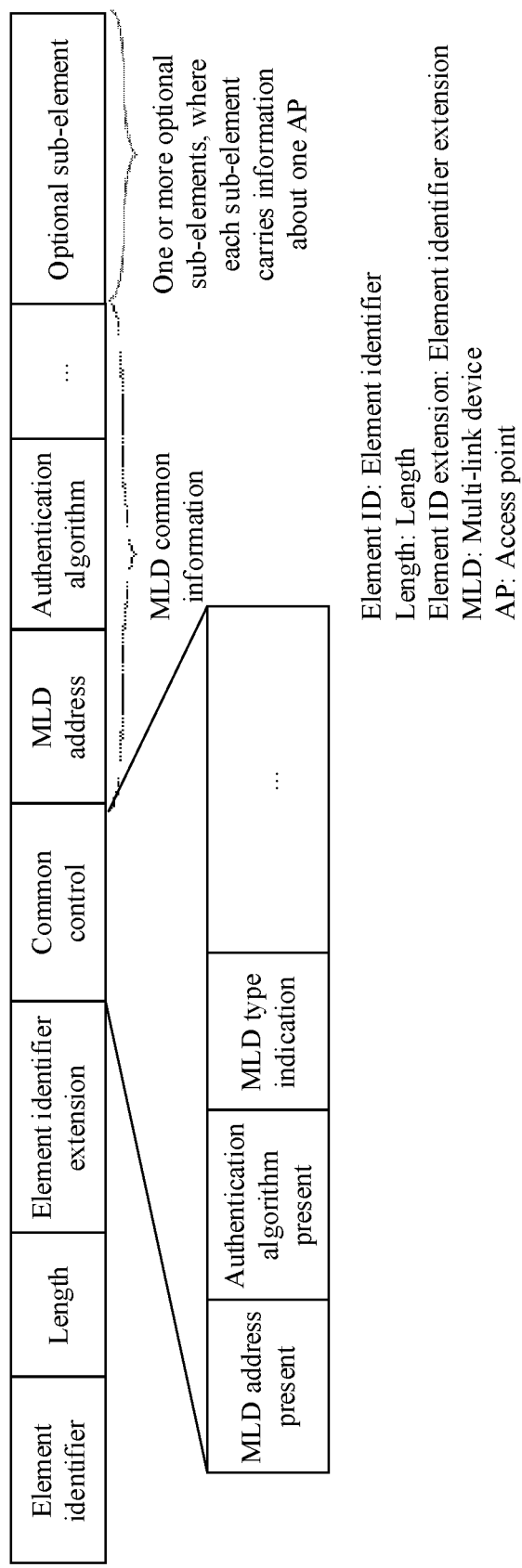
FIG. 9 is a schematic diagram of a structure of an MLD element according to an embodiment of this application.

FIG. 9 is a schematic diagram of a structure of an MLD element according to an embodiment of this application. As shown in FIG. 9, the MLD element includes an element ID (element ID), a length (length), an element ID extension (element ID extension) field, a common control field, an MLD common information field, and one or more optional sub-elements.

The common control field includes one or more fields in an MLD type indication field, an MLD address present field, and an authentication algorithm present field. The authentication algorithm present field is used to indicate whether an authentication algorithm field exists in an MLD common information field. The MLD common information field further includes an MLD address field.

The MLD element shown in FIG. 9 further includes one or more sub-elements, and one sub-element describes information about one AP in the AP MLD. One sub-element in a formal MLD element is used to describe information about another AP that belong to a same MLD as the reporting AP. One sub-element in a virtual MLD element is used to describe information about one AP in an MLD indicated by the MLD address field. One sub-element in a special MLD element is used to describe information about one single-link AP in a plurality of multiple BSSID sets each including various APs in the AP MLD.

Content of each sub-element includes a link identifier of one AP. Optionally, content of each sub-element further includes a field related to the AP, for example, an SSID field, a timestamp field, a beacon interval field, and an element of the AP. The element of the AP may include a BSS load element, an EHT capability element, and an EHT operation element In this implementation, the association identifier subconfiguration information corresponding to each AP may be carried in a sub-element or a subfield that stores information about the AP in the MLD element. For example, one sub-element in the MLD element includes a link identifier and one piece of association identifier subconfiguration information of one AP. The association identifier subconfiguration information is used to indicate an AID allocated to the AP.

It can be learned that the AIDs corresponding to all the APs in the AP MLD are explicitly and uniformly allocated in Implementation 2.1.1, to help indicate, based on a bit corresponding to an allocated AID in the partial virtual bitmap field, whether each AP has group addressed traffic. Therefore, when power consumption of the STA MLD is reduced, group addressed traffic indication flexibility is improved.

Implementation 2.1.2: The AIDs corresponding to each AP in the AP MLD on different links are implicitly and uniformly allocated.

The AIDs of all the AP in the AP MLD are continuously allocated by using an AID x as a start. The AID x is pre-defined. Correspondingly, allocation of the AIDs of all the APs in the AP MLD ends by using an AID y as an end, and the AID y is determined based on a quantity of APs in the AP MLD, or is determined based on a quantity of APs for which whether the APs have group addressed traffic is indicated in the AP MLD.

Optionally, the AIDs of all the APs in the AP MLD are sequentially and continuously allocated in descending order or ascending order of values of link identifiers or MAC addresses of all the APs in the AP MLD by using the AID x as a start and by using the AID y as an end.

Because the group addressed traffic indication information is a part of bits in the partial virtual bitmap field in the TIM element, the implementation may alternatively be expressed as follows: A start bit or a first bit corresponding to the group addressed traffic indication information in the partial virtual bitmap field in the TIM element is a bit x. The bit x is pre-defined. Correspondingly, an end bit or a last bit corresponding to the group addressed traffic indication information in the partial virtual bitmap field in the TIM element is determined based on the quantity of APs in the AP MLD, or is determined based on the quantity of APs for which whether the APs have group addressed traffic is indicated in the AP MLD. Each bit in the partial virtual bitmap field in the TIM element is in a one-to-one correspondence with one AID. For a specific method, refer to the 802.11-2016 protocol.

Optionally, AIDs of the APs corresponding to all bits in the group addressed traffic indication information are sequentially and continuously allocated in descending order or ascending order of values of link identifiers or MAC addresses of all the APs by using a bit x as a start and by using a bit y as an end.

In this implementation, the part of bits corresponding to the group addressed traffic indication information in the partial virtual bitmap field in the TIM element are consecutive. In other words, the group addressed traffic indication information corresponds to the part of consecutive bits in the partial virtual bitmap field in the TIM element.

For example, the AP MLD implicitly allocates AIDs to a plurality of APs in the AP MLD. In other words, a segment of default consecutive AIDs is separately allocated to all the APs in the AP MLD. For example, the segment of default consecutive AID starts from an AID 1. It is assumed that there are three APs in the AP MLD: an AP 1, an AP 2, and an AP 3, and AIDs are separately allocated in descending order of values of link identifiers of links on which the APs operate. It is assumed that link identifiers of the AP 1, the AP 2, and the AP 3 are respectively a link identifier 3, a link identifier 2, and a link identifier 1. Therefore, AIDs allocated to the AP 1, the AP 2, and the AP 3 by default are the AID 1 of the AP 1, an AID 2 of the AP 2, and an AID 3 of the AP 3.

It can be learned that, in this implementation, an AID corresponding to each AP is not notified, by using an association response frame, a management frame, or the like, to a station managed by each AP; instead, the station learns of the AID by default, to help reduce signaling overheads.

Implementation 2.2: The AIDs corresponding to each AP in the AP MLD on different links are mutually independently allocated and may be different.

In Implementation 2.2, there may be implicit allocation and explicit allocation based on a specific allocation manner of the AID corresponding to each AP. In Implementation 2.2.1, the AIDs corresponding to each AP in the AP MLD on different links are explicitly and independently allocated. In Implementation 2.2.2, the AIDs corresponding to each AP in the AP MLD on different links are implicitly and independently allocated.

Implementation 2.2.1: The AIDs corresponding to each AP in the AP MLD on different links are explicitly and independently allocated.

This application further provides another AID configuration method. In the AID configuration method, the first AP in the AP MLD generates association identifier configuration information; and the first AP sends the association identifier configuration information. There are two implementations of the association identifier configuration information:

In a first implementation, one piece of association identifier configuration information is used to indicate an association identifier corresponding to each AP on one link. In this way, the first AP may send only association identifier configuration information on the first link. Optionally, in addition to sending the association configuration information on the first link, the first AP may send association identifier configuration information on another link.

In a second implementation, one piece of association identifier configuration information may be used to indicate an association identifier corresponding to each AP on a plurality of links. The plurality of links may be a link on which each AP in the AP MLD operates. Therefore, the first AP may send the association identifier configuration information on the first link. The association configuration information is used to indicate the association identifier corresponding to each AP in the AP MLD on the plurality of links.

It can be learned that a difference between the AID configuration method and the AID configuration method in Implementation 2.1.1 lies in that, the association identifier configuration information is related to a link in Implementation 2.2.1, and an association identifier of each AP on one or more links is unique in Implementation 2.1.1.

A location and a structure of the association identifier configuration information in the first implementation are similar to those in Implementation 2.1.1. Specifically, the association identifier configuration information may further include a plurality of pieces of association identifier subconfiguration information, each piece of association identifier subconfiguration information corresponds to one AP in the AP MLD, and the association identifier subconfiguration information includes an AID of the AP. In addition, the association identifier subconfiguration information is used in combination with a link identifier of a link, to indicate that the AID of the AP is allocated on a link identified by the link identifier. Association identifier subconfiguration information corresponding to each AP may be carried in a sub-element or a subfield that stores information about the AP in the MLD element shown in FIG. 9. For "in addition to sending the association configuration information on the first link, the first AP may send association identifier configuration information on another link", the first AP sends a plurality of pieces of association identifier configuration information.

In the second implementation, the association identifier configuration information further includes a plurality of pieces of association identifier subconfiguration information, each piece of association identifier subconfiguration information corresponds to a same AP in the AP MLD, and the association identifier subconfiguration information includes an AID of the AP. In addition, the association identifier configuration information or the association identifier subconfiguration information included in the association identifier configuration information is used in combination with a link identifier of a link, to indicate that the AID of the AP is allocated on the link identified by the link identifier, and one AID is allocated on each link. Association identifier configuration information corresponding to each AP may be carried in a sub-element or a subfield that stores information about the AP in the MLD element shown in FIG. 9.

For example, one sub-element in the MLD element includes a link identifier and a plurality of pieces of association identifier subconfiguration information of one AP. A plurality of pieces of association identifier subconfiguration information of each AP are in a one-to-one correspondence with a plurality of links on which the AP MLD operates, and one piece of association identifier subconfiguration information is used to indicate an AID allocated to the AP on a corresponding link.

Optionally, the plurality of links may be represented by using link identifiers. Therefore, in addition to the plurality of pieces of association identifier subconfiguration information, one sub-element in the MLD element may include a plurality of link identifiers, and one link identifier is associated with one piece of association identifier subconfiguration information. Therefore, in a sub-element corresponding to one AP in the MLD element, one piece of association identifier subconfiguration information is used to indicate an AID allocated to the AP on a link identified by a link identifier associated with the association identifier subconfiguration information.

Optionally, a correspondence between each link and an AID indicated by association identifier subconfiguration information may be determined based on a value of the AID and a value of a frequency of the link. For example, after being arranged in descending order, AIDs respectively indicated by the plurality of association identifier subconfiguration information are in a one-to-one correspondence with links whose frequencies are ranked in descending order.

For example, the AP MLD includes three links, and the three links are arranged in descending order of frequencies of the three links as follows: a link 1, a link 2, and a link 3. In an MLD element sent by the AP MLD, a sub-element of one AP includes three pieces of association identifier subconfiguration information, and AIDs respectively indicated by the three pieces of association identifier subconfiguration information are arranged in descending order as follows: an AID 5 (or an AID 3), an AID 2, and an AID 1. Therefore, an AID allocated to the AP on the link 1 is the AID 5 (or the AID 3), an AID allocated to the AP on the link 2 is the AID 2, and an AID allocated to the AP on the link 3 is the AID 1.

In an implementation, in a phase in which the AP MLD and the STA MLD are not associated, an MLD element in an association response frame sent by the AP MLD to the STA MLD carries the association identifier configuration information. In another implementation, a management frame sent by the AP MLD carries the association identifier configuration information. Therefore, the STA MLD learns of an AID allocated to each AP in the associated AP MLD on each link.

Because the AID allocated to each AP in the AP MLD on each link is explicitly and independently allocated, group addressed traffic indication information sent by each AP on a link on which the AP operates is determined based on an AID corresponding to each AP on the link. For example, the group addressed traffic indication information sent by the first AP on the first link is determined based on an AID corresponding to each AP on the first link.

Similar to Implementation 2.1.1, group addressed traffic indication information on each link is a part of bits in the partial virtual bitmap, and the part of bits may be consecutive or inconsecutive.

Implementation 2.2.2: The AIDs corresponding to each AP in the AP MLD on different links are implicitly and independently allocated.

AIDs of all the APs in the AP MLD on the first link are continuously allocated by using an AID x1 as a start. The AID x1 is pre-defined. Correspondingly, allocation of the AIDs of all the APs in the AP MLD ends by using an AID y1 as an end, and the AID y1 is determined based on a quantity of APs in the AP MLD, or is determined based on a quantity of APs for which whether the APs have group addressed traffic is indicated in the AP MLD.

In other words, AIDs of all the APs in the AP MLD on a link l are continuously allocated by using an AID xl as a start. The AID xl is pre-defined. Correspondingly, allocation of the AIDs of all the APs in the AP MLD on the link l ends by using an AID yl as an end, and the AID yl is determined based on a quantity of APs in the AP MLD, or is determined based on a quantity of APs for which whether the APs have group addressed traffic is indicated in the AP MLD. Herein, l represents a link on which an AP that sends group addressed traffic indication information in the AP MLD operates.

Optionally, the AIDs corresponding to all the APs in the AP MLD on the link l are sequentially and continuously allocated in descending order or ascending order of values of link identifiers or MAC addresses of all the APs in the AP MLD by using the AID xl as a start and by using the AID yl as an end.

Because the group addressed traffic indication information is a part of bits in the partial virtual bitmap field in the TIM element, the implementation may alternatively be expressed as follows: A start bit or a first bit corresponding to group addressed traffic indication information on the link l in the partial virtual bitmap field in the TIM element is a bit xl. The bit xl is pre-defined. Correspondingly, an end bit or a last bit corresponding to the group addressed traffic indication information in the partial virtual bitmap field in the TIM element is a bit yl, the bit yl is determined based on the quantity of APs in the AP MLD, or is determined based on the quantity of APs for which whether the APs have group addressed traffic is indicated in the AP MLD.

Optionally, AIDs of the APs corresponding to all bits in group addressed traffic indication information on the link l are sequentially and continuously allocated in descending order or ascending order of values of link identifiers or MAC addresses of all the APs by using a bit xl as a start and by using a bit yl as an end.

In this implementation, a part of bits corresponding to the group addressed traffic indication information on the link l in the partial virtual bitmap field in the TIM element are consecutive.

AIDs allocated to each AP in a same AP MLD on different links may be the same or different, and are allocated independently. Group addressed traffic indication information of a same AP MLD on different links may correspond to a same or different start bit or first bit in the partial virtual bitmap field in the TIM element.

For example, the AP MLD implicitly allocates AIDs on a link X and a link Y to a plurality of APs in the AP MLD. In other words, a segment of default consecutive AIDs is allocated to all the APs in the AP MLD. For example, on the link X, it is assumed that consecutive AIDs are allocated to each AP in the AP MLD starting from an AID 1, and it is assumed that there are three APs in the AP MLD: an AP 1, an AP 2, and an AP 3. Therefore, the AID 1, the AID 2, and the AID 3 are respectively allocated to the AP 1, the AP 2, and the AP 3 by default on the link X. On the link Y, it is assumed that consecutive AIDs are allocated to each AP in the AP MLD starting from the AID 2. Therefore, the AID 2, the AID 3, and an AID 4 are respectively allocated to the AP 1, the AP 2, and the AP 3 by default on the link Y. It can be learned that AIDs allocated to each AP in a same AP MLD on different links may be independently allocated. Therefore, the AIDs may be different.

It can be learned that, in Implementation 2.2.2, an AID corresponding to each AP is not notified, by using an association response frame, a management frame, or the like, to a station managed by each AP; instead, the station learns of the AID by default, to help reduce signaling overheads.

In an implementation, the group addressed traffic indication information in Implementation 1 and Implementation 2 may not additionally indicate whether an AP (referred to as a reporting AP) that sends the group addressed traffic indication information has group addressed traffic, but indicate whether another AP in the MLD in which the reporting AP is located has group addressed traffic. The AP MLD may still indicate, by using the bit 0 in the bitmap control field shown in FIG. 2, whether the AP has group addressed traffic. In this case, the group addressed traffic indication information in this embodiment of this application still corresponds to consecutive bits in the partial virtual bitmap field, but no corresponding bits or AIDs are additionally allocated to the reporting AP (for example, the first AP).

For example, the group addressed traffic indication information sent by the AP 1 may not indicate whether the AP 1 has group addressed traffic, but indicate whether the AP 2 and the AP 3 have group addressed traffic. For example, a bit 1 and a bit 2 in the partial virtual bitmap field indicate whether the AP 2 and the AP 3 have group addressed traffic. Correspondingly, corresponding AIDs are allocated to the AP 2 and the AP 3 in the AP MLD in the foregoing implementation, but a corresponding AID does not need to be allocated to the AP 1. Alternatively, bits corresponding to the AP 2 and the AP 3 in the AP MLD in the traffic indication virtual bitmap field are allocated, and a corresponding bit does not need to be allocated to the AP 1.

Correspondingly, the bit y or the bit AID y in Implementation 2.1.2 and the bit yl or the bit AID yl in Implementation 2.2.2 may be determined based on a quantity obtained by subtracting 1 from the quantity of APs in the AP MLD, or determined based on a quantity obtained by subtracting 1 from a quantity of APs for which whether the APs have group addressed traffic is indicated in the AP MLD.

In another implementation, a bit corresponding to the reporting AP may still remain in the group addressed traffic indication information in Implementation 1, or in Implementation 2, a corresponding AID is still allocated to the reporting AP, but a bit corresponding to the reporting AP in the group addressed traffic indication information or a bit corresponding to an AID of the reporting AP in the partial virtual bitmap field is meaningless.

In addition, because AIDs corresponding to a part of bits in the partial virtual bitmap field are allocated to stations, and the bits are used to respectively indicate whether the corresponding stations have a unicast service, in Implementation 2.1.1, AIDs allocated to all the APs in the AP MLD are no longer allocated to stations or station multi-link devices respectively associated with all the APs. In other words, the AIDs allocated to all the APs in the AP MLD are different from AIDs allocated to the stations or the station multi-link devices respectively associated with all the APs.

In addition, AIDs allocated to a plurality of STAs located in a same MLD are the same. In FIG. 4(c), an AID of the STA 602-1 and an AID of the STA 602-2 are the same, to help simplify a corresponding unicast service indication.

For example, it is assumed that AIDs allocated to the AP 601-1 to the AP 601-3 in the AP MLD 601 are respectively the AID 1, the AID 2, and the AID 3 in the communications system 300 shown in FIG. 4(c). Therefore, the AID 1, the AID 2, and the AID 3 are no longer allocated to stations associated with the AP 601-1 to the AP 601-3, for example, a STA (namely, the STA MLD 602) in the STA MLD 602, a STA (namely, the STA MLD 603) in the STA MLD 603, and the STA 604.

In Implementation 2.2.2, AIDs corresponding to a part of bits in the partial virtual bitmap field are allocated to stations, and the bits are used to respectively indicate whether the corresponding stations have a unicast service. Therefore, an AID allocated to each AP in the AP MLD on the link 1 is no longer allocated to a station or a station multi-link device associated with an AP operating on the link 1. In other words, the AID allocated to each AP in the AP MLD on the link 1 is different from an AID allocated to the station or the station multi-link device associated with the AP operating on the link 1. All stations in each station multi-link device share one AID. A station associated with an AP may also be referred to as a station managed by the AP.

For example, it is assumed that AIDs allocated to the AP 1, the AP 2, and the AP 3 in the AP MLD on a link 1 are respectively the AID 1, the AID 2, and the AID 3 in Implementation 2.2.2. Therefore, the AP 1 operating on the link 1 does not allocate the AID 1, the AID 2, and the AID 3 to a station managed by (or associated with) the AP 1; or the AP 1 does not allocate the AID 1, the AID 2, and the AID 3 to a STA MLD in which a station managed by (or associated with) the AP 1 is located.

In addition, in Implementation 2.2.2, AIDs allocated by different APs in the AP MLD to single-link stations or multi-link stations managed by the APs are independent. In other words, the AIDs allocated by different APs to single-link stations or multi-link stations managed by the APs may be repeated. An AID allocated to a multi-link station (or referred to as a STA MLD) remains unique on a plurality of links. For example, the multi-link station includes two stations, and the two stations own a same AID on two links on which the two stations respectively operate.

It can be learned that in Implementation 2, a corresponding AID is allocated to each AP in the AP MLD, and the partial virtual bitmap field in the TIM element is used to notify the STA in the MLD of whether each AP in the AP MLD has group addressed traffic. Compared with a manner in which a bit 0 in a bitmap control field in the TIM beacon frame on each link is used to notify an AP on the link of whether there is group addressed traffic in the group addressed traffic processing method 100, in this implementation, flexibility of notifying group addressed traffic can be improved, and when the group addressed traffic indication information is used to indicate whether a plurality of APs have group addressed traffic, power consumption of the STA MLD can be further reduced.

Embodiment 2

Descriptions are provided by using an example in which a group addressed traffic transmission method 300 applicable to a plurality of links provided in an embodiment of this application is implemented in a communications system shown in FIG. 5. An AP MLD includes an AP operating in a multiple BSSID set, the AP MLD includes one or more APs, and a first AP is a common AP or a transmitted AP in the AP MLD.

If the first AP is a common AP in the AP MLD, the common AP may perform the group addressed traffic transmission method 200 in Embodiment 1. In other words, group addressed traffic indication information is used to indicate whether each AP or some APs in the AP MLD have group addressed traffic. As shown in FIG. 5, an AP 3 in an AP MLD 1 may send group addressed traffic indication information on a link 3, and the group addressed traffic indication information is used to indicate whether an AP 1*x*, an AP 2*y*, and an AP 3 have group addressed traffic. Specifically, for a related implementation, refer to related content of Embodiment 1. Details are not described herein again.

If the first AP is a transmitted AP in the AP MLD, group addressed traffic indication information sent by the transmitted AP is used to indicate whether each AP or some APs in the AP MLD have group addressed traffic, and is further used to indicate whether each AP or some APs in an AP MLD in which a transmitted AP in a multiple BSSID set in which the transmitted AP operates is located have group addressed traffic. As shown in FIG. 5, the AP 1*x* in the AP MLD 1 sends group addressed traffic indication information on a link 1, and the group addressed traffic indication information is used to indicate whether the AP 1*x*, the AP 2*y*, and the AP 3 in the AP MLD 1 have group addressed traffic, and whether the AP 1*y*, AP 2*z*, and AP 4*y* in the AP MLD 3 in which the AP 1*y* in the multiple BSSID set 1 in which the AP 1*x* operates have group addressed traffic.

In the group addressed traffic transmission method 300 applicable to a plurality of links, the group addressed traffic indication information may be referred to as multiple BSSID group addressed traffic indication information. This is not limited in this embodiment of this application.

For ease of description, the AP MLD in which the first AP is located is briefly referred to as a first AP MLD, and an AP MLD in which a non-transmitted AP in a multiple BSSID set in which the first AP operates is located is briefly referred to as a second AP MLD. Because there may be one or more non-transmitted APs in the multiple BSSID set, there is also one or more AP MLDs in which the non-transmitted AP is located. In Embodiment 2, the AP MLD in which the non-transmitted AP is located is represented by the second AP MLD for description.

One difference between the group addressed traffic transmission method 300 applicable to a plurality of links and the group addressed traffic transmission method 200 applicable to a plurality of links lies in that the group addressed traffic indication information has different functions. The group addressed traffic indication information may indicate the following several implementations:

(1) The group addressed traffic indication information is used to indicate whether a plurality of APs in the AP MLD have group addressed traffic, and whether a plurality of APs in an AP MLD in which a non-transmitted AP in a same multi-BSSID set as the first AP (or referred to as a reporting AP) is located have group addressed traffic; and (2) The group addressed traffic indication information is used to indicate whether a plurality of APs in the AP MLD have group addressed traffic, and whether a plurality of APs in an AP MLD in which a non-transmitted AP in a multiple BSSID set in which the first AP (or referred to as a reporting AP) is located have group addressed traffic. The plurality of APs in the AP MLD may be all APs in the AP MLD or some of the all APs.

In another implementation, to help describe an AP MLD in which a non-transmitted AP in a same multi-BSSID set as the first AP (or referred to as a reporting AP) is located, or an AP MLD in which a non-transmitted AP in a multiple BSSID set in which the first AP (or referred to as a reporting AP) is located is referred to as a second AP MLD, and an AP MLD in which the first AP is located is referred to as a first AP MLD.

Correspondingly, the group addressed traffic indication information may further indicate the following several implementations: (1) The group addressed traffic indication information is used to indicate whether one or more APs in the first AP MLD have group addressed traffic, and whether one or more APs in the second AP MLD have group addressed traffic; (2) The group addressed traffic indication information is used to indicate whether one or more APs in the first AP MLD send group addressed traffic after a DTIM beacon frame, and whether one or more APs in the second AP MLD send group addressed traffic after a DTIM beacon frame; and (3) The group addressed traffic indication information is used to indicate whether one or more APs in the first AP MLD buffer group addressed traffic, and whether one or more APs in the second AP MLD buffer group addressed traffic. In this application, the group addressed traffic indication information is used to indicate that group addressed traffic of one or more APs in the first AP MLD is not sent in a form of a group addressed AID, and group addressed traffic of one or more APs in the second AP MLD is not sent in a form of a group addressed AID.

In this embodiment of this application, the expression (3) is used as an example for subsequent description.

It can be learned that in this embodiment of this application, group addressed traffic indication information sent by the first AP in the AP MLD can be used to indicate whether one AP in the first AP MLD has group addressed traffic and whether one AP in the second AP MLD has group addressed traffic. The AP in the first AP MLD may be the first AP or an AP in the first AP MLD other than the first AP, and the AP in the second AP MLD may be a non-transmitted AP or an AP in the second AP MLD other than the non-transmitted AP. Further, one STA in a STA MLD on a first link may learn of whether the first AP or another AP that is associated has group addressed traffic. Compared with a manner in which one STA in the STA MLD can only listen to whether an associated AP has group addressed traffic, in this embodiment of this application, one STA in the STA MLD may learn of whether the first AP or another AP in the AP MLD has group addressed traffic, to improve flexibility of notifying group addressed traffic by the AP MLD.

Alternatively, group addressed traffic indication information sent by the first AP in the AP MLD can be used to indicate whether a plurality of APs in the first AP MLD have group addressed traffic and whether a plurality of APs in the second AP MLD have group addressed traffic. Further, one STA in the STA MLD on a first link may learn of whether a plurality of APs in the first AP MLD and the second AP MLD have group addressed traffic. Compared with a manner in which one STA in the STA MLD can only listen to whether an AP associated with the STA has group addressed traffic, in this embodiment of this application, power consumption of the STA MLD is reduced.

For example, as shown in FIG. 5, it is assumed that an AP 2x sends group addressed traffic indication information. Because non-transmitted APs in a multiple BSSID set 2 on which the AP 2x operates are an AP 2y and an AP 2z, the group addressed traffic indication information is used to indicate whether the AP 2x and an AP 4x in an AP MLD 2 have group addressed traffic, and is further used to indicate whether the AP 1x, the AP 2y, and the AP 3 in the AP MLD 1 have group addressed traffic, and whether the AP 1y, the AP 2z, and the AP 4y in the AP MLD 3 have group addressed traffic. It can be learned that group addressed traffic indication information sent by the AP 2x on a link 2 may be used to indicate whether a plurality of APs have group addressed traffic, to greatly reduce power consumption of a STA MLD operating on the link 2.

Optionally, this embodiment may also be expressed as follows: Whether a non-transmitted AP in an AP MLD has group addressed traffic may be indicated by a transmitted AP in a multiple BSSID set in which the non-transmitted AP is located, for example, indicated by using group addressed traffic indication information sent by the transmitted AP. Alternatively, group addressed traffic indication information that is of an AP MLD and that is sent by a non-transmitted AP in the AP MLD on a link is sent by a transmitted AP.

To indicate whether a plurality of APs in the first AP MLD and the second AP MLD have group addressed traffic, before generating the group addressed traffic indication information, the first AP in the first AP MLD further allocates a corresponding bit in a same group addressed traffic indication information to each AP or allocates a corresponding AID to each AP.

Alternatively, to indicate whether a plurality of APs in the first AP MLD and the second AP MLD have group addressed traffic, before the first AP in the first AP MLD generates the group addressed traffic indication information, the first AP further allocates a corresponding bit in a same group addressed traffic indication information to each AP in a same MLD or allocates a corresponding AID to each AP in a same MLD. Therefore, the first AP sends group addressed traffic indication information corresponding to a plurality of MLDs. Each piece of group addressed traffic indication information corresponds to an identifier of an MLD. The identifier of the MLD may be an MLD ID. Therefore, each piece of group addressed traffic indication information is used together with the MLD ID, and is used to indicate whether a plurality of APs in an MLD indicated by the MLD ID have group addressed traffic.

Therefore, how to allocate a corresponding bit to each AP or how to allocate a corresponding AID to each AP is respectively described below by using two implementations as examples.

Implementation 3: How to allocate a bit corresponding to each AP in the first AP MLD and the second AP MLD in group addressed traffic indication information is described.

Implementation 3 is similar to Implementation 1, and may include Implementation 3.1 and Implementation 3.2. Implementation 3.1 corresponds to Implementation 1.1. To be specific, bits corresponding to each AP in the first AP MLD and the second AP MLD in the group addressed traffic indication information on different links are the same (are different in a special case, for example, a case in which on some links, a bit 0 of the AP in a bitmap control field may be reused or an AID allocated to a non-transmitted AP in a multiple BSSID set in which the non-transmitted AP is located may be reused). In other words, bits corresponding to each AP on different links are unique. Implementation 3.2 corresponds to Implementation 1.2. To be specific, bits corresponding to each AP in the first AP MLD and the second AP MLD in the group addressed traffic indication information on different links are independently allocated, and may be the same or different.

Implementation 3.1: The bits corresponding to each AP in the first AP MLD and the second AP MLD in the group addressed traffic indication information on different links are the same (are different in a special case), and are uniformly allocated. A difference between Implementation 3.1 and Implementation 1.1 lies in that, in implementation 3.1, corresponding bits are further allocated to all APs in an AP MLD in which a non-transmitted AP in a multiple BSSID set in which a transmitted AP operates is located.

For example, as shown in FIG. 5, in addition to allocating a corresponding bit to each AP in the AP MLD 1, the AP 1x allocates a corresponding bit to each AP in the AP MLD 3. For another example, as shown in FIG. 5, in addition to allocating a corresponding bit to each AP in the AP MLD 2, the AP 2x allocates a corresponding bit to each AP in the AP MLD 1 and the AP MLD 3.

Correspondingly, a bit corresponding to each AP in an AP MLD in which a transmitted AP is located and each AP in an AP MLD in which a non-transmitted AP in a multiple BSSID set in which the transmitted AP operates is located may be implicitly allocated or explicitly allocated. Optionally, a corresponding bit is allocated to each AP based on values of link identifiers or MAC addresses of all the APs. For another example, corresponding bits are sequentially allocated to all the APs in a sequence of AP information carried in a multi-link association response frame or a management frame sent by one AP in the AP MLD. This is not limited in this application.

For example, the AP 1x allocates corresponding bits in the group addressed traffic indication information to all the APs in descending order of link identifiers or MAC addresses of all APs in the AP MLD 1 and the AP MLD 3.

Implementation 3.2: The bits corresponding to each AP in the first AP MLD and the second AP MLD in the group addressed traffic indication information on different links are independently allocated, and may be the same or different Implementation 3.2 is similar to Implementation 1.2. A difference lies in that a corresponding bit is allocated to each AP in the first AP MLD on a link l, and it is also considered that a corresponding bit is allocated, on the link l, to each AP in an AP MLD in which a non-transmitted AP in a multiple BSSID set in which a transmitted AP operates is located.

Implementation 3.3

Bits in the group addressed traffic indication information are in a one-to-one correspondence with links on which all the APs in the first AP MLD and the second AP MLD are located. For example, each bit in the group addressed traffic indication information is used together with an MLD identifier and a link identifier. Optionally, each bit in the group addressed traffic indication information is located in a TBTT information field in a reduced neighbor report (RNR) element. Specifically, an MLD (multi-link device) parameter field (MLD parameters subfield) shown in FIG. 8a is added to the TBTT information field, and the MLD parameter field includes a multi-link device identifier (MLD ID), a link identifier (link ID), a change sequence number (change sequence), and a group addressed traffic indication. The multi-link device identifier is used to indicate an identifier of an MLD in which a reported AP is located, the link identifier is used to identify a sequence number of the reported AP in the AP MLD, the change sequence number is used to indicate a key BSS parameter update count value of the reported AP, the group addressed traffic indication is used to indicate whether the reported AP has group addressed traffic, and the group addressed traffic identifier may occupy 1 bit. Optionally, the group addressed traffic may include a multicast management frame service and a group addressed data frame service. In an implementation, two fields are respectively used to indicate the multicast management frame service and the group addressed data frame service. For example, the two fields each occupy 1 bit, are specifically a multicast management frame service indication and a group addressed data frame service indication, and are respectively used to indicate whether the reported AP has a corresponding multicast management frame service and a group addressed data frame service. In another implementation, only one of the multicast management frame service and the group addressed data frame service may be indicated, and only one field needs to be used for indication. For example, a multicast management frame service indication field is used to indicate whether the reported AP has a corresponding multicast management frame service, or a group addressed data frame service indication field is used to indicate whether the reported AP has a corresponding group addressed data frame service.

Optionally, an AP that sends group addressed traffic indication information may still indicate, in an existing method, to be specific, by using a bit 0 in a bitmap control field in a TIM element, whether the AP has downlink group addressed traffic.

Usually, the RNR element is used by a non-associated station to discover an element of a surrounding AP, and an associated station may neglect to interpret the RNR element. Therefore, this embodiment of this application provides a method for indicating whether a group addressed traffic indication exists in an RNR element. In other words, the method is implemented based on a capability information field in a beacon frame or a probe response frame. The group addressed traffic flag is added to the capability information field in the probe response frame, to indicate whether the RNR element indicates that at least one reported AP has group addressed traffic. The group addressed traffic flag may be indicated by using 1 bit. For example, 1 bit of the group addressed traffic flag is set to 1, to indicate that at least one reported AP has group addressed traffic. In an equivalent alternative solution, 1 bit may be set to 0, to indicate that at least one reported AP has group addressed traffic. For details, refer to FIG. 8b. The group addressed traffic flag is added to the capability information field. When a value of the group addressed traffic flag indicates "group addressed traffic exists", an associated station or a non-associated station may be indicated to interpret the RNR element. The capability information field shown in FIG. 8b may further include a change sequence number updated flag (CSN updated flag), and the change sequence number updated flag is used to indicate whether a change sequence number field value of the reported AP changes. When the change sequence number updated flag indicates that a change sequence number field value of at least one reported AP changes, an associated station or a non-associated station may be indicated to interpret the RNR element.

Alternatively, in another implementation, as shown in FIG. 8c, an RNR flag is added to a capability element, to indicate whether a change sequence number field value of at least one reported AP changes or group addressed traffic exists, in other words, indicate a station to interpret an RNR element. The RNR flag may be indicated by using 1 bit. When a value of the RNR flag is set to 1, it indicates that at least one reported AP has group addressed traffic, or it indicates that a change sequence number field value of at least one reported AP changes, to indicate that an associated station or a non-associated station interprets the RNR element. Certainly, in an equivalent alternative solution, that the value of the RNR flag is set to 1 may alternatively be that the value of the RNR flag is 0, to indicate that at least one reported AP has group addressed traffic, or indicate that a change sequence number field value of at least one reported AP changes.

In the two implementations shown in FIG. 8b and FIG. 8c, the capability information field further includes fields such as an ESS (extended service set), an IBSS (independent basic service set), privacy, a short preamble, spectrum management, QoS (quality of service), short slot time, APSD (automatic power save delivery), radio measurement (radio management), and EPD (Ethertype Protocol Discrimination). For details, refer to the 802.11REVmd D3.0 protocol. At a station end, for example, an associated station or an associated station MLD may select, based on a 1-bit group addressed traffic flag or a 1-bit RNR flag added to a capability element in a beacon frame or a probe response frame, whether to parse the RNR element; or consider by default that the RNR element is always parsed.

For details of the RNR element mentioned in Implementation 3.3, refer to Implementation 1.3. Details are not described herein again.

In still another implementation, each bit in the group addressed traffic indication information is located in a multi-link element. The bit in the group addressed traffic indication information is located in an MLD common information field in the multi-link element, or each bit in the group addressed traffic indication information is located in a single station information field. A station control field in the station information field includes a link identifier field. The multi-link element includes an element identifier, a length, an element identifier extension, multi-link control, MLD common information, and one or more station information fields. In addition, the MLD common information field includes a multi-link device address subfield, and the station information field includes a station control subfield. Group addressed traffic indication information of different MLDs is carried by using different multi-link elements.

Implementation 4: The group addressed traffic indication information is a part of bits in the partial virtual bitmap field in the TIM element, and how to allocate an AID corresponding to each AP in the first AP MLD and the second AP MLD is described.

Implementation 4 is similar to Implementation 2. A difference lies in that how to allocate a corresponding AID to an AP in the second AP MLD is further considered. The following describes two implementations based on whether AIDs are uniformly allocated or are independently allocated on a plurality of links.

Implementation 4.1: The AIDs corresponding to all the APs in the first AP MLD and the second AP MLD are uniformly allocated and are unique.

In Implementation 4.1, there may be implicit allocation and explicit allocation based on a specific allocation manner of the AID corresponding to each AP. In Implementation 4.1.1, the AIDs corresponding to all the APs in the first AP MLD and the second AP MLD are explicitly and uniformly allocated. In Implementation 4.1.2, the AIDs corresponding to all the APs in the first AP MLD and the second AP MLD are implicitly and uniformly allocated.

Implementation 4.1.1: The AIDs corresponding to all the APs in the first AP MLD and the second AP MLD are explicitly and uniformly allocated.

Implementation 4.1.1 is similar to Implementation 2.1.1. A difference lies in that the association identifier configuration information generated by the first AP is used to indicate an association identifier AID corresponding to each AP or an AP other than the first AP in the first AP MLD on the first link, and an association identifier corresponding to each AP or an AP other than the non-transmitted AP in the second AP MLD on the first link. In other words, the association identifier configuration information is used to indicate an association identifier corresponding to each AP or an AP other than the first AP in the AP MLD in which the first AP is located, and an association identifier corresponding to each AP or an AP other than the non-transmitted AP in the AP MLD in which the non-transmitted AP in the multiple BSSID set in which the first AP operates is located.

Association identifier subconfiguration information corresponding to each AP in the association identifier configuration information may be carried in a sub-element or a subfield that stores information about a single AP in the MLD element. Association identifier subconfiguration information corresponding to each AP in an MLD in which the reporting AP is located and association identifier subconfiguration information corresponding to each AP in an AP MLD in which a non-transmitted AP in a multiple BSSID set in which the reporting AP operates is located may be carried in different MLD elements. Each AP MLD corresponds to one MLD element.

Implementation 4.1.2: The AIDs corresponding to all the APs in the first AP MLD and the second AP MLD are implicitly and uniformly allocated.

The first AP allocates an AID to each AP in the first AP MLD, further allocates an AID to a non-transmitted AP in a multi-BSSID set in which the first AP is located, and further allocates an AID to another AP in an AP MLD in which the non-transmitted AP is located. Alternatively, the first AP allocates an AID to each AP in a set of co-located AP MLDs in which the first AP is located. Optionally, an AID or a bit corresponding to the AID may not be allocated to the first AP, and an AID or a bit corresponding to the AID may not be allocated to the non-transmitted AP. In other words, in the group addressed traffic indication information sent by the first AP, a bit 0 in a bitmap control field in the TIM element may be reused, to indicate whether the first AP has group addressed traffic; and an AID of a non-transmitted AP in an existing multiple BSSID set or a bit corresponding to the AID in the partial virtual bitmap field may be reused, to indicate whether the non-transmitted AP has group addressed traffic.

In an implementation, it may be considered by default that the first AP continuously allocates, by using an AID 1 as a start, an AID to a non-transmitted AP in the multiple BSSID set in which the first AP is located. The first AP may continuously allocate, by using an AID x as a start, an AID to "each AP in the first AP MLD" and "another AP in the AP MLD in which the non-transmitted AP is located", where x is equal to $\max\{2^{(N_1)}, 2^{(N_2)}, \ldots, 2^{(N_y)}, \ldots, 2^{(N_n)}\}$. Correspondingly, allocation, performed by the first AP, of an AID to "each AP in the first AP MLD" and "another AP in the AP MLD in which the non-transmitted AP is located" may end with AID y.

Herein, n represents a quantity of APs in the first AP MLD that operate in the multiple BSSID set, Ny represents a value indicated by a max BSSID indicator field of a multiple BSSID set in which a $y^{th}$ AP is located, and y in the AID y is determined based on a quantity of APs in the first AP MLD, a quantity of second AP MLDs, and a quantity of APs in each second AP MLD other than an AP that belongs to a same multiple BSSID set as the first AP.

In another expression, a start bit in bits corresponding to all APs in the first AP MLD in a traffic indication virtual bitmap field is a bit x, where x is equal to $\max\{2^{(N_1)}, 2^{(N_2)}, \ldots, 2^{(N_y)}, \ldots, 2^{(N_n)}\}$.

In another implementation, it is assumed that there are n APs in the AP MLD, Ny of an AP that does not operate in a multiple BSSID mode is equal to 0, and Ny of an AP operating in the multiple BSSID mode is equal to a value indicated by a max BSSID indicator field of a multiple BSSID set in which the AP is located. Therefore, bits corresponding to "another AP or each AP in the first AP MLD" and "another AP or each AP in an AP MLD in which a non-transmitted AP is located" start from a bit x in the traffic indication virtual bitmap field. Alternatively, an AID corresponding to a first bit in a part of consecutive bits of "another AP or each AP in the first AP MLD" and "another AP or each AP in an AP MLD in which a non-transmitted AP is located" in the partial virtual bitmap field is an AID x. Herein, x is equal to max$\{2^{\wedge}(N_1), 2^{\wedge}(N_2), \ldots, 2^{\wedge}(N_y), \ldots, 2^{\wedge}(N_n)\}$.

For example, as shown in FIG. 5, two APs in the AP MLD 1 operate in the multiple BSSID mode, and are respectively the AP 1x and the AP 2y. A value indicated by a max BSSID indicator field of a multiple BSSID set in which the AP 1x is located is 1, and a value indicated by a max BSSID indicator field of a multiple BSSID set in which the AP 2y is located is 2. Therefore, the AP 1x continuously allocates AIDs to the AP 1x, the AP 2y, and the AP 3 in the AP MLD 1 and the AP 2z and the AP 4y in the AP MLD 3 by using the AID x as a start. The AID x is equal to 4. Therefore, the AIDs allocated by the AP 1x to the AP 1x, the AP 2y, and the AP 3 in the AP MLD 1 and the AP 2z and the AP 4y in the AP MLD 3 are sequentially an AID 4, an AID 5, an AID 6, an AID 7, and an AID 8.

In another expression, AIDs corresponding to all APs in "another AP or each AP in the first AP MLD" and "another AP or each AP in an AP MLD in which a non-transmitted AP is located" may be sequentially allocated by using the AID x as a start and based on values of link identifiers or MAC addresses of all the APs.

For example, the AP 1x may sequentially perform allocation based on values of link identifiers or MAC addresses of all APs in the AP 1x, the AP 2y, and the AP 3 in the AP MLD 1 and the AP 2z and the AP 4y in the AP MLD 3 by using an AID 4 as a start.

This implementation may also be expressed as follows: Bits corresponding to all APs in the first AP MLD in the traffic indication virtual bitmap field are continuously configured by using the bit x as a start; an AID corresponding to a first bit in a part of consecutive bits of all APs in the first AP MLD in the partial virtual bitmap field is the AID x; or AIDs corresponding to all APs in the first AP MLD are continuously allocated by using the AID x as a start. Herein, x is equal to max$\{2^{\wedge}(N_1), 2^{\wedge}(N_2), \ldots, 2^{\wedge}(N_y), \ldots, 2^{\wedge}(N_n)\}$. To be specific, it is considered by default that an AID of a non-transmitted AP in a multiple BSSID set in which each transmitted AP in an AP MLD is located starts from an AID 1, and allocation is continuously performed until an AID x-1 that is a most possible end AID. Further, the first AP further allocates an AID to another AP in an AP MLD in which the non-transmitted AP in the multiple BSSID set in which the first AP is located. In the example shown in FIG. 5, after the AP 1x respectively allocates, starting with an AID 4, the AID 4, an AID 5, and an AID 6 to the AP 1x, the AP 2y, and the AP 3 in the AP MLD 1, the AP 1x further allocates an AID 7 and an AID 8 to the AP 2z and the AP 4y in the AP MLD 3. In other words, in the expression, the AIDs corresponding to all the APs in the first AP MLD are continuously allocated by using the AID x as a start and by using an AID y as a start, and y in the AID y is a quantity of APs in the first AP MLD. Further, AIDs are continuously allocated to other APs in the second AP MLD by using an AID y+1 as a start and by using an AID z as an end, and z is equal to a quantity of the other APs in the second AP MLD.

The AP 1x serving as the first AP may reuse the bit 0 in the bitmap control field in the TIM element to indicate whether the AP 1x has group addressed traffic, to avoid allocating a corresponding AID to the AP 1x. In other words, allocation of an AID of another AP in the AP MLD in which the first AP is located starts from the AID x.

It can be learned that, in this expression, a case in which an AID or a corresponding bit allocated to an AP in the first AP MLD overlaps an AID or a corresponding bit allocated to a non-transmitted AP in a multiple BSSID set in which each AP operating in the multiple BSSID mode in the first AP MLD is located can be avoided. Consequently, the STA MLD cannot correctly identify different APs.

Implementation 4.2: The AIDs corresponding to each AP in the first AP MLD and the second AP MLD on different links are independently allocated.

In Implementation 4.2, there may be implicit allocation and explicit allocation based on a specific allocation manner of the AID corresponding to each AP. In Implementation 4.2.1, the AIDs corresponding to each AP in the first AP MLD and the second AP MLD on different links are explicitly and independently allocated. In Implementation 4.2.2, the AIDs corresponding to each AP in the first AP MLD and the second AP MLD on different links are implicitly and independently allocated.

Implementation 4.2.1: The AIDs corresponding to each AP in the first AP MLD and the second AP MLD on different links are explicitly and independently allocated.

Implementation 4.2.1 is similar to Implementation 2.2.1. A difference lies in that the association identifier configuration information generated by the first AP is used to indicate an association identifier corresponding to each AP or an AP other than the first AP in the first AP MLD on the first link, and an association identifier corresponding to each AP or an AP other than the non-transmitted AP in the second AP MLD on the first link. In other words, the association identifier configuration information is used to indicate an association identifier, on the first link or a plurality of links, corresponding to each AP or an AP other than the first AP in the first AP MLD in which the first AP is located, and an association identifier, on the first link or the plurality of links, corresponding to each AP or an AP other than a non-transmitted AP in an AP MLD in which the non-transmitted AP in the multiple BSSID set in which the first AP operates is located.

Association identifier subconfiguration information corresponding to each AP in the association identifier configuration information may be carried in a sub-element or a subfield that stores information about a single AP in the MLD element.

Implementation 4.2.2: The AIDs corresponding to all the APs in the first AP MLD and the second AP MLD on the first link are implicitly and independently allocated.

Implementation 4.2.2 is similar to Implementation 4.1.2. A difference lies in that in Implementation 4.2.2, an allocated AID is used on one link. Therefore, it only needs to be considered that the AID allocated to each AP in the first AP MLD does not overlap an AID allocated to each non-transmitted AP in the multiple BSSID set on one link.

Therefore, AIDs corresponding to all the APs in the first AP MLD start with an AID x, where x is equal to $2^{\wedge}N$, and N is equal to a value indicated by a max BSSID indicator field in a multiple BSSID set in which the first AP is located. The meaning of N is different from that in Implementation 4.1.2.

Correspondingly, in Implementation 4.2.2, the first AP allocates an AID to each AP in the first AP MLD, further allocates an AID to a non-transmitted AP in the multi-BSSID set in which the first AP is located, and further allocates an AID to another AP in an AP MLD in which the non-transmitted AP is located.

In an implementation, it may be considered by default that the first AP continuously allocates, by using an AID 1 as a start, an AID to a non-transmitted AP in the multiple BSSID set in which the first AP is located. The first AP may continuously allocate AIDs to "another AP or each AP in the first AP MLD" and "another AP or each AP in the AP MLD in which the non-transmitted AP is located" by using the AID x as a start and by using an AID y as an end. Herein, y is determined based on a quantity (or a total quantity of APs minus 1) of APs in the first AP MLD, a quantity of second AP MLDs, and a quantity of APs other than an AP that shares a multiple BSSID set with the first AP in each second AP MLD (alternatively, the AP that shares a multiple BSSID set with the first AP is included).

In another expression, a start bit in bits corresponding to all APs in the first AP MLD in a traffic indication virtual bitmap field is a bit x, where x is equal to $2^N$.

For example, as shown in FIG. 5, a value indicated by a max BSSID indicator field in a multiple BSSID set in which the AP 1x in the AP MLD 1 is located is 1. Therefore, the AP 1x continuously allocates AIDs to the AP 1x, the AP 2y, and the AP 3 in the AP MLD 1 and the AP 2z and the AP 4y in the AP MLD 3 by using the AID x as a start. The AID x is equal to 2. Therefore, the AIDs allocated by the AP 1x to the AP 1x, the AP 2y, and the AP 3 in the AP MLD 1 and the AP 2z and the AP 4y in the AP MLD 3 are sequentially an AID 2, an AID 3, an AID 4, an AID 5, and an AID 6. An AID may not be allocated to the AP 1x, and one AID may be further allocated to the AP 1y.

In another expression, AIDs corresponding to all APs in "another AP or each AP in the first AP MLD" and "another AP or each AP in an AP MLD in which a non-transmitted AP is located" may be sequentially allocated by using the AID x as a start and based on values of link identifiers or MAC addresses of all the APs.

For example, the AP 1x may sequentially perform allocation based on values of link identifiers or MAC addresses of all APs in the AP 1x, the AP 2y, and the AP 3 in the AP MLD 1 and the AP 2z and the AP 4y in the AP MLD 3 by using an AID 2 as a start.

This implementation may also be expressed as follows: Bits corresponding to all APs in the first AP MLD in the traffic indication virtual bitmap field are continuously configured by using the bit x as a start; an AID corresponding to a first bit in a part of consecutive bits of all APs in the first AP MLD in the partial virtual bitmap field is the AID x; or AIDs corresponding to all APs in the first AP MLD are continuously allocated by using the AID x as a start. Herein, x is equal to $2^N$. To be specific, it is considered by default that an AID of a non-transmitted AP in a multiple BSSID set in which each transmitted AP in an AP MLD is located starts from an AID 1, and allocation is continuously performed until an AID x-1 that is a most possible end AID. Further, the first AP further allocates an AID to another AP in an AP MLD in which the non-transmitted AP in the multiple BSSID set in which the first AP is located.

In the example shown in FIG. 5, after the AP 1x respectively allocates, starting with an AID 4, the AID 4, an AID 5, and an AID 6 to the AP 1x, the AP 2y, and the AP 3 in the AP MLD 1, the AP 1x further allocates an AID 7 and an AID 8 to the AP 2z and the AP 4y in the AP MLD 3. In other words, in the expression, the AIDs corresponding to all the APs in the first AP MLD are continuously allocated by using the AID x as a start and by using an AID y as a start, and y is a quantity of APs in the first AP MLD. Further, AIDs are continuously allocated to other APs in the second AP MLD by using an AID y+1 as a start and by using an AID z as an end, and z is equal to a quantity of the other APs in the second AP MLD. In this case, a case in which an AID is not allocated to the first AP (for example, the AP 1x), a case in which an AID may be allocated to the non-transmission BSSID in the multiple BSSID set in which the first AP is located, and a combination thereof may be further considered.

It can be learned that, in this expression, a case in which an AID or a corresponding bit allocated to an AP in the first AP MLD overlaps an AID or a corresponding bit allocated to a non-transmitted AP in a multiple BSSID set in which the first AP is located can be avoided. Consequently, the STA MLD cannot correctly identify different APs.

In another implementation, AIDs corresponding to "another AP or each AP in the first AP MLD" and "another AP or each AP in the AP MLD in which the non-transmitted AP is located" are sequentially and continuously allocated in ascending order or descending order of values of link identifiers or MAC addresses of all the APs by using the AID 1 as a start and by using the AID y as an end. Herein, y is equal to a total quantity of APs in the first AP MLD and the AP MLD in which the non-transmitted AP is located, a total quantity of APs other than the first AP, or a total quantity of APs other than the first AP and the non-transmitted AP.

As shown in FIG. 5, for each AP in the AP MLD 2 in which the AP 2x is located, each AP in the AP MLD 1 in which the AP 2y is located, and each AP in the AP MLD 3 in which the AP 2z is located, allocation is sequentially and continuously performed in ascending order or descending order of values of link identifiers or MAC addresses by using the AID 1 as a start and by using the AID y as a start. It is assumed that all APs in the AP MLD 1, the AP MLD 2, and the AP MLD 3 are sequentially arranged in descending order of link identifiers as follows: the AP 2x, the AP 2y, the AP 2z, the AP 1x, the AP 1y, the AP 3, the AP 4x, and the AP 4y. Therefore, AIDs allocated by the AP 2x to all the APs on the link 2 are sequentially an AID 1, an AID 2, an AID 3, an AID 4, an AID 5, an AID 6, an AID 7, and an AID 8. An AID may not be allocated to the first AP, the AP 2x, and non-transmitted APs in the multiple BSSID set in which the first AP is located, for example, the AP 2y and the AP 2z. In other words, AIDs are continuously allocated to other APs from a start point AID 1.

This implementation may alternatively be expressed as follows: The AIDs allocated by the first AP to all the APs in the first AP MLD on the first link may be continuously allocated by using the AID x as a start. Alternatively, a start bit or a start location corresponding to an AID allocated by the first AP to each AP in the first AP MLD in a traffic indication virtual bitmap field on the first link is a bit x. Herein, x is equal to $2^N$. If the first AP is an AP operating in a multiple BSSID mode, N is equal to a value of a maximum BSSID indicator field in a multiple BSSID element of the multiple BSSID set in which the first AP is located. If the first AP is not an AP operating in a BSSID mode, N is equal to 0. In addition, the first AP further allocates an AID to another AP in an AP MLD in which the non-transmitted AP in the multiple BSSID set in which the first AP is located.

FIG. 5 is used as an example. When the AP 1x sends the group addressed traffic indication information on the link 1, AIDs allocated, on the link 1, to all the APs in the AP MLD 1 in which the AP 1x is located may start from the AID x. Herein, x is equal to a value (equal to 1) of a maximum BSSID indicator field in a multiple BSSID element of a multiple BSSID set 1 in which the AP 1x is located. Therefore, AIDs sequentially allocated to the AP 1x, the AP 2y, and the AP 3 in the AP MLD 1 may be the AID 2, the AID 3, and the AID 4. In addition, the AP 1x is another AP in the AP MLD 3 in which the AP 1y in the multiple BSSID set 1 in which the AP 1x is located, namely, the AP 2z and the AP 4y, and respectively allocated AIDs are the AID 5 and the AID 6.

The another AP in the first AP MLD is an AP in the first AP MLD other than the first AP. The another AP in the second AP MLD is an AP in the second AP MLD other than a non-transmitted AP that belongs to a same multiple BSSID set as the first AP.

In addition, in Implementation 4, the group addressed traffic indication information sent by the first AP may not be used to additionally indicate whether the reporting AP has group addressed traffic. In other words, whether the reporting AP has group addressed traffic is still indicated by using the bit 0 in the bitmap control field shown in FIG. 2. In this case, bits corresponding to all the APs in the first AP MLD in the partial virtual bitmap field are still continuous, but the reporting AP is skipped when an AID is allocated to each AP starting from the AID x. Alternatively, the reporting AP is skipped when a corresponding bit in the partial virtual bitmap field is allocated to each AP by using the bit x as a start.

FIG. 5 is used as an example. It is assumed that the AP 1x is a reporting AP, and sends the group addressed traffic indication information on the link 1. Therefore, the group addressed traffic indication information may not be used to additionally indicate whether the AP 1x has group addressed traffic. The group addressed traffic of the AP 1x is indicated by using the bit 0 in the bitmap control field shown in FIG. 2. However, the group addressed traffic indication information carries a group addressed traffic indication of another AP in the first AP MLD in which the AP 1x is located, namely, group addressed traffic indications of the AP 2y and the AP 3. Correspondingly, when an AID is allocated to each AP in the first AP MLD by using the AID x as a start or a corresponding bit is allocated by using a bit x as a start, the AP 1x may be skipped, and it only needs to be ensured that only consecutive AIDs or corresponding consecutive bits are allocated to the AP 2y and the AP 3.

In another implementation, when an AID is allocated to each AP in the first AP MLD by using the AID x as a start, a non-transmitted AP operating in another multiple BSSID set in the first AP MLD may be skipped. In other words, an AID is no longer allocated to a non-transmitted AP in the first AP MLD, and an AID is allocated to only another AP in the first AP MLD. This is because an AID corresponding to the non-transmitted AP in the first AP MLD has been in the BSSID set in which the non-transmitted AP is located, and the transmitted AP allocates the corresponding AID. In other words, a bit corresponding to the AID may be reused, to indicate whether the non-transmitted AP has group addressed traffic. Therefore, the AP MLD no longer allocates an AID or a corresponding bit to a non-transmitted AP in another multiple BSSID set in the AP MLD.

FIG. 5 is used as an example. When allocating, by using the AID x as a start, an AID to each AP included in the first AP MLD, the AP 2y may be skipped, and AIDs are only allocated to the AP 1y, the AP 1x, and the AP 3.

In still another implementation, namely, in a combination of the foregoing two implementations, when an AID is allocated to each AP in the AP MLD by using the AID x as a start, the reporting AP and a non-transmitted AP operating in another multiple BSSID set in the AP MLD may be skipped. In other words, an AID is no longer allocated to the reporting AP and a non-transmitted AP in the AP MLD, and an AID is allocated to only another AP in the AP MLD. This is because, as described above, a group addressed traffic indication of the reporting AP may be indicated by using the bit 0 in the bitmap control field shown in FIG. 2, and an AID corresponding to the non-transmitted AP has been in the BSSID set in which the non-transmitted AP is located, and the transmitted AP in the BSSID set allocates the corresponding AID. Therefore, the AP MLD no longer allocates an AID or a corresponding bit to a reporting AP in the AP MLD or a non-transmitted AP in another multiple BSSID set.

FIG. 5 is used as an example. Because the AP 1x and the AP 2y are a reporting AP in the first AP MLD and a non-transmitted AP in another multiple BSSID set, a first reporting AP needs to report whether each AP in the AP MLD 1 and the AP MLD 2 has group addressed traffic, when the first AP MLD allocates, by using the AID x as a start, an AID to each AP included in the first AP MLD, the AP 1x and the AP 1y may be skipped, and AIDs are only allocated to the AP 2y and the AP 3.

It can be learned that how to allocate a bit or an AID corresponding to each AP in Embodiment 2 is separately described in Implementation 3 and Implementation 4, to flexibly indicate whether a corresponding AP has group addressed traffic, and reduce power consumption of the STA MLD.

The following describes implementations to which Embodiment 1 and Embodiment 2 are both applicable.

In an implementation, a group addressed traffic transmission method applicable to a plurality of links further includes: For an AP having group addressed traffic in an AP MLD, the AP may send group addressed traffic after a DTIM beacon frame to be sent after the group addressed traffic indication information; and correspondingly, a station operating on a link of the AP in a STA MLD may receive the DTIM beacon frame on the link, and further receive subsequent group addressed traffic. Optionally, the DTIM frame is a DTIM beacon frame after the group addressed traffic indication information. Optionally, if a first AP also has group addressed traffic, the first AP may send the group addressed traffic after the DTIM beacon frame to be sent after the group addressed traffic indication information. Correspondingly, a first STA may receive the DTIM beacon frame after the group addressed traffic indication information, and receive the group addressed traffic after the DTIM beacon frame. Specifically, the station operating on the link of the AP in stations in the STA MLD may receive, on the link, a multicast management frame after the DTIM beacon frame, and discard a group addressed data frame after a DTIM beacon frame on a link other than a link on which the first STA is located. In this case, the first STA in the STA MLD has received a corresponding group addressed data frame on the link of the first STA.

Figure 10:
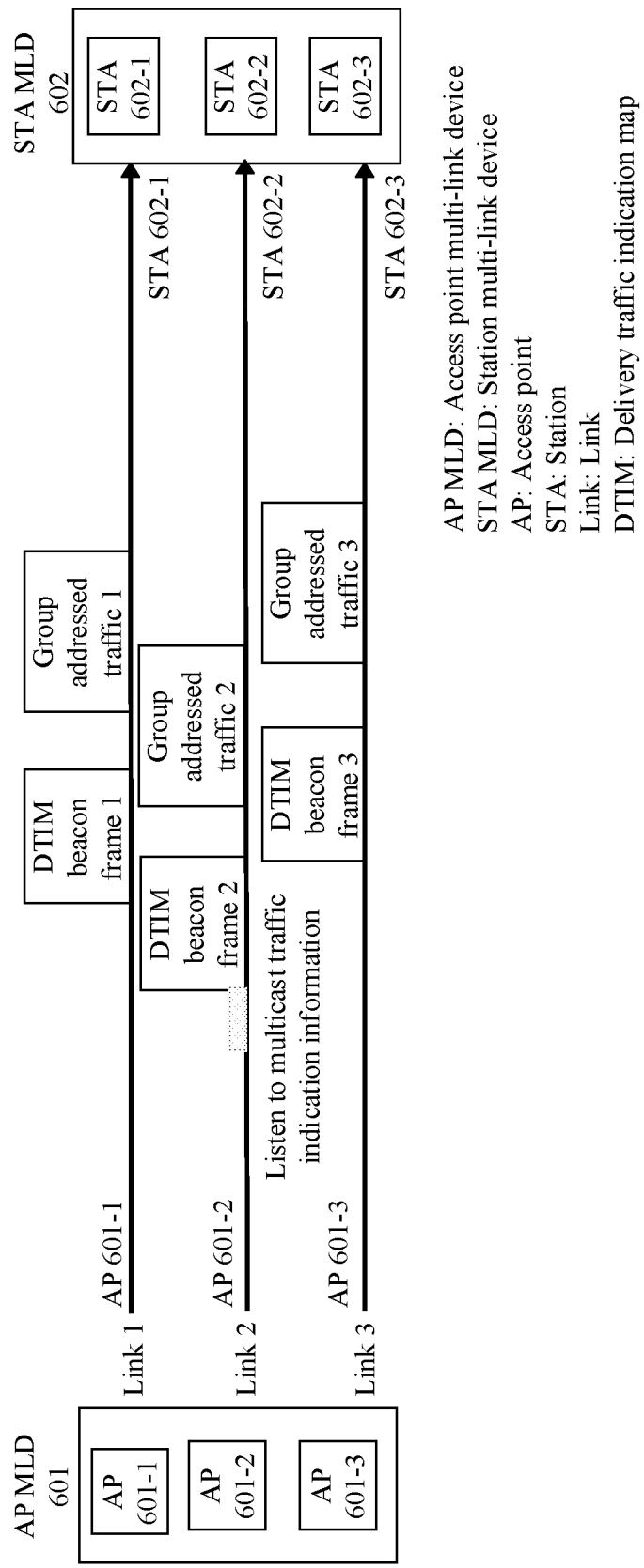
FIG. 10 is a schematic diagram of a group addressed traffic transmission method applicable to a plurality of links according to an embodiment of this application.

FIG. 10 shows a group addressed traffic transmission method applicable to a plurality of links between an AP MLD 601 and a STA MLD 602 in an example. As shown in FIG. 10, a STA 602-2 in the STA MLD 602 may listen to group addressed traffic indication information sent by an AP 601-2, to learn of whether an AP 601-1, the AP 601-2, and an AP 601-3 have group addressed traffic. Compared with the group addressed traffic transmission method 100, shown in FIG. 6, in which each STA in the STA MLD 602 listens, on a respective link, to a TIM beacon frame sent by the AP MLD 601, to learn, based on the TIM beacon frame, of whether the AP MLD 601 sends group addressed traffic after a DTIM beacon frame, in the method, power consumption of the STA MLD 602 is greatly reduced.

Optionally, the group addressed traffic indication information may be located in the DTIM beacon frame, and the beacon frame is a DTIM beacon frame in which the group addressed traffic indication information is located. In other words, for the beacon frame, group addressed traffic indication information sent by a first AP may be located only in the DTIM beacon frame. Specifically, for an AP having group addressed traffic in an AP MLD, the AP may send group addressed traffic after a next to-be-sent DTIM beacon frame after the group addressed traffic indication information. Correspondingly, a station corresponding to the AP learns, based on the group addressed traffic indication information, that the AP has group addressed traffic, may receive the DTIM beacon frame, and receives the group addressed traffic after receiving the DTIM beacon frame. Optionally, if the first AP also has group addressed traffic, the first AP may send the group addressed traffic after a DTIM beacon frame carrying group addressed traffic indication information. Correspondingly, the first STA may receive the group addressed traffic after the DTIM beacon frame carrying the group addressed traffic indication information.

For example, it is assumed that in the communications system 300 shown in FIG. 4(c), group addressed traffic indication information sent by the AP 601-2 in the AP MLD 601 on a link 2 is 111, and in the group addressed traffic indication information, a first bit corresponds to the AP 601-1, a second bit corresponds to the AP 601-2, and a third bit corresponds to the AP 601-3. As shown in FIG. 4(c), the AP 601-2 communicates with the STA 603-1 in the STA MLD 603 and the STA 602-2 in the STA MLD 602 through the link 2. Therefore, the STA 603-1 and the STA 602-2 may listen and detect that the group addressed traffic indication information sent by the AP 601-2 is 111, and further learn that the AP 601-1, the AP 601-2, and the AP 601-3 each have group addressed traffic.

In an implementation, for the STA MLD 602, the STA 602-2 may determine that the AP 601-1, the AP 601-2, and the AP 601-3 each have group addressed traffic. Further, the STA 602-1 operating on a link 1 of the AP 601-1 in the STA MLD 602 listens to a DTIM beacon frame 1 and subsequent group addressed traffic 1. The STA 602-2 operating on the link 2 of the AP 601-2 in the STA MLD 602 listens to a DTIM beacon frame 2 and subsequent group addressed traffic 2. The STA 602-3 operating on a link 3 of the AP 601-3 in the STA MLD 602 listens to a DTIM beacon frame 3 and subsequent group addressed traffic 3.

In another implementation, if the group addressed traffic indication information is carried in a DTIM beacon frame, the STA 602-2 that receives the DTIM beacon frame may receive group addressed traffic after the DTIM beacon frame. The other STAs in the STA MLD 602 further respectively receive DTIM beacon frames on respective links and subsequent group addressed traffic.

Optionally, a STA 604 may also listen, on the link 1, to the group addressed traffic indication information sent by the AP MLD 601-1 on the link 1. It is assumed that the STA 604 learns, based on the group addressed traffic indication information on the link 1, that the AP 601-1, the AP 601-2, and the AP 601-2 each have group addressed traffic. If the STA 604 is not concerned about whether an AP other than the AP 601-1 has group addressed traffic, the STA 604 may not receive group addressed traffic of the AP. If the STA 604 is concerned about whether an AP other than the AP 601-1 has group addressed traffic, and the STA 604 has a frequency band switching capability, the STA 604 may perform link switching to receive corresponding group addressed traffic, for example, receive group addressed traffic sent by another AP after the another AP sends a next DTIM beacon frame.

For the STA MLD 603, the STA 603-1 receives, on a link 2, group addressed traffic indication information from the AP 601-2. It is assumed that the STA 603-1 determines, based on the group addressed traffic indication information, that the AP 601-1, the AP 601-2, and the AP 601-3 each have group addressed traffic. Therefore, the STA 603-1 operating on the link 2 in the STA MLD 603 listens to a DTIM beacon frame 2 and subsequent group addressed traffic 2. The STA 603-2 operating on a link 3 in the STA MLD 603 listens to a DTIM beacon frame 3 and subsequent group addressed traffic 3. Because no station in the STA MLD 603 operates on the link 1 of the AP 601-1, the STA MLD 603 is not concerned about group addressed traffic on the link 1.

In another implementation, if the group addressed traffic indication information on the link 2 is carried in a TIM beacon frame, the STA 603-1 that receives the DTIM beacon frame may receive group addressed traffic after the DTIM beacon frame. The other STAs in the STA MLD 603 further respectively receive DTIM beacon frames on respective links and subsequent group addressed traffic.

In another implementation, the group addressed traffic transmission method 100 applicable to a plurality of links further includes: For an AP having group addressed traffic, a STA operating on a link of the AP in the STA MLD receives group addressed traffic after a DTIM beacon frame.

Figure 11:
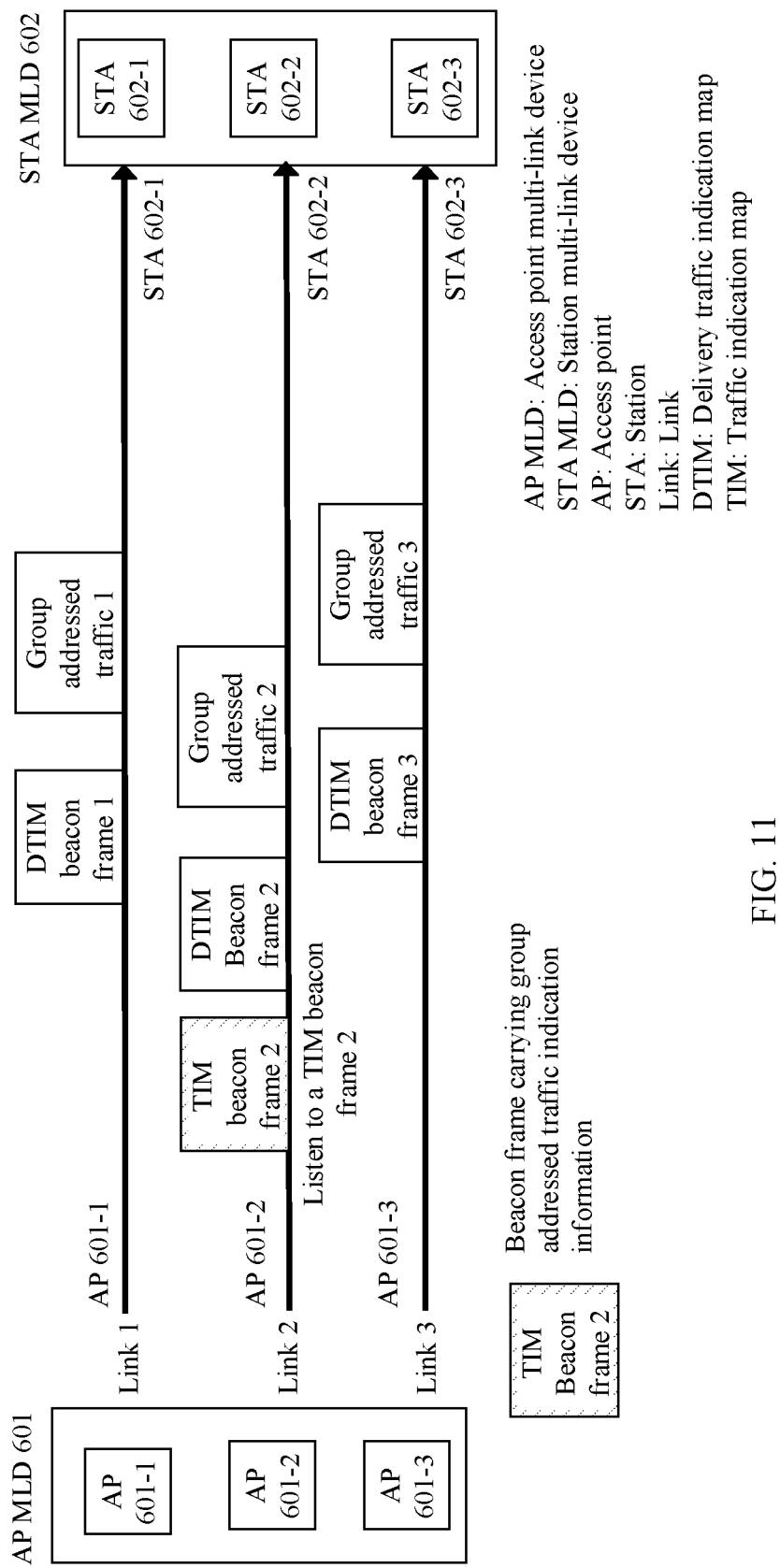
FIG. 11 is a schematic diagram of another group addressed traffic transmission method applicable to a plurality of links according to an embodiment of this application.

For example, it is assumed that in the communications system 300 shown in FIG. 4(c), AIDs of the AP 601-1 to the AP 601-3 in the AP MLD 601 are respectively an AID 1, an AID 2, and an AID 3 on the link 2. The AID 1, the AID 2, and the AID 3 respectively correspond to three bits in a partial virtual bitmap field in a TIM beacon frame. As shown in FIG. 11, in a group addressed traffic transmission method applicable to a plurality of links, an AP 601-2 sends a beacon frame 2 on a link 2, where a partial virtual bitmap field in the beacon frame 2 carry group addressed traffic indication information; if a STA 602-2 listens to the beacon frame 2 on the link 2; and learns, through reading from the partial virtual bitmap field in the beacon frame 2, that three bits corresponding to an AID 1, an AID 2, and an AID 3 are 111, the STA 602-2 may learn that an AP 601-1 to an AP 601-3 each have group addressed traffic after a corresponding DTIM beacon frame; and further, a STA 602-1 to a STA 602-3 may respectively listen, on links on which the STA 602-1 to the STA 602-3 operate, to group addressed traffic after a DTIM beacon frame. It can be learned that in this implementation, a case in which the STA 602-1 and the STA 602-3 in the STA MLD 602 periodically listen to the beacon frame, to learn of whether a corresponding AP has group addressed traffic is avoided, to reduce power consumption of the STA MLD 602.

Optionally, for the beacon frame, if the group addressed traffic indication information is only carried in a DTIM beacon frame, the STA 602-2 that receives the DTIM beacon frame may receive group addressed traffic after the DTIM beacon frame. The other STAs in the STA MLD 602 further respectively receive DTIM beacon frames on respective links and subsequent group addressed traffic.

It should be noted that listening mentioned in this application may also be understood as receiving.

In an implementation, each AP in an AP MLD sends group addressed traffic indication information, and any STA in a STA MLD may listen to group addressed traffic indication information on one link, or a plurality of any STAs in a STA MLD listen to group addressed traffic indication information on links on which the STAs respectively operate. For example, in FIG. 4(c), the AP 601-1 and the AP 601-3 may also perform steps S201 and S202, to separately send group addressed traffic indication information, and any one or more STAs in the STA MLD 602 (or one or more designated STAs in the STA MLD 602) listen to group addressed traffic indication information on a corresponding link. An AP corresponding to each bit in multicast indication information sent by each AP is not fixed. In other words, allocation is independently performed for an AP corresponding to each bit in multicast indication information sent by each AP.

The one or more STAs designated to listen to the group addressed traffic indication information on the corresponding link may be changed, and the one or more STAs designated to listen to the group addressed traffic indication information on the corresponding link are learned of by the AP MLD.

It can be learned that in this implementation, flexibility of listening to the group addressed traffic indication information by the STA MLD is greatly improved. In addition, by listening to the group addressed traffic indication information, one or some STAs in the STA MLD may learn of a group addressed traffic status of each AP in the AP MLD, to reduce power consumption of the STA MLD to some extent.

In another optional implementation, the first STA in steps S203 and S204 may be a station operating on a primary link in the STA MLD, and the first STA in the STA MLD listens to group addressed traffic indication information sent by an AP operating on the primary link. Correspondingly, the first AP is the AP operating on the primary link, and a first link is a primary link between the AP MLD and the STA MLD.

In still another optional implementation, the first STA in steps S203 and S204 is a station operating on a primary link in the STA MLD. Optionally, the STA MLD may notify the AP MLD of a primary link on which the STA MLD operates. For example, a station located on the primary link in the STA MLD notifies a link identifier of the station to an AP corresponding to the station in the AP MLD. Therefore, an AP operating on the primary link in the AP MLD sends group addressed traffic indication information, but another AP may not send group addressed traffic indication information, to help reduce power consumption of the AP MLD, or help the AP MLD send group addressed traffic indication information more efficiently. For example, the AP MLD repeatedly sends the group addressed traffic indication information on a plurality of links.

The following describes an implementation of how the AP MLD learns of the primary link on which the STA MLD operates.

In an implementation, the AP MLD may obtain identification information of a primary link determined by the STA MLD. For example, the identification information of the primary link may include one or more items of the following information: an operating class (operating class) and a channel number (channel number) that correspond to the primary link; a MAC address (or a BSSID) of the primary link; or an identifier (identifier, ID) of the primary link. In this embodiment of this application, specific content included in the identification information of the primary link is not limited. All information that can be used to uniquely identify one station operating on the primary link may be the identification information of the primary link in this embodiment of this application. A MAC address of the primary link may be a MAC address of the STA operating on the primary link, or a MAC address of an AP operating on the primary link. When the MAC address of the primary link is the MAC address of the AP operating on the primary link, the MAC address of the primary link may also be referred to as a BSSID.

In an implementation, when the AP MLD is not associated with the STA MLD, that the AP MLD obtains the identification information of the primary link may include: The AP MLD receives an association request frame from the STA MLD. The link on which the AP MLD receives the association request frame is the primary link determined by the STA MLD, or the association request frame received by the AP MLD carries the link identification information of the primary link determined by the STA MLD. In other words, the AP MLD may determine that a station on a link on which the association request frame is received (or a station that sends the association request frame) is a link identifier of the primary link; or the AP MLD obtains the link identification information that is of the primary link and that is carried in the association request frame.

In another implementation, when the AP MLD has been associated with the STA MLD, that the AP MLD obtains the link identification information of the primary link may include: The AP MLD receives a message frame from the STA MLD. The message frame carries the link identification information of the primary link determined by the STA MLD. The message frame is a management frame, a data frame, a control frame, or the like.

It can be understood that, in this implementation, the message frame is used to notify the AP MLD of a primary link replaced by the STA MLD. In other words, the identification information that is of the primary link and that is carried in the message frame is link identification information of the replaced primary link. Optionally, the management frame may further include a replacement count, to indicate a countdown to replacement of the primary link.

Optionally, the AP MLD may alternatively select a link as the primary link, and the link identifier of the primary link is used to indicate an AP operating on the primary link. The AP sends the link identifier of the primary link to a station associated with the AP or a surrounding station. In step S201, the first AP is an AP operating on the primary link. The group addressed traffic indication information sent by the first AP may be used to indicate whether the first AP operating on the primary link has group addressed traffic; or the group addressed traffic indication information may be used to indicate whether an AP operating on a secondary link has group addressed traffic; or the group addressed traffic indication information may be used to indicate whether the first AP operating on the primary link has group addressed traffic, and whether an AP operating on a secondary link has group addressed traffic. The secondary link is a link on which an AP other than the first AP in the AP MLD operates, or the secondary link includes a link in the plurality of links other than the primary link.

In an implementation, the group addressed traffic indication information sent by the first AP may be some or all bits in the group addressed traffic indication information generated by the first AP. The group addressed traffic indication information sent by the first AP is a part of bits in the group addressed traffic indication information generated by the first AP, to help reduce signaling overheads.

Each bit in the group addressed traffic indication information corresponds to each AP in the AP MLD. If none of APs corresponding to all bits before an $(N_1)$th bit in the group addressed traffic indication information have group addressed traffic, and none of APs corresponding to all bits after an $(N_2)^{th}$ bit have group addressed traffic, the group addressed traffic indication information sent by the first AP may include only the $(N_1)^{th}$ bit to the $(N_2)^{th}$ bit. Herein, $N_1$ may be greater than or equal to 0 and less than a total quantity of bits in the generated group addressed traffic indication information, and $N_2$ may be greater than $N_1$ and less than or equal to a total quantity of bits in the generated group addressed traffic indication information. It can be learned that in this implementation, signaling overheads are reduced. In addition, in this case, the group addressed traffic indication information further includes an offset and a length field, the offset is used to indicate N1, and a length field is used to indicate $N_2-N_1+1$ bits in the group addressed traffic information.

In another implementation, the group addressed traffic indication information sent by the first AP may include bits corresponding to AIDs of some APs, or include bits corresponding to AIDs of some stations, to reduce bit overheads of the TIM element. In other words, a compressed manner in a protocol is used. When none of a plurality of APs with consecutive association identifiers have group addressed traffic, the partial virtual bitmap field may not include bits corresponding to the association identifiers. Specifically, a quantity of bits in the group addressed traffic indication information in the partial virtual bitmap field may be reduced based on an offset in the TIM element.

It can be understood that the foregoing embodiments and implementations have respective focuses. For an implementation that is not described in detail in one embodiment, refer to other embodiments. Details are not described herein again. Further, embodiments described in this specification may be independent solutions, or may be combined based on internal logic. These solutions all fall within the protection scope of this application. In other words, the foregoing described embodiments may be combined with each other in a case of no conflict.

In the foregoing embodiments provided in this application, the methods provided in embodiments of this application are separately described from perspectives of an AP MLD and a STA MLD. To implement functions in the methods provided in the foregoing embodiments of this application, the AP MLD and the STA MLD may include a hardware structure and a software module, to implement the foregoing functions in a form of the hardware structure, the software module, or a combination of the hardware structure and the software module. A function in the foregoing functions may be performed in a form of the hardware structure, the software module, or a combination of the hardware structure and the software module. The following describes in detail a communications apparatus in embodiments of this application with reference to FIG. 12 to FIG. 15. The communications apparatus is an access point in an access point multi-link device or a station in a station multi-link device. Further, the communications apparatus may be an apparatus in the AP MLD; or the communications apparatus is an apparatus in the STA MLD.

Figure 12:
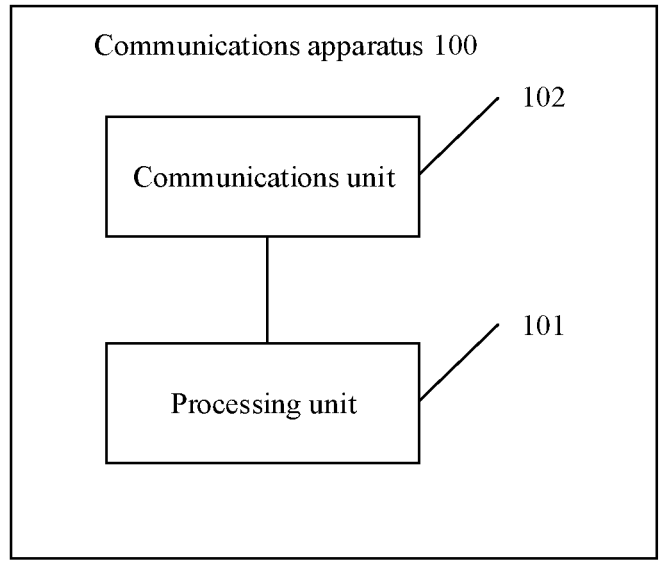
FIG. 12 is a schematic diagram of a structure of a communications apparatus 100 according to an embodiment of this application.

FIG. 12 is a schematic block diagram of a communications apparatus 100. The communications apparatus 100 corresponds to the AP MLD or any AP in the AP MLD in either of the group addressed traffic transmission method 200 applicable to a plurality of links to the group addressed traffic transmission method 300 applicable to a plurality of links. Optionally, the communications apparatus 100 is an AP or an apparatus in the AP MLD shown in any one of FIG. 4(*a*) to FIG. 4(*c*) or FIG. 5.

The communications apparatus 100 includes a processing unit 101 and a communications unit 102.

The processing unit 101 is configured to generate group addressed traffic indication information.

The group addressed traffic indication information is used to indicate whether one or more APs in a first AP MLD have group addressed traffic, or the group addressed traffic indication information is used to indicate whether a plurality of APs in the first AP MLD and a second AP MLD have group addressed traffic.

The second AP MLD is an AP MLD in which anon-transmitted AP in a multiple BSSID set in which a first AP is located.

The communications unit 102 is configured to send the group addressed traffic indication information on a first link. The first link is a link on which the access point operates.

It can be learned that, in the communications apparatus 100, the group addressed traffic indication information generated by the processing unit 101 can be used to indicate whether the communications apparatus 100 or another AP has group addressed traffic, and then, is sent by the communications unit 102 to a station multi-link device. Therefore, any station in the station multi-link device may listen to the group addressed traffic indication information, to improve flexibility of notifying group addressed traffic. In addition, when the group addressed traffic indication information is further used to indicate whether each AP or a plurality of APs in the first AP MLD and the second AP MLD have group addressed traffic, any station in the station multi-link device may learn of whether a plurality of APs have group addressed traffic, to avoid a case in which each station in the station multi-link device listens to whether group addressed traffic exists on a respective link, so as to reduce power consumption of the station multi-link device.

In an implementation, each bit in the group addressed traffic indication information corresponds to each AP, and each bit is used to indicate whether an AP corresponding to the bit has group addressed traffic. For details, refer to related content of the foregoing method embodiments. The details are not described herein again.

In addition, group addressed traffic indication information sent by communications unit 102 may be a part of bits in group addressed traffic indication information generated by the processing unit 101. For example, a bit corresponding to an AP having no group addressed traffic is not carried in a compressed manner. Details are not described herein again.

In another implementation, the group addressed traffic indication information is a part of bits in a partial virtual bitmap field in a traffic indication map TIM element. Alternatively, the group addressed traffic indication information is the part of consecutive bits in the partial virtual bitmap field in the traffic indication map TIM element.

It can be learned that, in this implementation, the AP MLD allocates an AID to each AP included in the AP MLD, and further separately indicates, by using bits corresponding to the AIDs in a partial virtual bitmap field, whether APs with the AIDs have group addressed traffic. In other words, the group addressed traffic indication information is the bits corresponding to the AIDs. For details, refer to related content shown in FIG. 7 to FIG. 9 in the foregoing method embodiments. The details are not described herein again.

In addition, for content of whether an AID corresponding to each AP in the AP MLD is explicitly allocated or implicitly pre-defined, whether an AP in the AP MLD operates in a multiple BSSID mode, or the like, refer to related implementations in Embodiment 1 and Embodiment 2 of the foregoing methods. Details are not described herein again.

For example, if the AID corresponding to each AP in the AP MLD is explicitly allocated, in the communications apparatus, the processing unit 101 is further configured to generate association identifier configuration information. The association identifier configuration information is used to indicate an association identifier AID corresponding to each AP or an AP other than the first AP in the first AP MLD; or the association identifier configuration information is used to indicate an association identifier AID corresponding to an AP other than the first AP or each AP in the first AP MLD on the first link, and an association identifier corresponding to each AP or an AP other than the non-transmitted AP in the second AP MLD on the first link. The communications unit 102 is further configured to send the association identifier configuration information on the first link.

In addition, in this implementation, because AIDs corresponding to a part of bits in the partial virtual bitmap field are AIDs of stations, for an association identifier AID corresponding to each bit in the group addressed traffic indication information, an AID of a station managed by each AP in the first AP MLD is further considered, or an AID of a station associated with an AP operating on the first link is further considered.

In an implementation, AIDs corresponding to all APs in the first AP MLD are continuously allocated by the first AP by using an AID x as a start. Herein, x is equal to max{$2^{N_1}$, $2^{N_2}$, . . . , $2^{N_y}$, . . . , $2^{N_n}$}, n is a quantity of APs operating in a multiple basic service set identifier multiple BSSID mode in the AP MLD, Ny is a value of a maximum basic service set identifier BSSID indicator field in a multiple BSSID element of a multiple BSSID set in which an AP y operating in a basic service set identifier BSSID mode is located, and the AP y is a $y^{th}$ AP operating in the basic service set identifier BSSID mode in the AP MLD.

In another implementation, AIDs corresponding to all APs in the first AP MLD are continuously allocated by the first AP by using an AID x as a start. Herein, x is equal to $2^N$; and when the first AP operates in a multiple basic service set identifier multiple BSSID mode, N is equal to a value of a maximum basic service set identifier BSSID indicator field in a multiple basic service set identifier multiple BSSID element of a multiple BSSID set in which the first AP is located; or N is equal to 0 when the first AP does not operate in a multiple BSSID mode.

In the communications apparatus 100, the communications unit 102 is further configured to send a service indication map DTIM beacon frame and group addressed traffic after the DTIM beacon frame. When an AP on which the communications apparatus 100 is located has group addressed traffic, the communications unit 102 may perform this operation.

It should be understood that the communications apparatus 100 in this embodiment of this application may correspondingly perform the multi-link group addressed traffic transmission method 200 and the multi-link group addressed traffic transmission method 300 in embodiments of this application. In addition, the foregoing operations or functions of the units in the communications apparatus 100 are respectively used to implement corresponding procedures of the methods in FIG. 5 and FIG. 7. For brevity, details are not described herein again.

FIG. 12 is a schematic block diagram of a communications apparatus 200. The communications apparatus 200 corresponds to the STA MLD, any STA in the STA MLD, or a STA operating on a primary link in the STA MLD in either of the group addressed traffic transmission method 200 applicable to a plurality of links and the group addressed traffic transmission method 300 applicable to a plurality of links. Optionally, the communications apparatus 200 is a STA or an apparatus in the STA MLD shown in FIG. 1. Alternatively, the communications apparatus 200 is a STA or an apparatus in the STA MLD in FIG. 4(a) to FIG. 4(c).

The communications apparatus 200 includes a communications unit 201 and a processing unit 202.

The communications unit 201 is configured to receive, on a first link on which the communications apparatus 200 operates, group addressed traffic indication information from a first AP in a first AP MLD.

The group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic, and the second AP MLD is an AP MLD in which a non-transmitted AP in a multiple BSSID set in which the first AP is located.

The processing unit 202 is configured to determine, based on the group addressed traffic indication information, whether each AP has group addressed traffic.

It can be learned that, in the communications apparatus 200, the processing unit 202 may learn, based on the group addressed traffic indication information, of whether one or more APs have group addressed traffic. In other words, the communications apparatus 200 may not only learn of whether an AP associated with the communications apparatus 200 has group addressed traffic, but also learn of whether another AP in an AP MLD has group addressed traffic, to improve flexibility of notifying group addressed traffic. In addition, the group addressed traffic indication information is used to indicate whether a plurality of APs or each AP in the first AP MLD and the second AP MLD has group addressed traffic. In other words, any STA in a STA MLD in which the communications apparatus 200 is located may learn of whether the plurality of APs or each AP in the first AP MLD and the second AP MLD has group addressed traffic, to avoid a case in which each STA in the STA MLD in which the communications apparatus 200 is located listens to whether a corresponding AP has group addressed traffic, and reduce power consumption of the STA MLD in which the communications apparatus 200 is located.

In an implementation, a STA corresponding to the communications apparatus 200 is a station operating on the primary link in the STA MLD. Therefore, that the communications unit 201 receives group addressed traffic indication information from the AP MLD is specifically: The communications unit 201 listens, on the primary link, to group addressed traffic indication information of one AP in the AP MLD. In this implementation, a case in which another STA in the STA MLD periodically listens to the group addressed traffic indication information is avoided, to reduce power consumption of the STA MLD.

For a manner in which the communications apparatus 200 determines the primary link, refer to descriptions of the foregoing method embodiments. Details are not described herein again.

In an implementation, the communications unit 201 is further configured to receive a delivery traffic indication map DTIM beacon frame and group addressed traffic after the DTIM beacon frame. In this implementation, when the processing unit 202 determines that an AP corresponding to the processing unit 202 has group addressed traffic, the communications unit 201 may perform the operation.

In an implementation, each bit in the group addressed traffic indication information corresponds to each AP, and each bit is used to indicate whether an AP corresponding to the bit has group addressed traffic. For details, refer to related content of the foregoing method embodiments. The details are not described herein again.

In addition, group addressed traffic indication information received by the communications unit 201 may be a part of bits in the group addressed traffic indication information generated by the AP MLD. For details, refer to related content of the foregoing method embodiments. Details are not described herein again.

In another implementation, the group addressed traffic indication information is a part of bits in a partial virtual bitmap field in a traffic indication map TIM element. Alternatively, the group addressed traffic indication information is the part of consecutive bits in the partial virtual bitmap field in the traffic indication map TIM element.

It can be learned that, in this implementation, the AP MLD allocates an AID to each AP included in the AP MLD, and further separately indicates, by using bits corresponding to the AIDs in a partial virtual bitmap field, whether APs with the AIDs have group addressed traffic. In other words, the group addressed traffic indication information is the bits corresponding to the AIDs. For details, refer to related content of the foregoing method embodiments.

In addition, for content of whether an AID corresponding to each AP in the AP MLD is explicitly allocated or implicitly pre-defined, or whether an AP in the AP MLD operates in a multiple BSSID mode, refer to Method 1 and Method 2 in the foregoing method embodiments. Details are not described herein again.

For example, if the AID corresponding to each AP in the AP MLD is explicitly allocated, in the communications apparatus 200, the communications unit 201 is further configured to receive association identifier configuration information. The association identifier configuration information is used to indicate an association identifier AID corresponding to each AP or an AP other than the first AP in the first AP MLD on the first link.

Alternatively, the association identifier configuration information is used to indicate an association identifier AID corresponding to each AP or an AP other than the first AP in the first AP MLD on the first link, and an association identifier corresponding to each AP or an AP other than the non-transmitted AP in the second AP MLD on the first link.

The processing unit 202 is further configured to determine, based on the association identifier configuration information, an AID corresponding to each AP.

In addition, in this implementation, because AIDs corresponding to a part of bits in the partial virtual bitmap field are AIDs of stations, for an association identifier AID corresponding to each bit in the group addressed traffic indication information, a station associated with each AP in the first AP MLD is further considered; or a station managed by an AP operating on the first link is further considered.

In an implementation, AIDs corresponding to all APs in the first AP MLD are continuously allocated by the first AP by using an AID x as a start. Herein, x is equal to $2^N$; and when the first AP operates in a multiple basic service set identifier multiple BSSID mode, N is equal to a value of a maximum basic service set identifier BSSID indicator field in a multiple basic service set identifier multiple BSSID element of a multiple BSSID set in which the first AP is located; or N is equal to 0 when the first AP does not operate in a multiple BSSID mode.

In another implementation, AIDs corresponding to all APs in the first AP MLD are continuously allocated by the first AP by using an AID x as a start. Herein, x is equal to $\max\{2^{(N1)}, 2^{(N2)}, \ldots, 2^{(Ny)}, \ldots, 2^{(Nn)}\}$, n is a quantity of APs operating in a multiple basic service set identifier multiple BSSID mode in the AP MLD, Ny is a value of a maximum basic service set identifier BSSID indicator field in a multiple BSSID element of a multiple BSSID set in which an AP y operating in the multiple BSSID mode is located, and the AP y is a $y^{th}$ AP operating in a basic service set identifier BSSID mode in the AP MLD.

It should be understood that the communications apparatus 200 in this embodiment of this application may correspondingly perform the multi-link group addressed traffic transmission method 200 and the multi-link group addressed traffic transmission method 300 in embodiments of this application. In addition, the foregoing operations or functions of the units in the communications apparatus 200 are respectively used to implement corresponding operations of a STA or a first STA in the STA MLD in the foregoing embodiments. For brevity, details are not described herein again.

Figure 13:
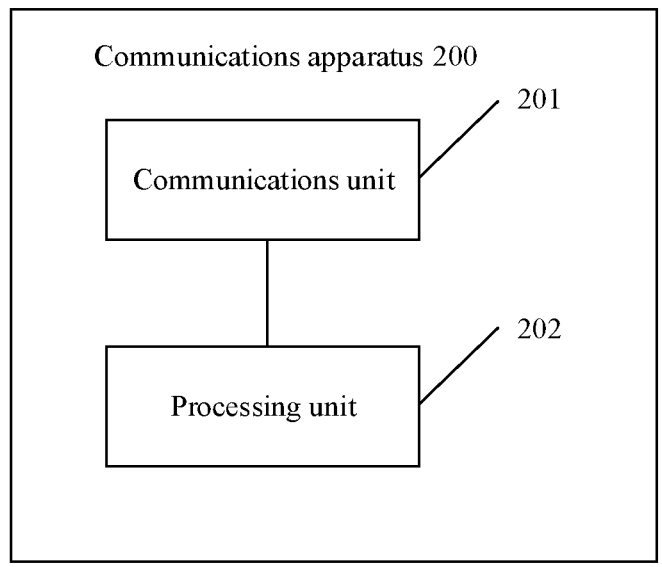
FIG. 13 is a schematic diagram of a structure of a communications apparatus 200 according to an embodiment of this application.
Figure 14:
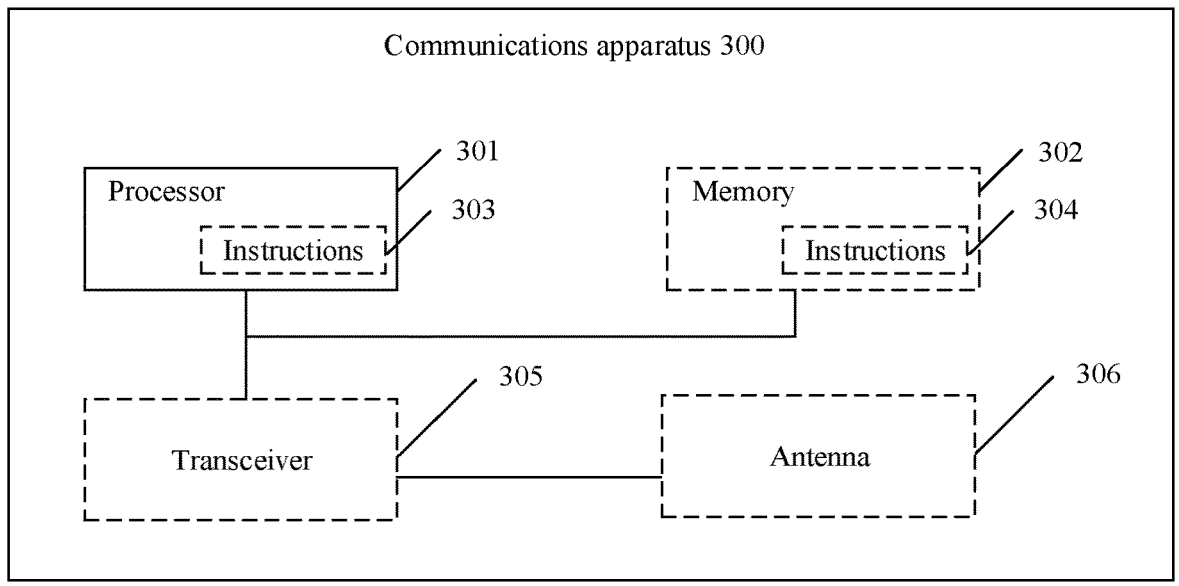
FIG. 14 is a schematic diagram of a structure of a communications apparatus 300 according to an embodiment of this application.

FIG. 13 is a schematic block diagram of a communications apparatus 300. In an implementation, the communications apparatus 300 corresponds to the AP MLD or any AP in the AP MLD in either of the group addressed traffic transmission method 200 applicable to a plurality of links to the group addressed traffic transmission method 300 applicable to a plurality of links. Optionally, the communications apparatus 300 may be an AP or an apparatus in the AP MLD in FIG. 1, or the communications apparatus 300 is an AP or an apparatus in the AP MLD in FIG. 4(a) to FIG. 4(c), or an AP MLD shown in FIG. 5. Optionally, the communications apparatus 300 is a chip, a chip system, a processor, or the like that implements the foregoing method embodiments. The communications apparatus 300 may be configured to implement the methods described in the foregoing method embodiments. For details, refer to the description in the foregoing method embodiments.

In another implementation, the communications apparatus 300 corresponds to the STA MLD, any STA in the STA MLD, or a STA operating on a primary link in the STA MLD in either of the group addressed traffic transmission method 200 applicable to a plurality of links and the group addressed traffic transmission method 300 applicable to a plurality of links. Optionally, the communications apparatus 300 is a STA or an apparatus in the STA MLD in FIG. 1; or the communications apparatus 300 is a STA or an apparatus in the STA MLD in FIG. 4(a) to FIG. 4(c). Optionally, the communications apparatus 300 is a chip, a chip system, a processor, or the like that implements the foregoing method embodiments. The communications apparatus 400 may be configured to implement the methods described in the foregoing method embodiments. For details, refer to the description in the foregoing method embodiments.

The communications apparatus 300 may include one or more processors 301. The processor 301 may be a general-purpose processor, a dedicated processor, or the like, for example, the processor 301 may be a baseband processor or a central processing unit. The baseband processor may be configured to process a communications protocol and communications data, and the central processing unit may be configured to: control the communications apparatus (for example, a base station, a baseband chip, a terminal, a terminal chip, a DU, or a CU), execute a computer program, and process data of the computer program.

The communications apparatus 300 may further include a transceiver 305. The transceiver 305 may be referred to as a transceiver unit, a transceiver machine, a transceiver circuit, or the like, and is configured to implement a transceiver function. The transceiver 305 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communications apparatus 300 may further include an antenna 306.

Optionally, the communications apparatus 300 may include one or more memories 302, and may store instructions 304. The instructions 304 may be a computer program. The computer program may be run on the communications apparatus 300, so that the communications apparatus 300 performs the method described in the foregoing method embodiments. Optionally, the memory 302 may further store data. The communications apparatus 300 and the memory 302 may be disposed separately, or may be integrated together.

The communications apparatus 300 is configured to implement a function of an AP in an AP MLD in the multi-link group addressed traffic transmission method 200 and the multi-link group addressed traffic transmission method 300 in the foregoing method embodiments.

The processor 301 may be configured to: perform step S201 in FIG. 7, and perform an optional implementation of an AID corresponding to the AP in the foregoing method embodiments, for example, generate association identifier configuration information.

The transceiver 305 is configured to: perform step S202 in FIG. 7, and perform an optional implementation of the AID corresponding to the AP in the foregoing method embodiments, for example, send the association identifier configuration information.

The communications apparatus 300 is configured to implement a function of a STA in a STA MLD in the multi-link group addressed traffic transmission method 200 and the multi-link group addressed traffic transmission method 300 in the foregoing method embodiments.

The transceiver 305 is configured to: perform step S203 in FIG. 7, and perform an optional implementation of the AID corresponding to the AP in the foregoing method embodiments, for example, receive the association identifier configuration information.

The processor 301 may be configured to: perform step S204 in FIG. 7, and perform an optional implementation of an AID corresponding to the AP in the foregoing method embodiments, for example, determine an association identifier of each AP in the AP MLD based on the association identifier configuration information.

In an implementation, the processor 301 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In an implementation, the processor 301 may store instructions 303. The instructions may be a computer program. The computer program runs on the processor 301, so that the communications apparatus 300 performs the method described in the foregoing method embodiments. The computer program may be solidified in the processor 301. In this case, the processor 301 may be implemented by hardware.

In an implementation, the communications apparatus 300 may include a circuit, and the circuit may implement a sending, receiving, or communications function in the foregoing method embodiments. The processor and the transceiver that are described in this application may be implemented on an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (CMOS), an N-type metal oxide semiconductor (NMOS), a P-type channel metal oxide semiconductor (PMOS), a bipolar junction transistor (BJT), a bipolar CMOS (BiCMOS), silicon germanium (SiGe), and gallium arsenide (GaAs).

The communications apparatus described in the foregoing embodiments may be an AP MLD or an AP in the AP MLD. However, a scope of the communications apparatus described in this application is not limited thereto, and a structure of the communications apparatus may not be limited in FIG. 14. The communications apparatus may be an independent device or may be a part of a large device. For example, the communications apparatus may be:

(1) an independent integrated circuit IC, a chip, or a chip system or subsystem;
(2) a set including one or more ICs, where optionally, the set of ICs may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) another device, or the like.

Figure 15:
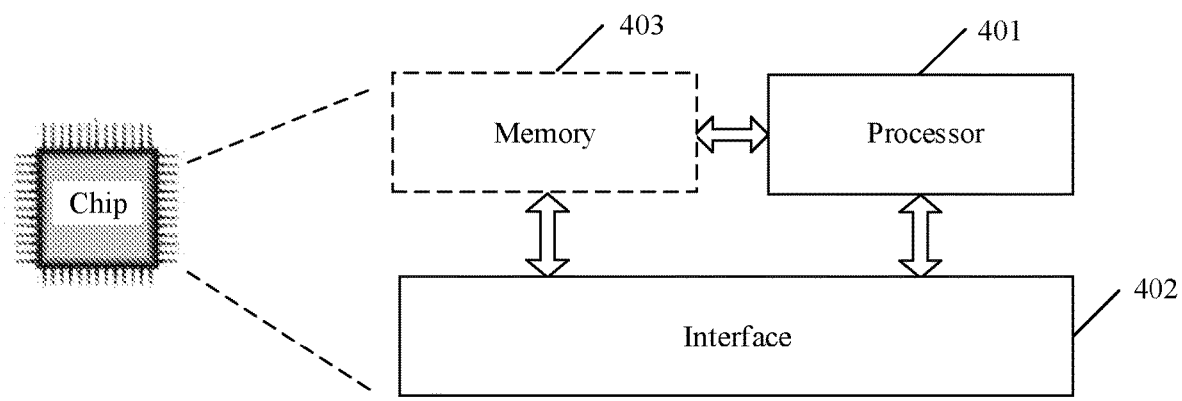
FIG. 15 is a schematic diagram of a structure of a chip according to an embodiment of this application.

For a case in which the communications apparatus may be a chip or a chip system, refer to a schematic diagram of a structure of a chip shown in FIG. 15. The chip shown in FIG. 15 includes a processor 401 and an interface 402. There may be one or more processors 401, and there may be a plurality of interfaces 402.

The chip is configured to implement a function of an AP in an AP MLD in the multi-link group addressed traffic transmission method 200 and the multi-link group addressed traffic transmission method 300 in the foregoing method embodiments.

In an implementation, the processor 401 is configured to generate group addressed traffic indication information.

The group addressed traffic indication information is used to indicate whether one or more APs in a first AP MLD have group addressed traffic, or the group addressed traffic indication information is used to indicate whether a plurality of APs in the first AP MLD and a second AP MLD have group addressed traffic.

The second AP MLD is an AP MLD in which a non-transmitted AP in a multiple BSSID set in which a first AP is located.

The interface 402 is configured to send the group addressed traffic indication information on a first link. The first link is a link on which an access point operates.

It can be learned that, in the chip, the group addressed traffic indication information generated by the processor can be used to indicate whether the chip or another AP has group addressed traffic, and then sent by the interface 402 to a station multi-link device. Therefore, any station in the station multi-link device may listen to the group addressed traffic indication information, to improve flexibility of notifying group addressed traffic. In addition, when the group addressed traffic indication information is used to indicate whether each AP or a plurality of APs in the first AP MLD and the second AP MLD have group addressed traffic, any station in the station multi-link device may learn of whether a plurality of APs have group addressed traffic, to avoid a case in which each station in the station multi-link device listens to whether group addressed traffic exists on a respective link, so as to reduce power consumption of the station multi-link device.

Optionally, the chip may further perform the function of the AP in the AP MLD in the multi-link group addressed traffic transmission method 200 and the multi-link group addressed traffic transmission method 300. Details are not described herein again.

The chip is configured to implement a function of a STA in a STA MLD in the multi-link group addressed traffic transmission method 200 and the multi-link group addressed traffic transmission method 300 in the foregoing method embodiments.

In an implementation, the interface 402 is configured to receive, on a first link on which the chip operates, group addressed traffic indication information from a first AP in a first AP MLD.

The group addressed traffic indication information is used to indicate whether one or more APs in the first AP MLD have group addressed traffic, or the group addressed traffic indication information is used to indicate whether a plurality of APs in the first AP MLD and a second AP MLD have group addressed traffic, and the second AP MLD is an AP MLD in which a non-transmitted AP in a multiple BSSID set in which the first AP is located.

The processor 401 is configured to determine, based on the group addressed traffic indication information, whether each AP has group addressed traffic.

It can be learned that, in the chip, the processor may learn, based on the group addressed traffic indication information, of whether one or more APs have group addressed traffic. In other words, the chip may not only learn of whether an AP associated with the chip has group addressed traffic, but also learn of whether another AP in an AP MLD has group addressed traffic, to improve flexibility of notifying group addressed traffic. In addition, the group addressed traffic indication information is used to indicate whether a plurality of APs or each AP in the first AP MLD and the second AP MLD has group addressed traffic. In other words, any STA in a STA MLD in which the chip is located may learn of whether a plurality of APs or each AP in the AP MLD has group addressed traffic, to avoid a case in which each STA in the STA MLD in which the chip is located listens to whether a corresponding AP has group addressed traffic, and reduce power consumption of the STA MLD in which the chip is located.

Optionally, the chip may further perform the function of the STA in the STA MLD in the multi-link group addressed traffic transmission method 200 and the multi-link group addressed traffic transmission method 300. Details are not described herein again.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

This application further provides a computer-readable storage medium. The computer-readable storage medium stores a computer program, and when the computer-readable storage medium is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs. When the computer program is loaded and executed on the computer, the procedure or functions according to embodiments of this application are all or partially generated. The computer may be a general-purpose computer, a dedicated computer, a computer network, or another programmable apparatus. The computer program may be stored in a computer-readable storage medium or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may understand that various reference numerals such as "first" and "second" in this application are merely used for differentiation for ease of description, and are not used to limit a scope of embodiments of this application, or represent a sequence.

In this application, "at least one" may alternatively be described as "one or more", and "a plurality of" may be two, three, four, or more. This is not limited in this application. In embodiments of this application, "first", "second", "third", "A", "B", "C", "D", and the like are used for distinguishing between technical features described by them. There is no chronological order or no size order between the technical features described by "first", "second", "third", "A", "B", "C", and "D".

A correspondence shown in tables in this application may be configured, or may be pre-defined. Values of the information in the tables are only examples, and other values may be configured. This is not limited in this application. During configuration of a correspondence between information and each parameter, not all correspondences shown in the tables need to be configured. For example, in the tables in this application, correspondences shown in some rows may alternatively not be configured. For another example, proper deformations and adjustments such as splitting and combination may be performed based on the foregoing tables.

Names of the parameters shown in titles of the foregoing tables may alternatively be other names that can be understood by a communications apparatus, and values or representation manners of the parameters may alternatively be other values or representation manners that can be understood by the communications apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Pre-defined" in this application may be understood as "defined", "pre-defined", "stored", "pre-stored", "pre-negotiated", "pre-configured", "solidified", or "pre-burned".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A group addressed traffic transmission method applicable to a plurality of links, wherein the method comprises:
   generating, by a first access point (AP) in a first access point multi-link device (AP MLD), group addressed traffic indication information, wherein:
      the group addressed traffic indication information indicates whether a plurality of access points (APs) in the first AP MLD and a second AP MLD have group addressed traffic; and
      the first AP is located in a multiple basic service set identifier (BSSID) set that includes a non-transmitted AP belonging to the second AP MLD; and
   sending, the group addressed traffic indication information on a first link, wherein the first link is a link on which the first AP operates.

2. The method according to claim 1, wherein the group addressed traffic indication information comprises a first group addressed traffic indication information, and the first group addressed traffic indication information indicates whether each of the following APs has group addressed traffic:
   one or more second APs in the first AP MLD, the one or more second APs are one or more APs in the first AP MLD except the first AP; and
   one or more third APs in the second AP MLD, the one or more third APs are one or more APs in the second AP MLD except the non-transmitted AP located in the same multi-BSSID set as the first AP.

3. The method according to claim 2, wherein
   the first group addressed traffic indication information comprises a first set of bits for the first AP MLD and a second set of bits for the second AP MLD in a partial virtual bitmap field in a traffic indication map (TIM) element; the first set of bits is located before the second set of bits.

4. The method according to claim 3, wherein a quantity of the first set of bits and a quantity of the second set of bits are the same.

5. The method according to claim 3, wherein in the first set of bits, each of the one or more first bits correspond to one of the one or more second APs respectively, and in response to there being one or more remaining bits in the first set of bits except the one or more first bits, the remaining bits in the first set of bits are set to zero by default; and
   in the second set of bits, each of the one or more second bits correspond to one of the one or more third APs respectively, and in response to there being one or more remaining bits in the second set of bits except the one or more second bits, the remaining bits in the second set of bits are set to zero by default.

6. The method according to claim 3, wherein one or more bits corresponding to the one or more second APs in the first AP MLD, are in ascending order in the partial virtual bitmap field according to link identifiers of the one or more second APs; and
   one or more bits corresponding to the one or more third APs in the second AP MLD, are in ascending order in the partial virtual bitmap field according to the link identifiers of the one or more third APs.

7. The method according to claim 3, wherein one or more AIDs corresponding to the one or more second APs in the first AP MLD are consecutive; and one or more AIDs corresponding to the one or more third APs in the second AP MLD are consecutive; and
   an AID corresponding to an AP in the first AP MLD is located before an AID corresponding to an AP in the second AP MLD; and;
   one AID is corresponding to one bit in the partial virtual bitmap field.

8. The method according to claim 7, wherein in the first group addressed traffic indication information, the one or more AIDs are sequentially corresponding to link identifiers or MAC addresses of the one or more second APs in the first AP MLD in descending order or ascending order; and the one or more AIDs are sequentially corresponding to link identifiers or MAC addresses of the one or more third APs in the second AP MLD in descending order or ascending order.

9. A first access point (AP) in a first access point multi-link device (AP MLD), wherein the first AP comprises a transceiver and a processor, wherein
   the processor is configured to generate group addressed traffic indication information, wherein:
      the group addressed traffic indication information indicates whether a plurality of APs in the first AP MLD and a second AP MLD have group addressed traffic; and
      the first AP is located in a multiple basic service set identifier (BSSID) set that includes a non-transmitted AP belonging to the second AP MLD; and
   the transceiver is operatively coupled to the processor and configured to send the group addressed traffic indication information on a first link, wherein the first link is a link on which the first AP operates.

10. The first AP according to claim 9, wherein the group addressed traffic indication information comprises first group addressed traffic indication information, and the first group addressed traffic indication information indicates whether each of the following APs has group addressed traffic:
one or more second APs in the first AP MLD, the one or more second APs are one or more APs in the first AP MLD except the first AP; and
one or more third APs in the second AP MLD, the one or more third APs are one or more APs in the second AP MLD except the non-transmitted AP located in the same multi-BSSID set as the first AP.

11. The first AP according to claim 10, wherein the first group addressed traffic indication information comprises a first set of bits for the first AP MLD and a second set of bits for the second AP MLD in a partial virtual bitmap field in a traffic indication map (TIM) element;
the first set of bits is located before the second set of bits.

12. The first AP according to claim 11, wherein a quantity of the first set of bits and a quantity of the second set of bits are the same.

13. The first AP according to claim 11, wherein in the first set of bits, each of the one or more first bits correspond to one of the one or more second APs, and in response to there being one or more remaining bits in the first set of bits except the one or more first bits, the processor is configured to set the remaining bits in the first set of bits to zero by default; and
in the second set of bits, each of the one or more second bits correspond to one of the one or more third APs, and in response to there being one or more remaining bits in the second set of bits except the one or more second bits, the processor is configured to set the remaining bits in the second set of bits to zero by default.

14. The first AP according to claim 11, wherein one or more bits corresponding to the one or more second APs in the first AP MLD, are in ascending order in the partial virtual bitmap field according to link identifiers of the one or more second APs; and
one or more bits corresponding to the one or more third APs in the second AP MLD, are in ascending order in the partial virtual bitmap field according to the link identifiers of the one or more third APs.

15. The first AP according to claim 11, wherein one or more AIDs corresponding to the one or more second APs in the first AP MLD are consecutive; and one or more AIDs corresponding to the one or more third APs in the second AP MLD are consecutive; and;
an AID corresponding to another AP in the first AP MLD is located before an AID corresponding to another AP in the second AP MLD; and;
one AID is corresponding to one bit in the partial virtual bitmap field.

16. The first AP according to claim 15, wherein in the first group addressed traffic indication information, the one or more AIDs are sequentially corresponding to link identifiers or MAC addresses of all the one or more second APs in the first AP MLD in descending order or ascending order; and the one or more AIDs are sequentially corresponding to link identifiers or MAC addresses of the one or more third APs in the second AP MLD in descending order or ascending order.

17. The first AP according to claim 15, wherein,
the processor is configured to allocate one or more AIDs each corresponding to each AP in the first AP MLD consecutively starting from an AID equal to x; wherein:
x is equal to 2^N;
when the first AP works in a Multiple BSSID mode, N is equal to a value of a maximum basic service set identifier BSSID indication field in a multiple basic service set identifier Multiple BSSID element of a Multiple BSSID set in which the first AP is located; and
when the first AP does not work in the Multiple BSSID mode, N is equal to 0.

18. A chip system, applied to a first access point (AP) in a first access point multi-link device (AP MLD), wherein the chip system comprises at least one processor and an interface, wherein
the processor is configured to generate group addressed traffic indication information, wherein:
the group addressed traffic indication information indicates whether a plurality of APs in the first AP MLD and a second AP MLD have group addressed traffic; and
the first AP is located in a multiple basic service set identifier (BSSID) set that includes a non-transmitted AP belonging to the second AP MLD; and
the interface coupled to the processor and configured to send the group addressed traffic indication information on a first link, wherein the first link is a link on which the first AP operates.

19. The chip system according to claim 18, wherein the group addressed traffic indication information comprises first group addressed traffic indication information, and the first group addressed traffic indication information indicates whether each of the following APs has group addressed traffic:
one or more second APs in the first AP MLD, the one or more second APs are one or more APs in the first AP MLD except the first AP; and
one or more third APs in the second AP MLD, the one or more third APs are one or more APs in the second AP MLD except the non-transmitted AP located in the same multi-BSSID set as the first AP.

20. The chip system according to claim 19, wherein the first group addressed traffic indication information comprises a first set of bits for the first AP MLD and a second set of bits for the second AP MLD in a partial virtual bitmap field in a traffic indication map (TIM) element; the first set of bits is located before the second set of bits.

21. The chip system according to claim 20, wherein a quantity of the first set of bits and a quantity of the second set of bits are the same.

22. The chip system according to claim 21, wherein in the first set of bits, each of one or more first bits correspond to one of the one or more second APs, and in response to there being one or more remaining bits in the first set of bits except the one or more first bits, the processor is configured to set the remaining bits in the first set of bits to zero by default; and
in the second set of bits, each of the one or more second bits correspond to the one or more third APs, and in response to there being one or more remaining bit in the second set of bits except the one or more second bits, the processor is configured to set the remaining bits in the second set of bits to zero by default.

23. The chip system according to claim 19, wherein one or more bits corresponding to one of the one or more second APs in the first AP MLD, are in ascending order in the partial virtual bitmap field according to link identifiers of the one or more second APs; and one or more bits corresponding to the one or more third APs in the second AP MLD, are in ascending order in the partial virtual bitmap field according to the link identifiers of the one or more third APs.

24. A first access point multilink device (AP MLD), comprising a first access point (AP) and one or more second APs, wherein the first AP is configured to:

generate group addressed traffic indication information, wherein the group addressed traffic indication information indicates whether a plurality of APs in the first AP MLD and a second AP MLD have group addressed traffic; and the first AP is located in a multiple basic service set identifier (BSSID) set that includes a non-transmitted AP belonging to the second AP MLD; and send the group addressed traffic indication information on a first link, wherein the first link is a link on which the first AP operates.

25. The first AP MLD according to claim 24, wherein the group addressed traffic indication information comprises first group addressed traffic indication information, and the first group addressed traffic indication information indicates whether each of the following APs has group addressed traffic:

one or more second APs in the first AP MLD, the one or more second APs are one or more APs in the first AP MLD except the first AP; and each one or more third APs in the second AP MLD, the one or more third APs are one or more APs in the second AP MLD except the non-transmitted AP located in the same multi-BSSID set as the first AP.

26. The first AP MLD according to claim 25, wherein the first group addressed traffic indication information comprises a first set of consecutive bits for the first AP MLD and a second set of bits for the second AP MLD in a partial virtual bitmap field in a traffic indication map (TIM) element; the first set of bits is located before the second set of bits.

27. The first AP MLD according to claim 26, wherein a quantity of the first set of bits as same and a quantity of the second set of bits are the same.

28. The first AP MLD according to claim 26, wherein in the first set of bits, each of one or more first bits correspond to one of the one or more second APs, and in response to there being one or more remaining bits in the first set of bits except the one or more first bits, the processor is configured to set the remaining bits in the first set of bits to zero by default; and in the second set of bits, each of the one or more second bits correspond to the one or more third APs, and in response to there being one or more remaining bit in the second set of bits except the one or more second bits, the processor is configured to set the remaining bits in the second set of bits to zero by default.

29. The first AP MLD according to claim 26, wherein one or more AIDs corresponding to the one or more second APs in the first AP MLD are consecutive; and one or more AIDs corresponding to the one or more third APs in the second AP MLD are consecutive; and an AID corresponding to another AP in the first AP MLD is located before an AID corresponding to another AP in the second AP MLD; and one AID is corresponding to one bit in the partial virtual bitmap field.

30. The first AP MLD according to claim 26, wherein in the first group addressed traffic indication information, the one or more AIDs are sequentially corresponding to link identifiers or MAC addresses of the one or more second APs in the first AP MLD in descending order or ascending order; and the one or more AIDs are sequentially corresponding to link identifiers or MAC addresses of the one or more third APs in the second AP MLD in descending order or ascending order.

\* \* \* \* \*